(12) United States Patent
Shimizu

(10) Patent No.: US 6,256,174 B1
(45) Date of Patent: Jul. 3, 2001

(54) DISK DRIVE APPARATUS WITH A HIGH POSITIONAL PRECISION MAGNETIC HEAD

(75) Inventor: Hirohiko Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/268,160

(22) Filed: Mar. 12, 1999

(30) Foreign Application Priority Data

Mar. 18, 1998 (JP) .................................................. 10-069159

(51) Int. Cl.7 .................................................................. G11B 5/54
(52) U.S. Cl. ..................................... 360/266.5; 360/266.2
(58) Field of Search ............................... 360/99.01, 104, 360/106, 266.2, 266.5, 267.5

(56) References Cited

U.S. PATENT DOCUMENTS 5,815,470 * 9/1998 Ohmori et al. ........................ 369/13
5,907,457 * 5/1999 Kudo et al. .......................... 360/103

FOREIGN PATENT DOCUMENTS 4-313869 * 11/1992 (JP) .

* cited by examiner

Primary Examiner—Jefferson Evans
(74) Attorney, Agent, or Firm—Oblon, Spivak, McClelland, Maier & Neustadt, P.C.

(57) ABSTRACT

The present invention provides a disk drive apparatus for recording and/or playing back a signal onto and/or from a disk-shaped recording medium. The disk drive apparatus having a configuration comprising a head arm for supporting a magnetic head. The head arm is provided with an arm base made of a rigid material and a suspension implemented by a plate spring. Since in the configuration of the disk drive apparatus provided by the present invention includes a head arm which is provided with an arm base made of a rigid material and a suspension implemented by a plate spring, the length of the suspension can be shortened and the positional precision of the magnetic head can be assured with a high degree of reliability.

4 Claims, 65 Drawing Sheets

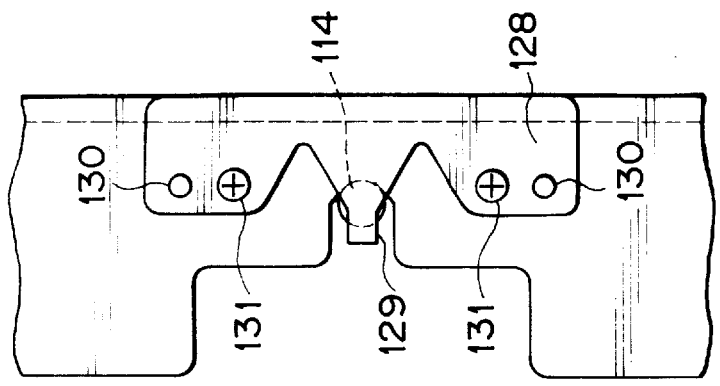
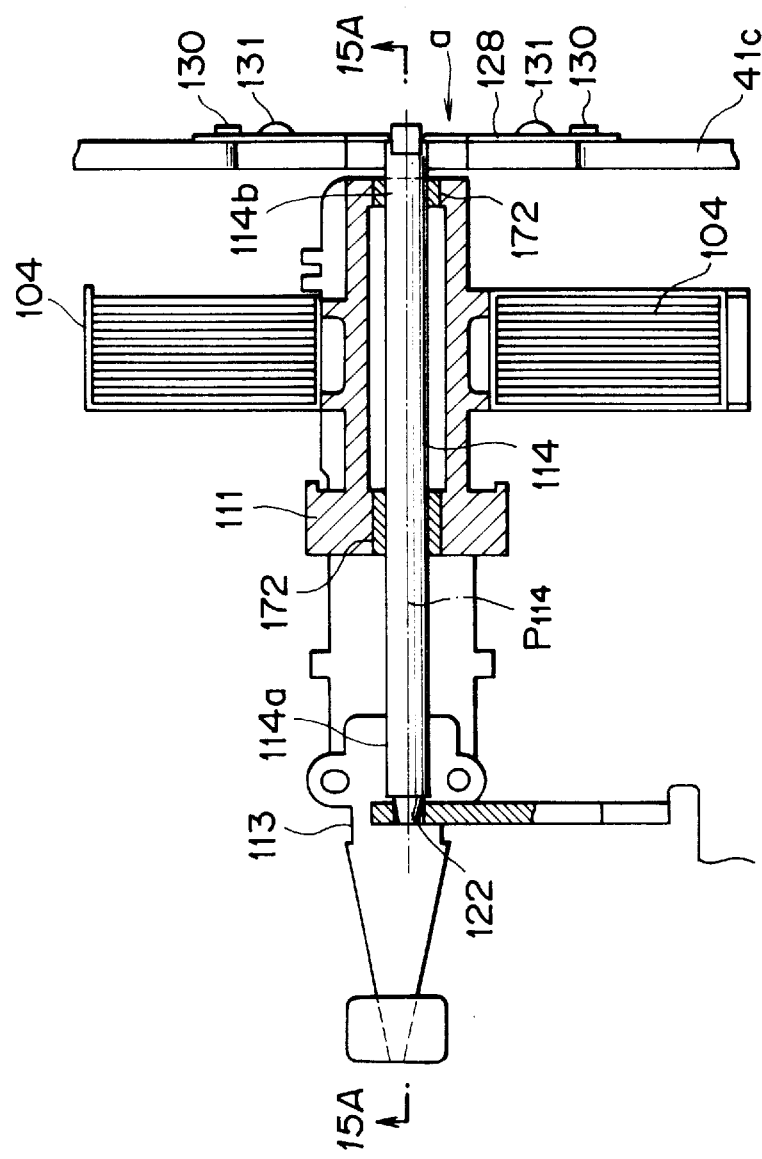

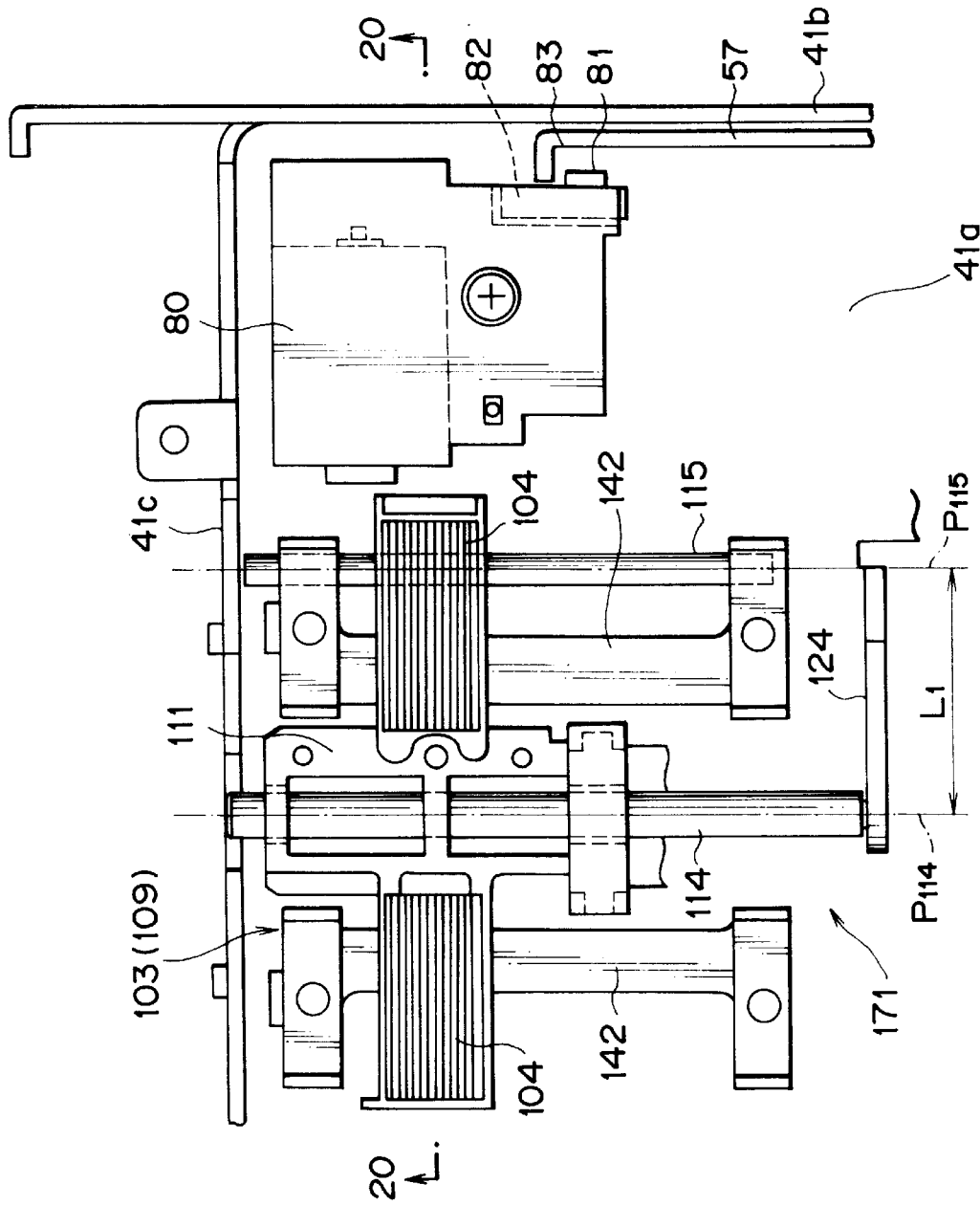

F I G. 30
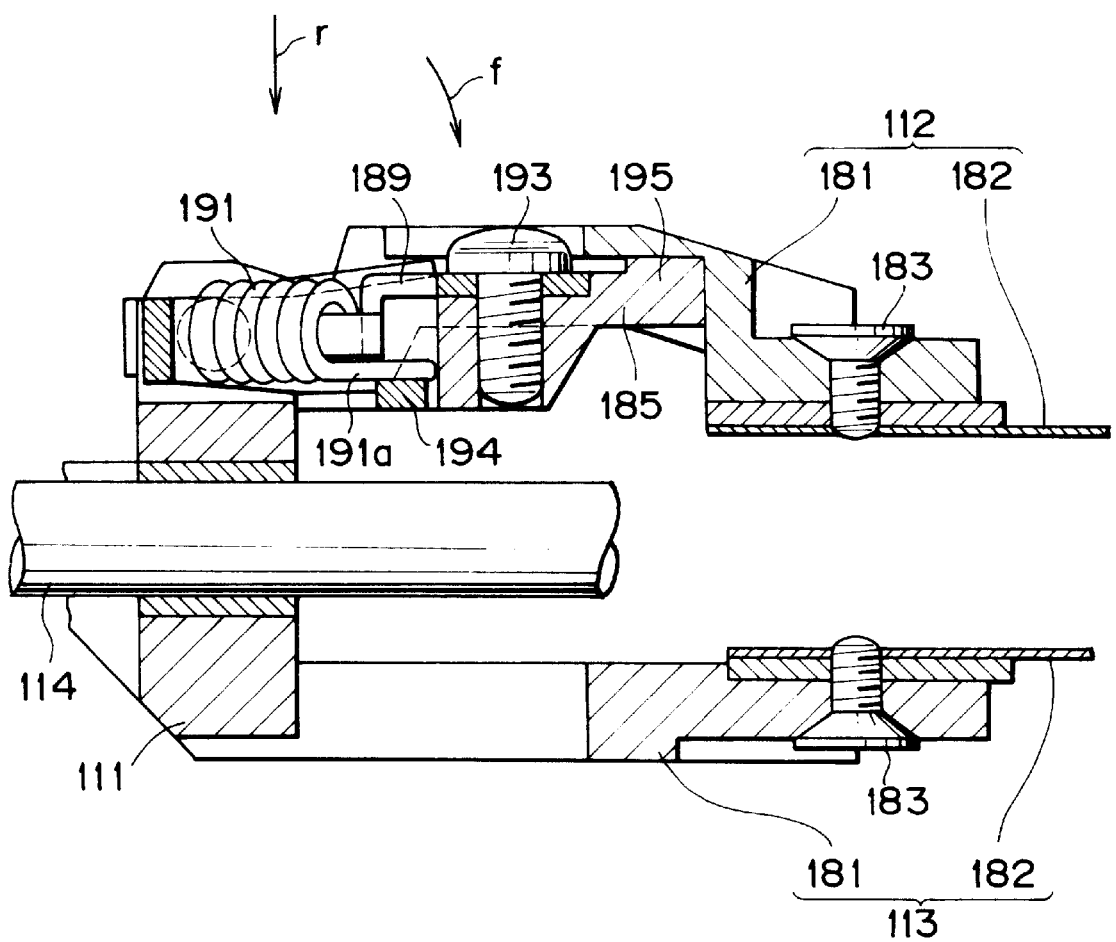

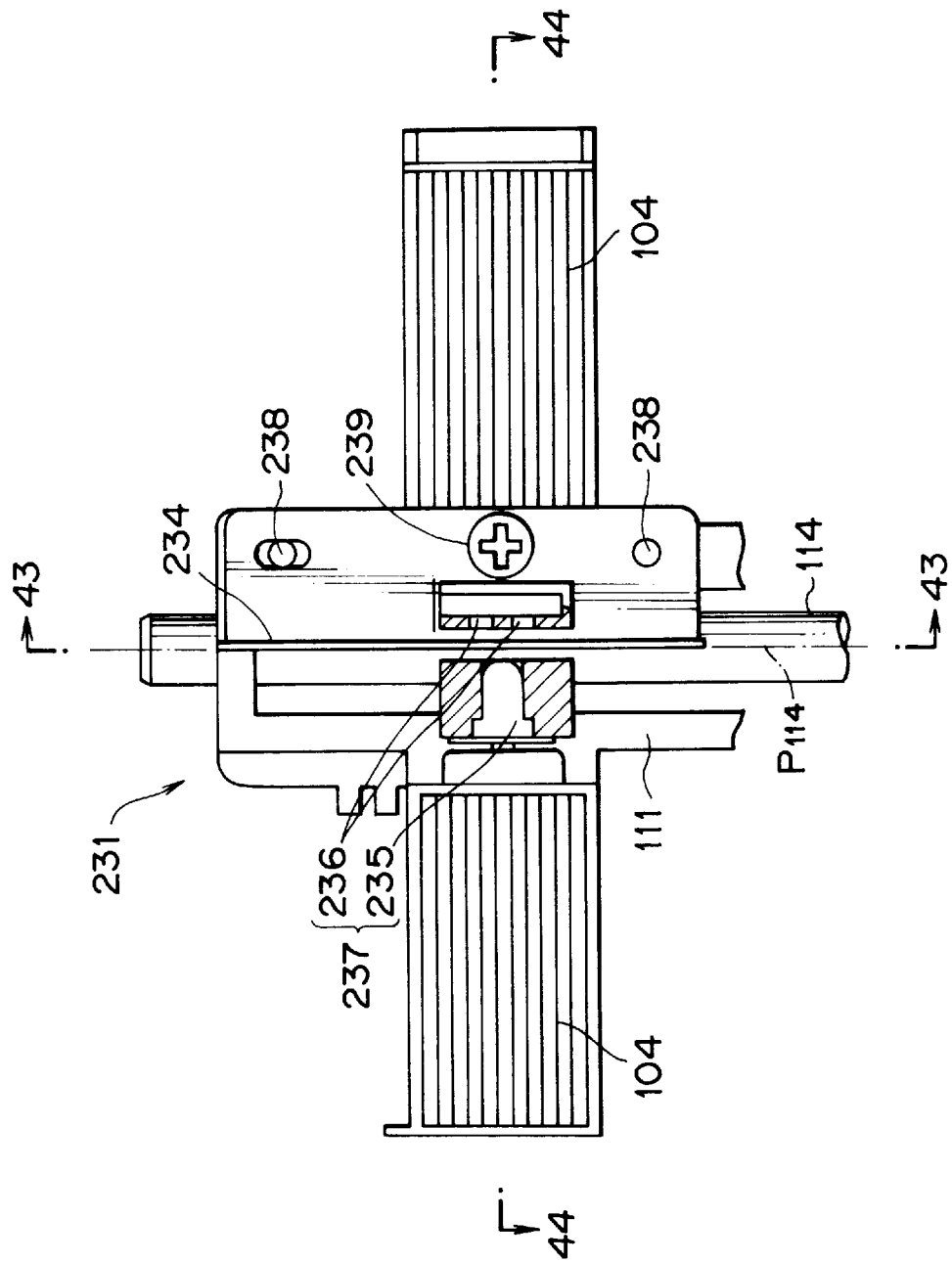

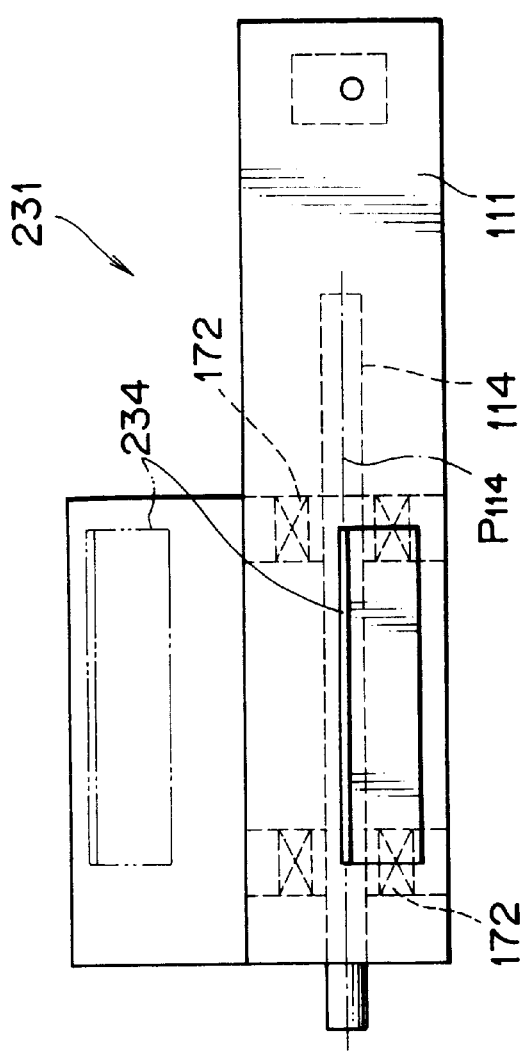
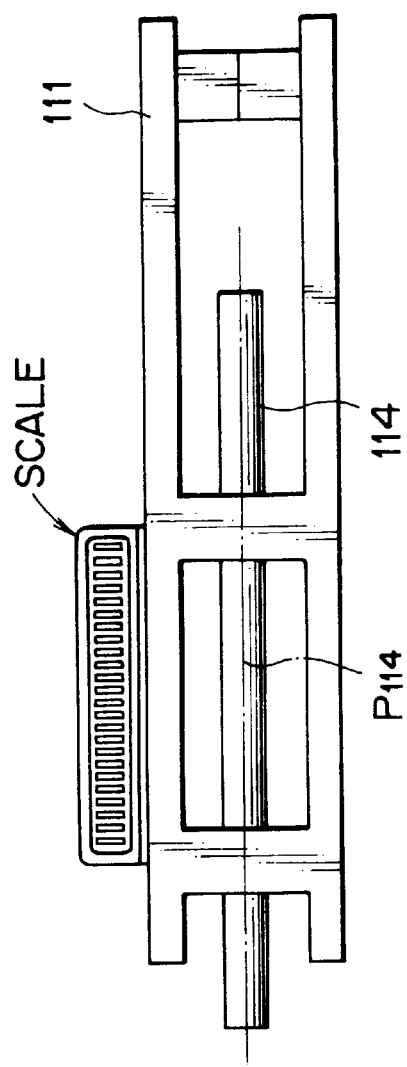
FIG. 45A PRIOR ART
FIG. 45B PRIOR ART

F I G. 66
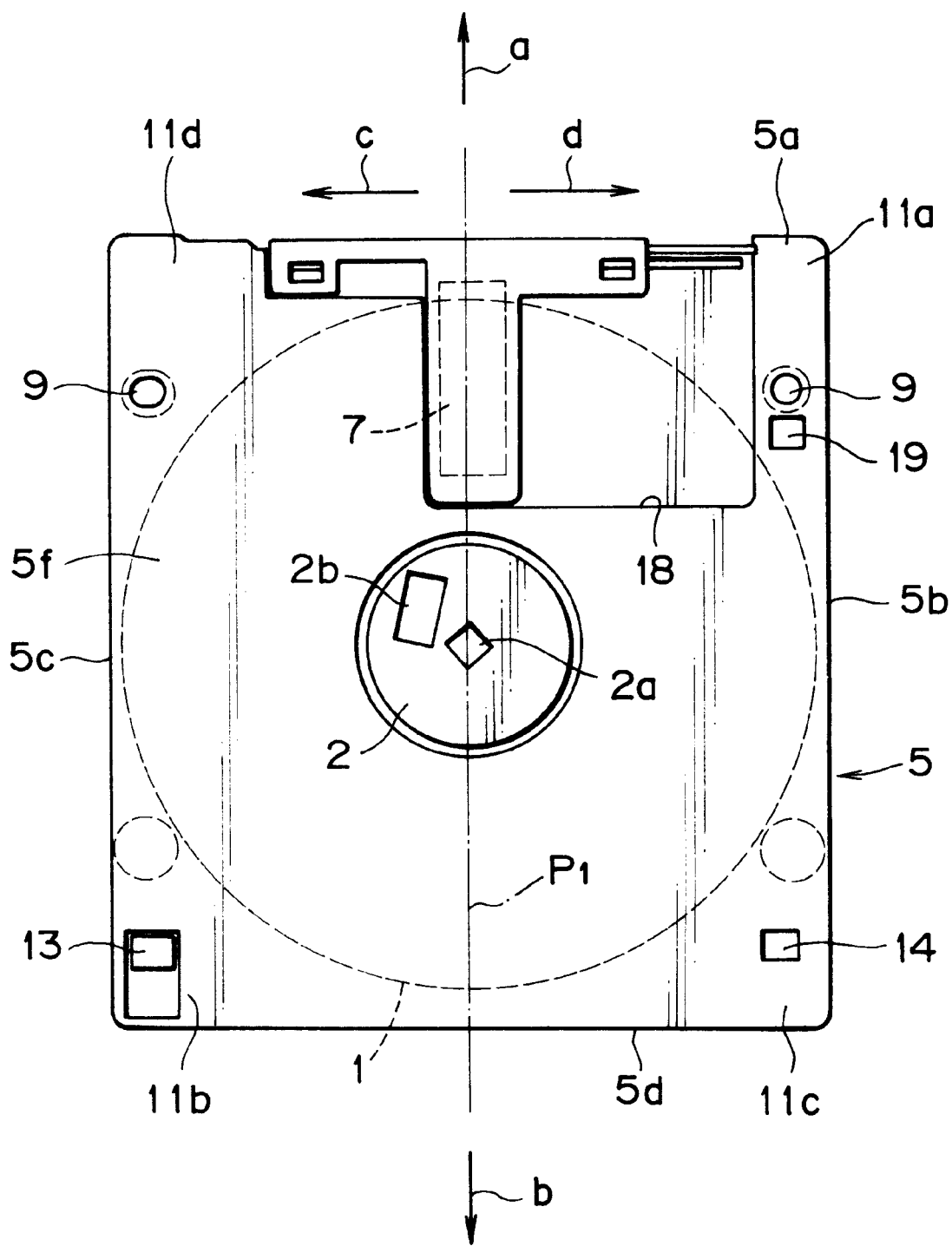

DISK DRIVE APPARATUS WITH A HIGH POSITIONAL PRECISION MAGNETIC HEAD

BACKGROUND OF THE INVENTION

1. Field of the Invention

The present invention relates to a technical field of a disk drive apparatus optimum for application to a floppy disk drive for recording and/or playing back data onto and/or from a disk-shaped recording medium such as a floppy disk.

2. Description of the Prior Art

In the conventional floppy disk drive, it is necessary to mount and remove a disk cartridge. Thus, components such as an upper magnetic head are installed on a member such as a mold part through a thin plate spring known as a gimbal. In turn, the mold part is attached to the cabinet of the floppy disk drive by another plate spring in such a way that the mold part can be moved up and down. In such an installation, the mold part itself may be floated in the circumferential direction of the floppy disk due to causes such as vibration of the plate spring. In the conventional floppy disk drive, however, a mechanism of a pair of upper and lower magnetic heads allows recording and playback operations to be carried out with the magnetic heads brought into contact with the floppy disk due to the fact that a load pressure applied between the upper and lower magnetic heads is large, components including the lower magnetic head is put in an all but fixed state and the upper magnetic head follows the lower magnetic head.

In a floppy disk drive for driving a floppy disk with a large storage capacity, on the other hand, upper and lower magnetic heads forming a pair are each installed on a thin plate spring with a triangular shape known as a suspension like one used in a hard disk drive. The upper and lower magnetic heads are each set by a balance of the weights of the 2 suspensions at a position separated by a distance from the floppy disk. Such a floppy disk drive adopts a driving technique whereby recording and playback operations are carried out with the magnetic heads following slight fluctuations of the surface of the floppy disk.

In such an arrangement, however, it is necessary to install the suspension on a plane on a carriage side opposite to the magnetic head. In addition, the distance of the plane from a disk chucking surface, the parallelism of the plane to the surface and the levelness of the plane must be controlled with a high degree of precision. If the magnetic head is installed on a mold part by a plate spring like the magnetic head of the floppy disk drive, high precision can not be assured since the effect of rolling may exist.

There is also a technique of installation whereby the suspension is attached to the carriage directly without using a mold part, the precision of which can not be assured as described above. Taking the fact that the disk cartridge needs to be mounted and removed on and from the floppy disk drive, however, it is necessary to provide a long suspension. As a result, the resonance point is shifted to a low frequency inevitably, raising a problem of a hindrance to control of the magnetic head.

SUMMARY OF THE INVENTION

It is thus an object of the present invention addressing the problems described above to provide a disk drive apparatus capable of assuring the positional precision of the magnetic head with a high degree of reliability.

In order to achieve the object described above, the disk drive apparatus provided by the present invention has a head arm for supporting the magnetic head with the arm comprising an arm base made of a rigid material and a suspension implemented by a plate spring.

Since the disk drive apparatus of the present invention with the configuration described above has a head arm comprising an arm base made of a rigid material and a suspension implemented by a plate spring, the suspension can be made short.

BRIEF DESCRIPTION OF THE DRAWINGS

FIGS. 14A and 14B are diagrams showing a top view and a side view of the members shown in FIG. 13 in an assembled state;

FIG. 19 is a diagram showing a top view of a bearing of the guide main shaft;

FIG. 30 is a diagram showing a cross section of the upper head arm of the rotation supporting mechanism shown in FIG. 27 with the upper head arm restored to a stationary position;

FIG. 42 is an explanatory diagram showing a top view of part of a tracking scale;

FIGS. 45A and 45B are diagrams used for explaining a problem of the conventional tracking scale;

FIG. 66 is a diagram showing a bottom view of the floppy disk cartridge shown in FIG. 64;

DETAILED DESCRIPTION OF THE PREFERRED EMBODIMENTS

Figure 1:
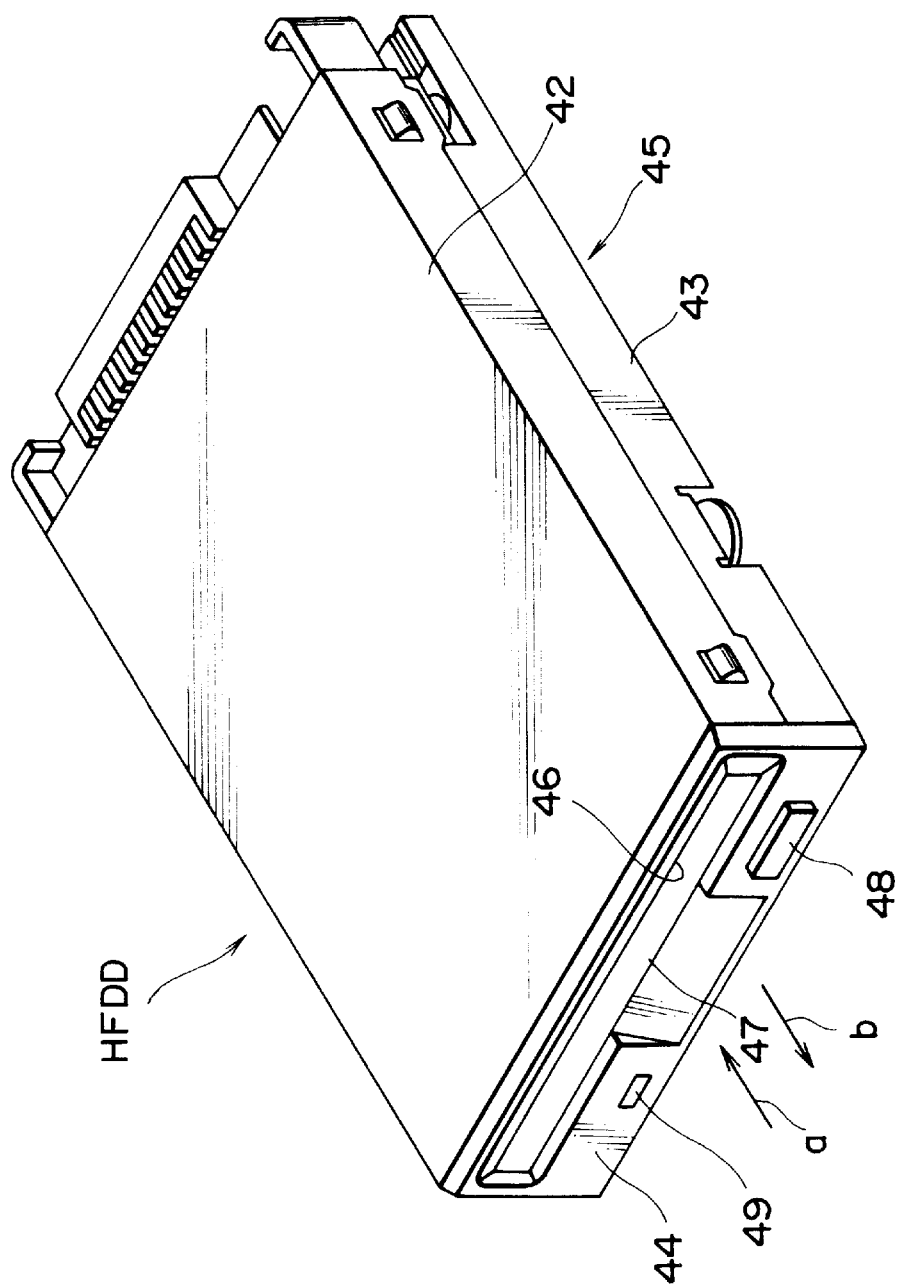
FIG. 1 is a diagram showing an external squint view of a floppy disk drive for driving a floppy disk cartridge with a large storage capacity as provided by the present invention.

The following is a description of an embodiment implementing a floppy disk cartridge with a large storage capacity and an embodiment implementing a floppy disk drive for driving a floppy disk with a large storage capacity through comparison with a floppy disk drive for driving a floppy disk with a small storage capacity in the following order:

(1) Description of a floppy disk cartridge with a small storage capacity and a floppy disk drive for driving the small storage capacity floppy disk cartridge
(2) Description of a floppy disk cartridge with a large storage capacity
(3) Introductory description of a floppy disk drive for driving a floppy disk cartridge with a large storage capacity
(4) Description of a linear actuator
(5) Description of members for installing a guide main shaft
(6) Description of Installation members of a guide auxiliary shaft and yokes
(7) Description of bearing members of the guide main shaft and the guide auxiliary shaft
(8) Description of a head assembly
(9) Description of a soft loading mechanism
(10) Description of a scale for tracking
(11) Description of a tracking servo
(12) Description of a dust shielding unit
(13) Description of a cleaning unit of the floppy disk (1) Description of a Floppy Disk Cartridge with a Small Storage Capacity and a Floppy Disk Drive for Driving the Small Storage Capacity Floppy Disk Cartridge The description begins with an explanation with reference to FIGS. 67 to 71. A floppy disk FD with a small storage capacity has a structure comprising a center core 2 and a floppy disk 1 stuck on the circumference of the center core 2, surrounding the center core 2. The floppy disk 1 is made of a magnetic sheet with a diameter of 3.5 inches. On the other hand, the center core 2 is a stainless disk-like plate. The small storage capacity floppy disk FD is accommodated in a floppy disk cartridge FDC designed for a floppy disk with a small storage capacity. The storage capacity of the floppy disk cartridge is set at a value in the range 1 to 2 MB (megabytes). The small storage capacity floppy disk cartridge FDC has a flat structure sandwiched by upper and lower shells 3 and 4 each made of synthesis resin. The structure constitutes a cartridge 5 which has an all but rectangular shape. The small storage capacity floppy disk FD is accommodated in the cartridge 5 in such a way that the floppy disk FD is freely rotatable.

The center core 2 of the small storage capacity floppy disk FD is put in a state of being loosely engaged with a center core hole 6 formed at the center of the lower cell 4. Between a front edge surface 5a of the cartridge 5 and the center core hole 6, a pair of upper and lower oblong head insertion holes 7 are bored along a cartridge center P1 on the upper and lower shells 3 and 4 respectively. The front edge surface 5a is the surface of an edge of the cartridge 5 on the side of insertion of a small storage capacity floppy disk cartridge FDC into the floppy disk drive FDD for a floppy disk with a small storage capacity in a direction indicated by an arrow a. A shutter 8 has a front edge vertical plate 8c and a pair of upper and lower horizontal plates 8a and 8b for opening and closing the upper and lower head insertion holes 7 respectively. The cross sections of the front edge vertical plate 8c and the upper and lower horizontal plates 8a and 8b constitute a U-shaped cross section of the shutter 8. The shutter 8 is installed on a shutter sliding dent 18 in such a way that the shutter 8 is freely slidable. The shutter sliding dent 18 is formed on the outer sides of upper and lower surfaces 5f and 5g and the front edge surface 5a of the cartridge 5 to form a U-like shape. To put it in detail, the shutter 8 is installed on the shutter sliding dent 18 in such a way that the shutter 5 is freely slidable along the front edge surface 5a in directions indicated by arrows c and d, that is, directions perpendicular to the direction of insertion indicated by the arrow a. It should be noted that the shutter 5 is naturally pressed in the direction indicated by the arrow c till a position of a closed cover state by a shutter spring 8d embedded in the shutter 8. Through the lower shell 4 of the cartridge 5, a pair of right and left positioning reference holes 9 are bored respectively at locations closer to the front edge surface 5a than the rear edge surface 5d of the cartridge 5. One of the positioning reference holes 9 has a truly round shape while the other has an elliptical shape. On the right and left surfaces 5b and 5c of the cartridge 5, respectively, a pair of right and left dents 10 each having a half round shape are formed at locations in close proximity to the front edge surface 5a of the lower shell 4. At a corner 11a between the front edge surface 5a and the right surface 5b of the cartridge 5, a slanting surface 12 for preventing in correct insertion is formed. The slanting surface 12 is a so-called C surface cutting the entire upper and lower shells 3 and 4 at an angle of 45 degrees. At a corner 11b between the rear edge surface 5d and the left surface 5c of the cartridge 5, a write protector 13 is provided for preventing inadvertent erasure of data recorded on the small storage capacity floppy disk FD. At a corner 11c between the rear edge surface 5d and the right surface 5b of the cartridge 5, a storage capacity identification hole 14 is formed.

On the inner wall surfaces 3b and 4b of the upper and lower shells 3 and 4, respectively, a pair of upper and lower cleaning sheets 15 are laid by using a sticking substance such as adhesive. The upper and lower cleaning sheets 15 are each a sheet of cloth cut into a shape resembling a horse shoe. A lifter or lifters 16 are stuck to either or both of inner wall surfaces 3a and 4a. The lifter or lifters 16 are used for bringing the upper and lower cleaning sheets 15 into elastic contact with the upper and lower recording surfaces FD1 of the small storage capacity floppy disk FD from positions above and below the floppy disk FD respectively. Thus, sandwiched by the upper and lower cleaning sheets 15, the small storage capacity floppy disk FD is driven into rotation at a disk surface position at a height of about H½ from the bottom surface 5g of the cartridge 5. Through the upper and lower horizontal plates 8a and 8b of the shutter 8, a pair of upper and lower oblong shutter holes 8e are bored at locations facing the head insertion holes 7 bored through the upper and lower shells 3 and 4 respectively. On the upper and lower surfaces 5f and 5g of the cartridge 5 on the upper and lower shells 3 and 4 respectively, there is provided a label sticking dent 17 with a shape detouring the rear edge surface 5d of the cartridge 5.

Figure 72:
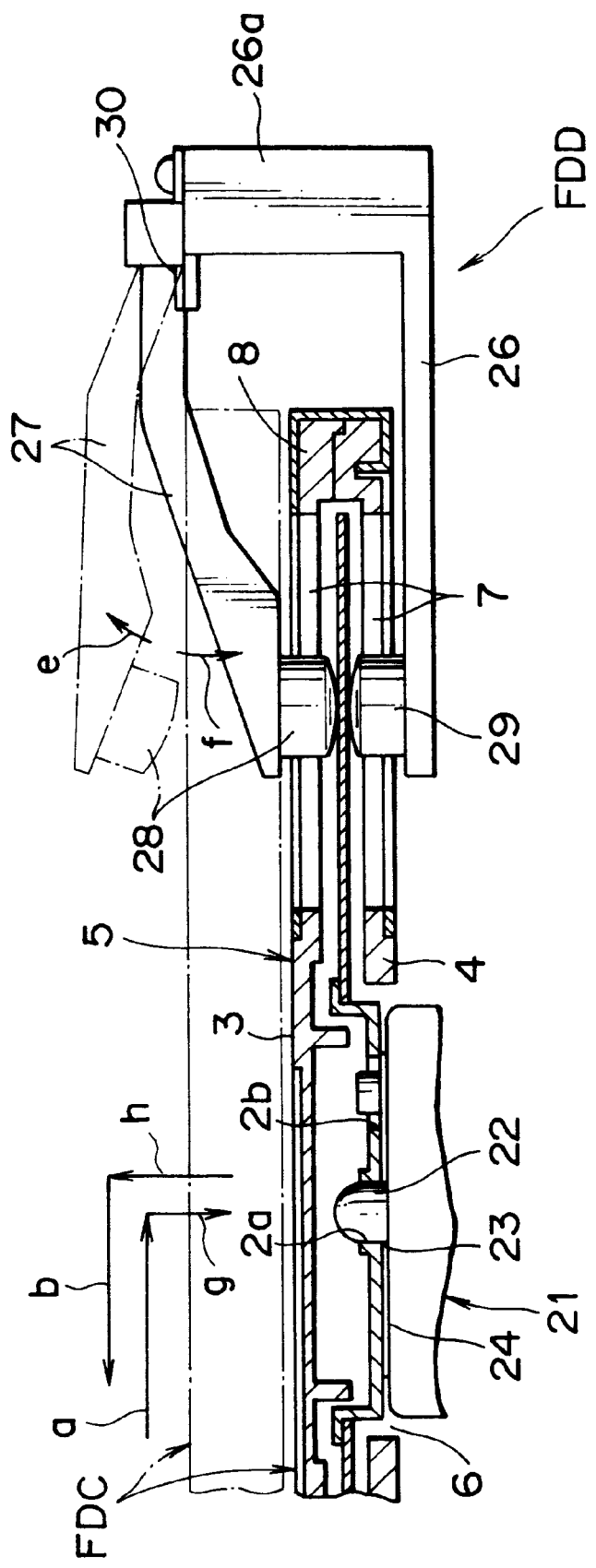
FIG. 72 is an explanatory diagram showing the conventional floppy disk drive for driving a floppy disk cartridge with a small storage capacity.

In addition, as shown in FIG. 72, inside the floppy disk small storage capacity floppy disk drive FDD, that is, a low-end floppy disk drive for recording and/or playing back data onto and/or from a floppy disk cartridge FDC having a small storage capacity, there are accommodated components such as a disk table 23 driven into rotation by a spindle 22 of a spindle motor 21 and a pair of upper and lower magnetic heads 28 and 29 attached to upper and lower mutually facing surfaces of a head arm 27 and a carriage 26 respectively by gimbal plates which are not shown in the figure. It should be noted that components including a magnetic sheet 24 for chucking an a rotation driving pin 25 of the small storage capacity floppy disk FD are attached to the upper surface of the disk table 23. The head arm 27 is installed on the top of a head arm installation base 26a of the carriage 26 by a plate spring 30 in such a way that the head arm 27 can freely be rotated in the upward and downward directions indicated by arrows e and f, respectively. The head arm 27 is naturally rotated in the downward direction indicated by the arrow f by a head attachment spring which is not shown in the figure. In this configuration, the carriage 26 is horizontally driven by a linear actuator in the directions indicated by the arrows a and b so that the upper and lower magnetic heads 28 and 29 are horizontally moved in the same direction simultaneously as a single body.

In this configuration, the lower magnetic head 29 is provided at a reference position at an altitude from a mechanical base which is not shown in the figure. On the other hand, the upper magnetic head 28 can be raised and moved down in the directions shown by the arrows e and f respectively by a mechanism for raising and moving down the upper magnetic head 28 between 2 head positions. One of the positions is an head unloading position at an altitude separated away from the lower magnetic head 29 by a predetermined distance as shown by a single-dot dashed line in FIG. 72. The other position is a head loading position at which the small storage capacity floppy disk FD is brought into contact with the tip of the lower magnetic head 29 by a pressure as shown by a solid line in the same figure. It should be noted that the mechanism for raising and moving down the upper magnetic head 28 is not shown in the figure.

Before starting an operation to load the small storage capacity floppy disk cartridge FDC into the small storage capacity floppy disk drive FDD, the upper magnetic head 28 is elevated in the direction indicated by the arrow e to the head unloading position shown by the single-dot dashed line in FIG. 72. Then, the small storage capacity floppy disk cartridge FDC is horizontally inserted into a cartridge loading mechanism not shown in the figure to an cartridge unloading position higher than the lower magnetic head 29 but lower than the upper magnetic head 28 as shown by a single-dot dashed line in a direction indicated by the arrow a before the small storage capacity floppy disk cartridge FDC is moved down vertically by the cartridge loading mechanism in a parallel movement to a cartridge loading position shown ba solid line. As a result, the small storage capacity floppy disk cartridge FDC brought to the cartridge loading position is mounted and settled levelly at a fixed location on a total of 4 cartridge positioning pins not shown in the figure inside the small storage capacity floppy disk drive FDD. Thus, the small storage capacity floppy disk cartridge FDC can be loaded without any interference by the lower and upper magnetic heads 28 and 29.

Figure 69:
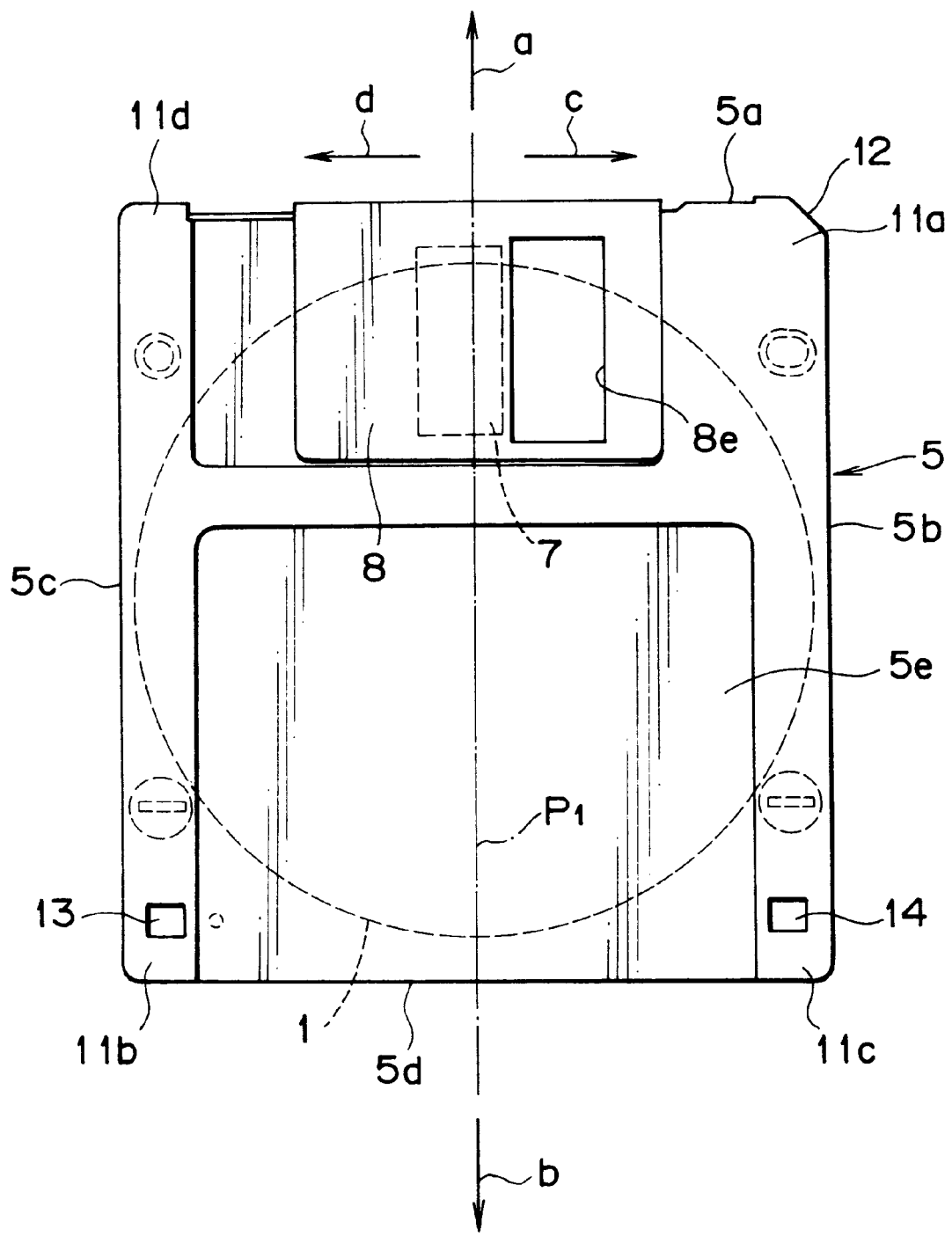
FIG. 69 is a diagram showing a top view of the conventional floppy disk cartridge shown in FIG. 67.
Figure 70:
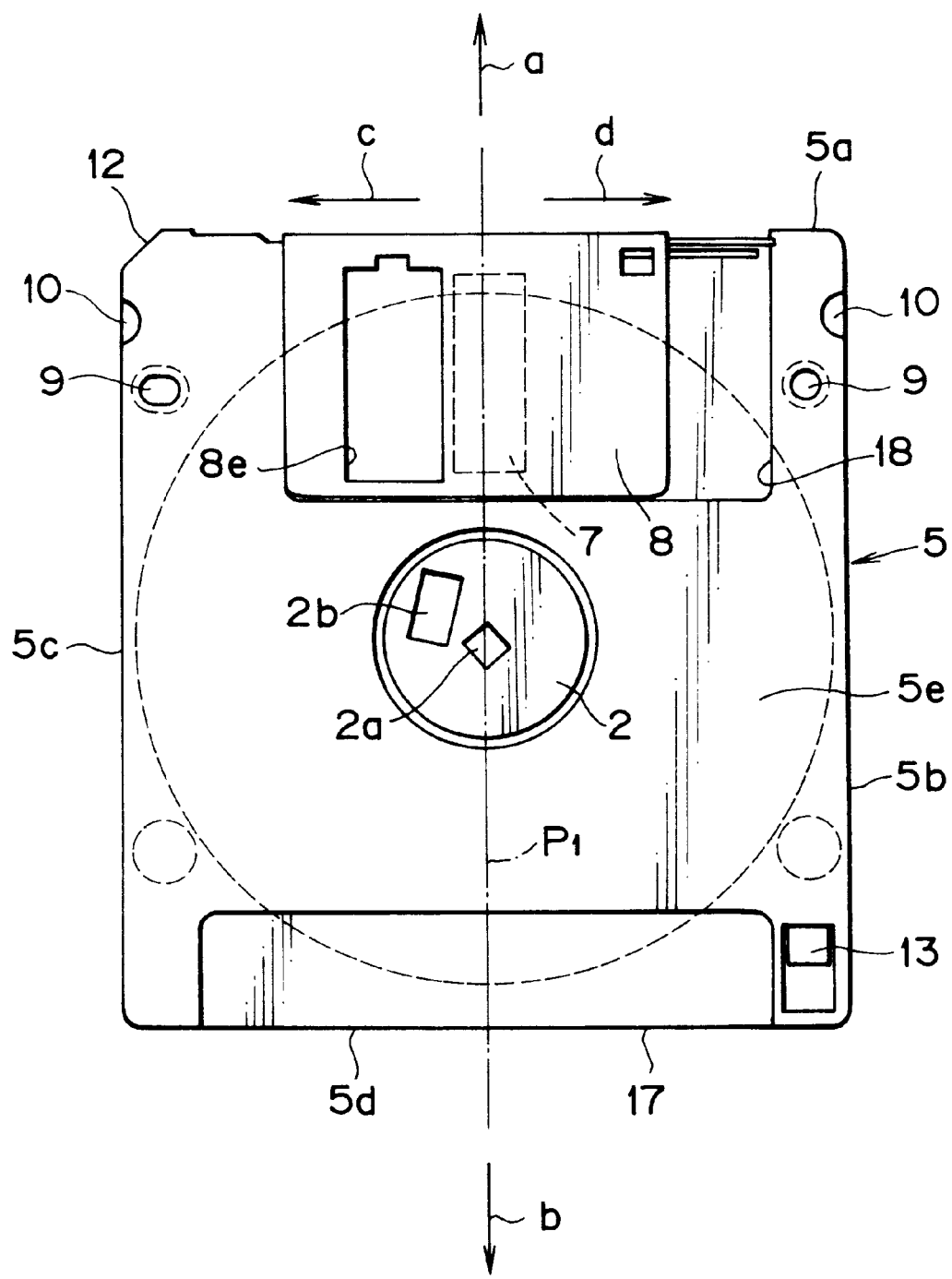
FIG. 70 is a diagram showing a bottom view of the conventional floppy disk cartridge shown in FIG. 67.
Figure 71:
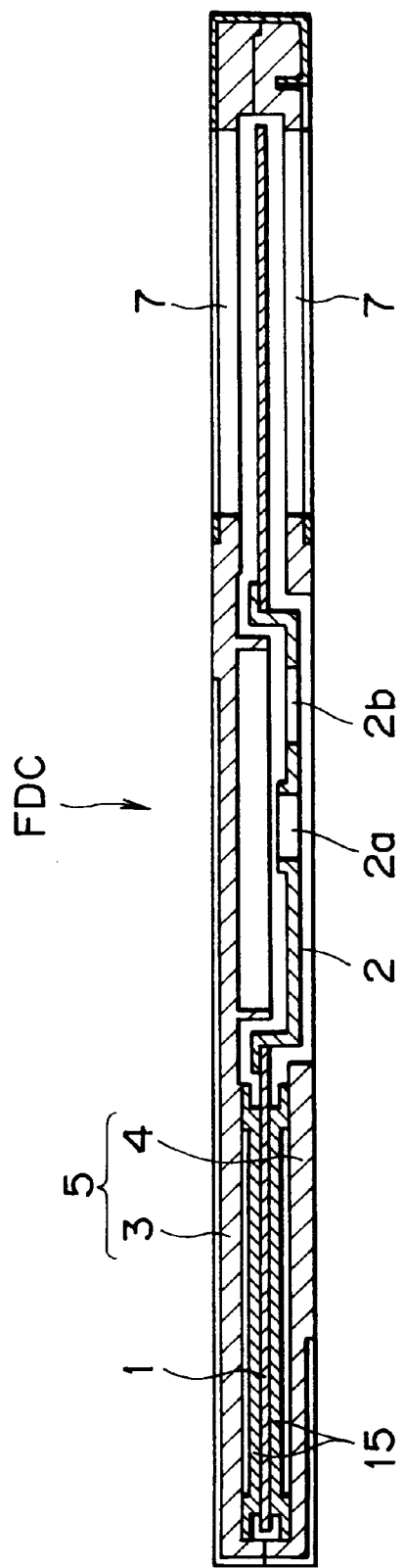
FIG. 71 is a diagram showing a cross section of the floppy disk cartridge shown in FIG. 67.

While the small storage capacity floppy disk cartridge FDC is being horizontally inserted into the loading position in the direction indicated by the arrow a, the shutter 8 of the small storage capacity floppy disk cartridge FDC is sled in a direction indicated by the arrow d by a shutter opening/closing mechanism installed inside the small storage capacity floppy disk drive FDD from a closed cover position shown in FIGS. 69 and 70 to an open cover position shown in FIG. 71, resisting a force generated by a shutter spring 8d, and the upper and lower oblong shutter holes 8e and 8f are put in a state of being vertically engaged with the upper and lower head insertion holes 7 respectively. Then, the upper and lower oblong shutter holes 8e and 8f and the upper and lower head insertion holes 7 of the cartridge 5 are inserted vertically into upper and lower inner sides of the upper and lower magnetic heads 28 and 29 respectively. It should be noted that the shutter opening/closing mechanism itself is not shown in the figure.

Then, when the small storage capacity floppy disk cartridge FDC is moved down vertically from the cartridge unloading position to the cartridge loading position in a direction indicated by an arrow g as shown by the solid line in FIG. 72, the center core 2 of the floppy disk cartridge FD with a small storage capacity is chucked onto the magnetic sheet 24 of the disk table 23 and the spindle 22 is put in a state of being mutually engaged with a center hole 2a of the center core 2 from a position beneath the center hole 2a. At the same time, the rotation driving pin 25 on the disk table 23 is put in a state of being mutually engaged with a rotation driving pin engagement hole 2b formed at an eccentric position of the center core 2 from a location beneath the rotation driving pin engagement hole 2b. In addition, when the small storage capacity floppy disk cartridge FDC is moved down vertically from the unloading position to the loading position in the direction indicated by the arrow g, the head arm 27 is rotated down in a direction indicated by the arrow f by a head pressing spring from the head unloading position to the head loading position and, at the same time, the upper magnetic head 28 is thus moved down from the head unloading position to the head loading position in the direction indicated by the arrow f. As a result, the upper and lower heads 28 and 29 are relatively inserted into the upper and lower shutter holes 8e and the upper and lower head insertion holes 7 in the directions indicated by the arrows g and h. In addition, the upper and lower heads 28 and 29 are respectively brought into contact with the upper and lower surfaces of the floppy disk cartridge FD with a small storage capacity in the cartridge 5.

With the upper and lower heads 28 and 29 put in such a state, the operation to load the small storage capacity floppy disk cartridge FDC into the small storage capacity floppy disk drive FDD is completed. In this state, the disk table 23 is driven into rotation by the spindle motor 21 and the center core 2 is driven into rotation by the rotation driving pin 25. As a result, the small storage capacity floppy disk FD is driven into rotation in the cartridge 5 at a low rotational speed typically in the range 200 to 250 rpm. In this state, the small storage capacity floppy disk FD is driven into rotation with the upper and lower recording surfaces FD1 thereof remaining in contact with the upper and lower cleaning sheets 15 respectively as they are so that the upper and lower recording surfaces FD1 of the small storage capacity floppy disk FD are automatically cleaned by the upper and lower cleaning sheets 15 respectively. In addition, the carriage 26 and the head arm 27 are driven horizontally by the linear actuator in the directions indicated by the arrows a and b as a single body, letting the upper and lower magnetic heads 28 and 29 scan the small storage capacity floppy disk FD in the directions indicated by the arrows a and b in the so-called seek and tracking operations in order to record and/or play back data onto and/or from the small storage capacity floppy disk FD. It should be noted that the linear actuator itself is not shown in the figure.

It is worth noting that an operation to unload the floppy disk cartridge FDC having a small storage capacity to the outside of the floppy disk drive FDD for driving a floppy disk cartridge having a small storage capacity after the recording or playback operation performed on the small storage capacity floppy disk FD is an inverse operation opposite to the loading process described above. To put in detail, when the floppy disk cartridge FDC having a small storage capacity is vertically elevated by the cartridge loading mechanism in the direction indicated by the arrow h in a parallel movement from the cartridge loading position shown by the solid line in FIG. 72 to the cartridge unloading position shown by the single-dot dashed line in the same figure, the center core 2 departs from the disk table 23 in the upward direction and the head arm 27 is rotated in the direction indicated by the arrow e from the head loading position to the head unloading position, resisting a force generated by a head pressing spring. At the same time, the upper magnetic head 28 is elevated in the direction indicated by the arrow e from the head loading position shown by the solid line in FIG. 72 to the head unloading position shown by the single-dot dashed line in the same figure and the upper and lower magnetic head 28 and 29 depart from the cartridge 5 in the upward and downward directions respectively. Then, when the floppy disk cartridge FDC having a small storage capacity is expelled horizontally from the unloading position in the direction indicated by the arrow b to the outside of the floppy disk drive FDD for driving a floppy disk cartridge having a small storage capacity, the shutter 8 is sled in the direction indicated by the arrow c by the shutter spring 8d from the open cover position shown in FIG. 71 to the closed cover position shown in FIGS. 60 and 70. As a result, the upper and lower head insertion holes 7 of the cartridge 5 are covered by the upper and lower horizontal plates 8a and 8b of the shutter 8.

(2) Description of a Floppy Disk Cartridge with a Large Storage Capacity

Figure 64:
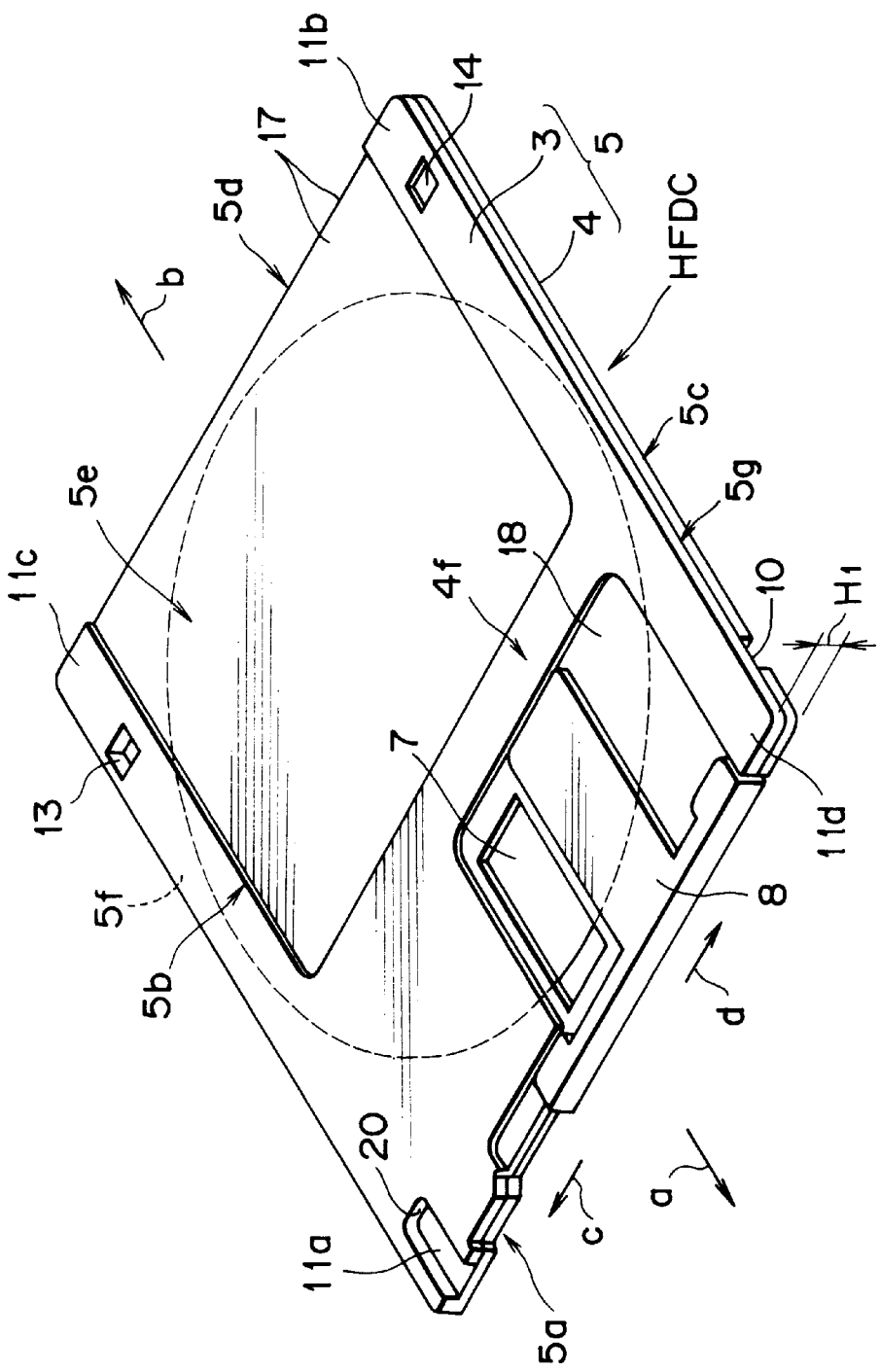
FIG. 64 is a diagram showing a squint view of a floppy disk cartridge with a large storage capacity.
Figure 65:
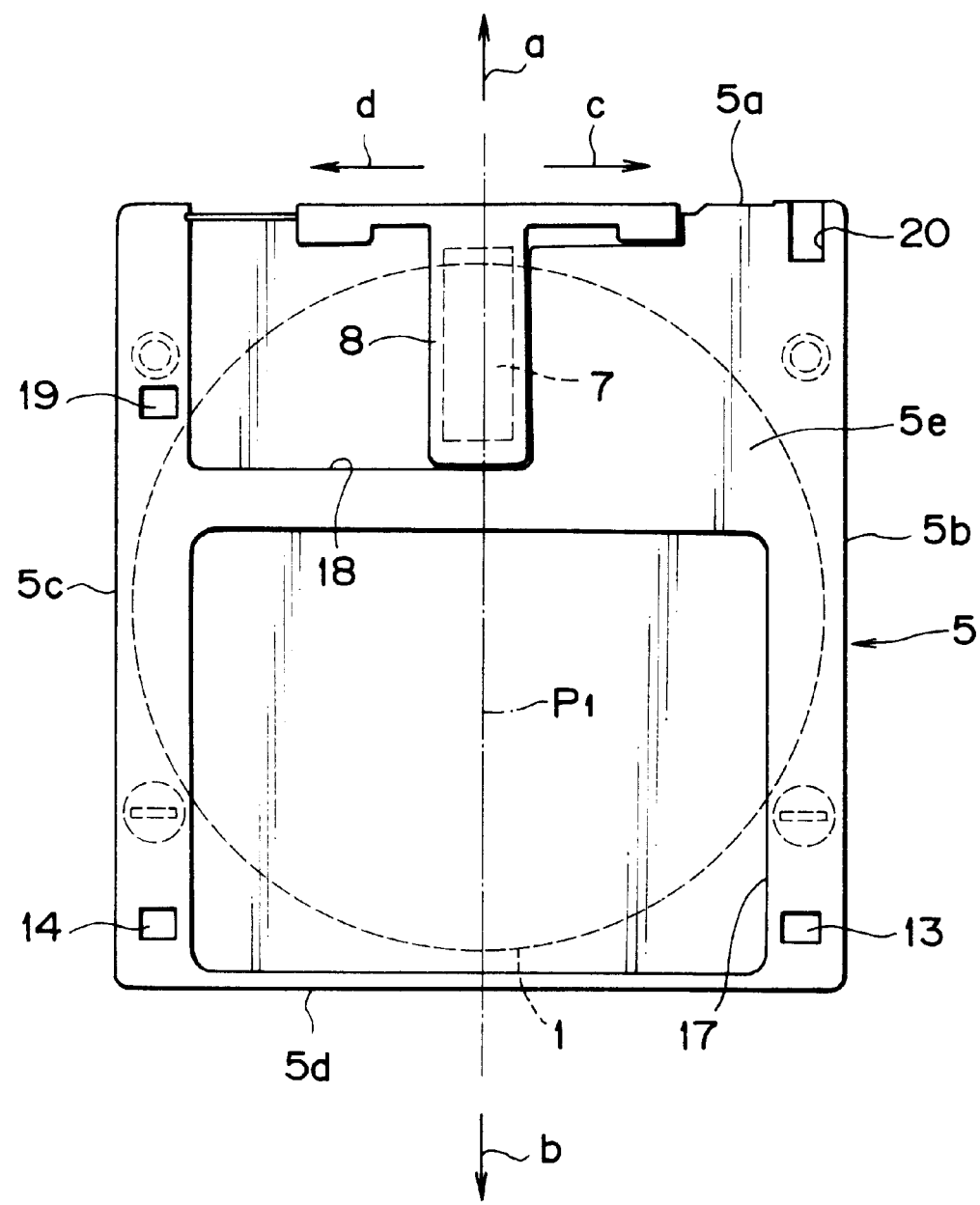
FIG. 65 is a diagram showing a top view of the floppy disk cartridge shown in FIG. 64.
Figure 67:
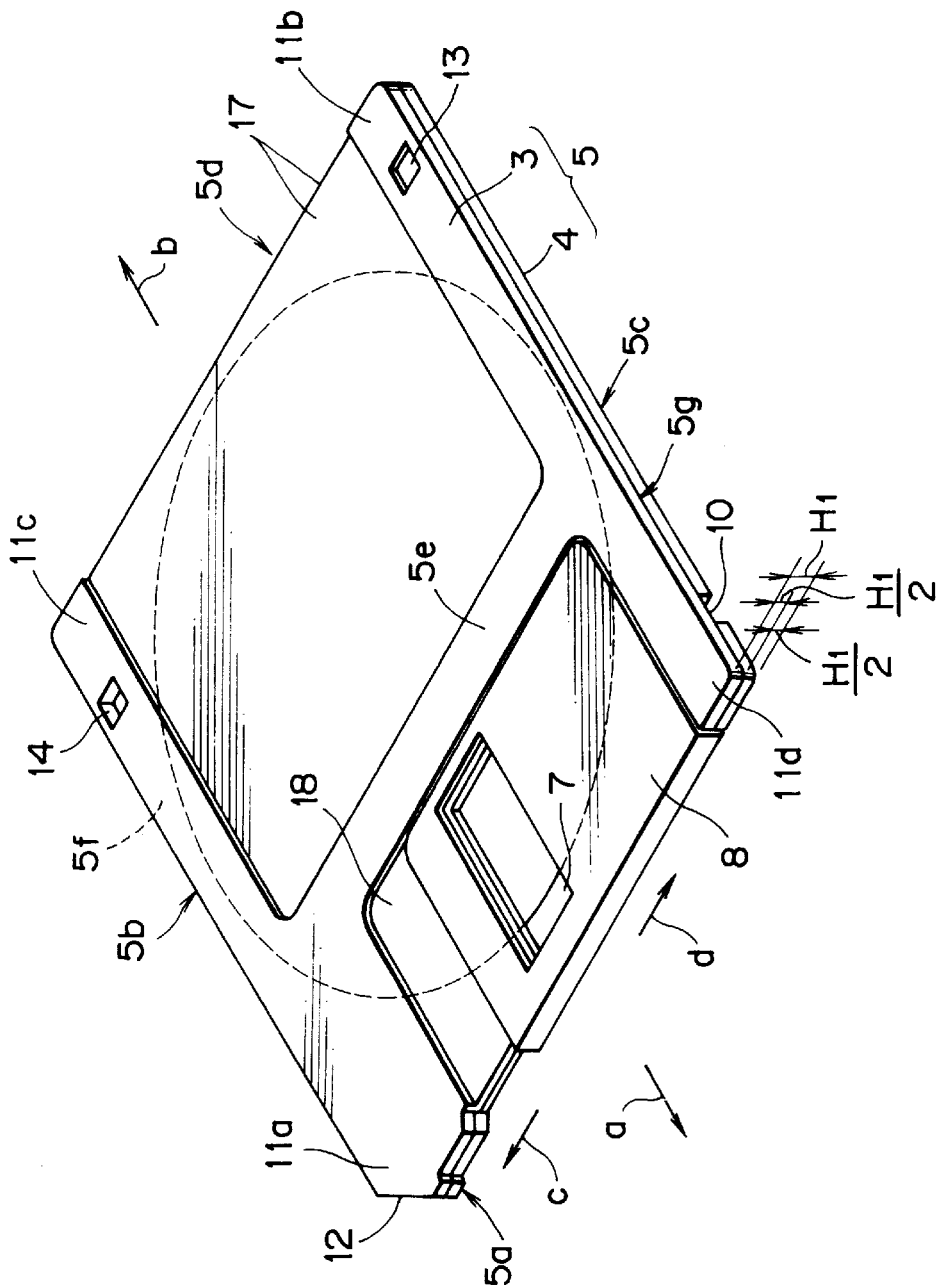
FIG. 67 is a diagram showing a squint view of the conventional floppy disk cartridge with a small storage capacity.
Figure 68:
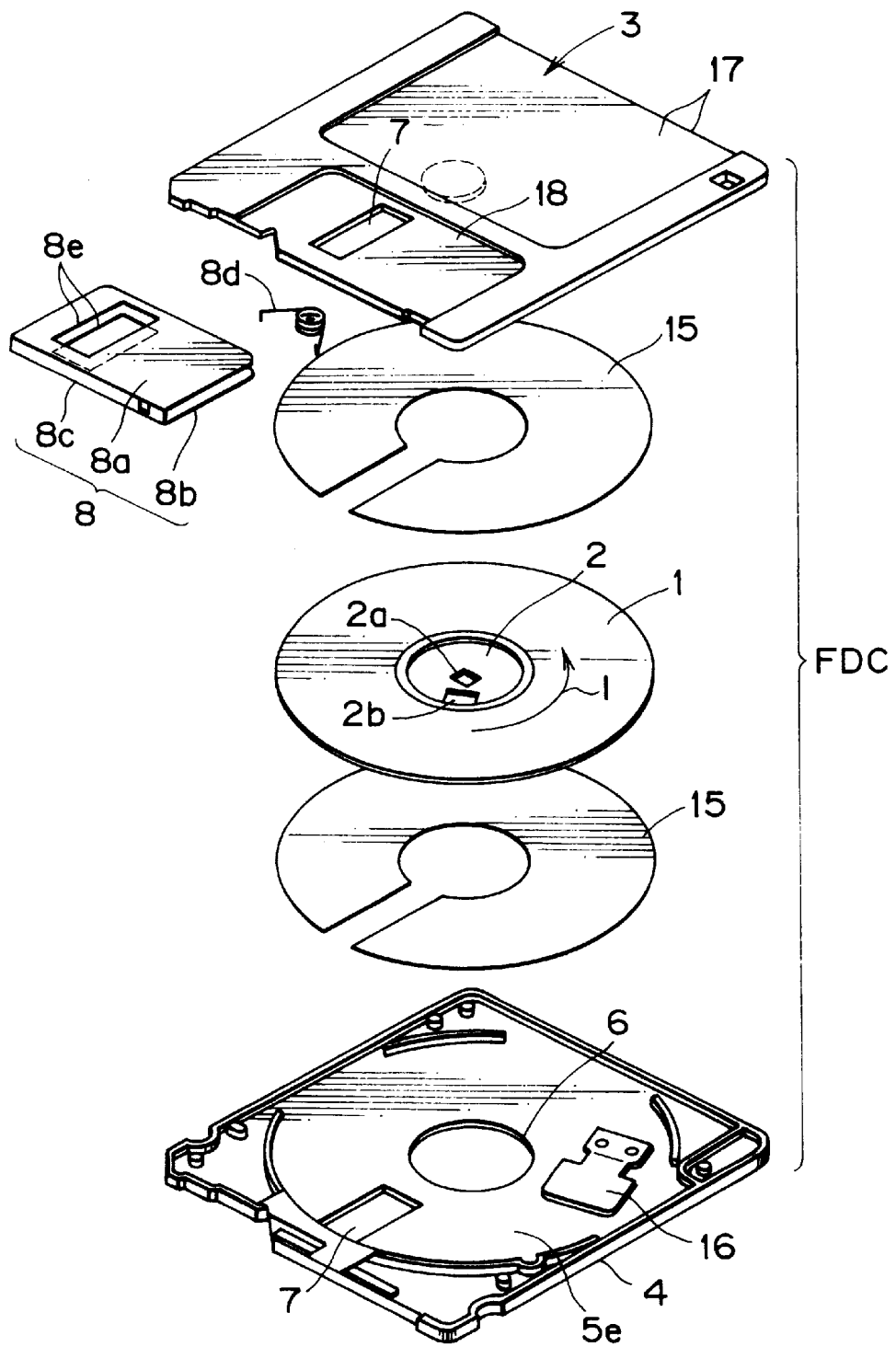
FIG. 68 is a diagram showing a squint view of the conventional floppy disk cartridge shown in FIG. 67 in a disassembled state.

A floppy disk cartridge HFDC with a large storage capacity driven by a large storage capacity floppy disk drive HFDD to be described later in recording and/or playback operations is described by referring to FIGS. 64 to 66. Much like the floppy disk cartridge FDC having a small storage capacity, a floppy disk HFD with a large storage capacity has a structure comprising a center core 2 and a floppy disk 1 stuck on the circumference of the center core 2, surrounding the center core 2. The floppy disk 1 is made of a magnetic sheet with a diameter of 3.5 inches. On the other hand, the center core 2 is a stainless disk-likeplate. The floppy disk HFD is accommodated in a large storage capacity floppy disk cartridge HFDC for use by an HFDD to record and play back data onto and from a floppy disk cartridge with a large storage capacity. As will be described later, the floppy disk drive HFDD for driving a floppy disk cartridge having a large storage capacity is a drive for driving a floppy disk cartridge with a large storage capacity. The large storage capacity floppy disk cartridge HFDC is sandwiched by upper and lower shells 3 and 4 each made of synthesis resin to form a structure of a cartridge 5. The large storage capacity floppy disk HFD is accommodated in the cartridge 5 in such a way that the floppy disk HFD is freely rotatable. The storage capacity of the large storage capacity floppy disk HFD is at least 100 MB. In order to increase the storage capacity of the large storage capacity floppy disk HFD to a desired value in the range 300 to 700 MB, magnetic films applied to upper and lower recording surfaces HFD1 of the large storage capacity floppy disk HFD have a small thickness of the sub micron order. The rotational speed of the large storage capacity floppy disk HFD can be set at a value in a high speed range of at least 3,600 rpm.

In order to make the floppy disk cartridge HFDC having a large storage capacity compatible with the floppy disk cartridge FDC having a small storage capacity with a storage capacity in the range 1 to 2 MB in an application to the floppy disk drive HFDD for driving a floppy disk cartridge having a large storage capacity to be described later, the external dimensions and the thickness of the cartridge of the floppy disk cartridge HFDC having a large storage capacity are made equal to the external dimensions and the thickness of the cartridge of the floppy disk cartridge FDC having a small storage capacity respectively. In addition, in order to allow the floppy disk drive HFDD for driving a floppy disk cartridge having a large storage capacity to distinguish a floppy disk cartridge HFDC having a large storage capacity and a floppy disk cartridge FDC having a small storage capacity from each other, the locations of the write protector 13 and the storage capacity identification hole 14 on the floppy disk cartridge HFDC having a large storage capacity are swapped with each other, and a large storage capacity identification hole 18 is newly formed on the floppy disk cartridge HFDC having a large storage capacity at a location in close proximity to one of the positioning reference holes 9 each having the truly round shape. It should be noted that, in the case of the floppy disk cartridge HFDC having a large storage capacity, the plane shape of the shutter 8 is designed into a T-like form for, among other purposes, increasing the internal effective area of the cartridge 5, and a groove 20 for preventing incorrect cartridge insertion is formed at a corner 11a at one end of the front edge surface 5a on the upper surface 5e of the cartridge 5. The groove 20 corresponds to the slanting surface 12 for preventing incorrect cartridge insertion provided on the floppy disk cartridge FDC having a small storage capacity. It is worth noting that the rotation driving pin engagement hole 2b formed on the center core 2 of the floppy disk 1 of the floppy disk cartridge HFDC having a large storage capacity is sufficiently larger than the rotation driving pin engagement hole 2b formed on the center core 2 of the floppy disk 1 of the floppy disk cartridge FDC having a small storage capacity.

(3) Introductory Description of a Floppy Diskdrive for Driving a Floppy Disk Cartridge with a Large Storage Capacity A floppy disk drive HFDD for a floppy disk cartridge with a large storage capacity is described by referring to FIGS. 1 to 8. As shown in the figures, an HFDD provided by the present invention is a typical high-end disk drive apparatus having a chassis 41 made of a sheet metal or a light metal such as an aluminum die cast. Upper and lower covers 42 and 43 each made of a sheet metal with a small thickness are placed respectively on and beneath the chassis 41 in such a way that the covers 42 and 43 can freely be mounted and removed on and from the chassis 41. On the front side of these components, a front panel 44 made of a material such as synthesis resin is provided in such a way that the front panel 44 can freely be mounted and removed on and from the chassis 41. The upper and lower covers 42 form a drive main body 45 having a flat cubic shape in conjunction with the front panel 44. The external dimensions and the thickness of the drive main body 45 are the same as those of the floppy disk drive FDD for driving a floppy disk cartridge having a small storage capacity. On the upper of the front panel 44, a cartridge insertion window 46 having a horizontal oblong shape is provided and, on the inner side of the cartridge insertion window 46, an opening/closing cover 47 is provided. The opening/closing cover 47 is opened in the inward direction. At right and left locations on the lower of the front panel 44, an inject button 48 and a light emitting display unit 49 are provided. The light emitting display unit 49 is turned on to indicate that the floppy disk drive HFDD is put in an operating state.

Inside the drive main body 45, a spindle motor 51 is provided above the chassis 41 at a place on the side of the front panel 44 and a disk table 53 is mounted above the spindle motor 51. To put it in detail, the disk table 53 is put on the upper surface of a rotor fixed on the upper end of a spindle 52. On the upper surface of the disk table 53, components such as a magnetic sheet 54 for chucking a small storage capacity floppy disk and a rotation driving pin 25 of the small storage capacity floppy disk FD are provided.

Above the chassis 41 at a place on the side of the front panel 44, a cartridge loading mechanism 58 is provided. The cartridge loading mechanism 58 comprises a cartridge holder 56 made of typically a sheet metal and a slide plate 57 also made typically of a sheet metal. The slide plate 57 is used for driving the cartridge holder 56 up and down in directions indicated by arrows g and h in a parallel movement between a cartridge unloading position and a cartridge loading position. On the other hand, above the chassis 41 at a place on the rear edge side, that is, on a side opposite to the side of the front panel 44, a linear actuator 103 is provided. As will be described later, the linear actuator 103 is used for transporting a pair of upper and lower magnetic heads 101 and 102 constituting a flying head assembly. It should be noted that the spindle motor 51 and the upper and lower magnetic heads 101 and 102 are placed above a scanning center P2 which is a line of scanning positions for recording and/or playing back data onto and/or from the floppy disk 1. Beneath the chassis 41, on the other hand, a plurality of circuit boards are secured by machine screws in a horizontal posture. The circuit boards include a motor board 59, a main board 60 and a switch board 61. On the rear edge of the chassis 41, an interface board 63 is secured by machine screws in a horizontal posture. The interface board 63 includes an external interface unit 62. Above the chassis 41 at positions below the 4 corners of the cartridge holder 56, a pair of right and left positioning reference pins 64 and a pair of height reference pins 65 are provided in a vertical posture. The positioning reference pins 64 are each used also as a height reference pin. Mounted on the switch board 61 as push switches, a cartridge insertion detection switch 66, an inadvertent erasure prevention detecting switch 67, a small storage capacity detection switch 68 and a large storage capacity detection switch 69 penetrate the chassis 41 and the slide plate 57, protruding to a space below the cartridge holder 56. It should be noted that an inject switch 70 is mounted on the lower surface of the front edge of the switch board 61. By the front edge, the edge on the side of the front panel 44 is implied. The inject switch 70 is turned on by the inject button 48.

It should be noted that, as shown in FIGS. 52 to 56, the chassis 41 has a horizontal bottom plate 41a and right and left plates 41b each erected upward in a vertical posture on the right and left sides of the bottom plate 41a respectively. The spindle motor 51 is secured by machine screws through a total of 3 spacers 71 on the motor board 59 below the bottom plate 41a of the chassis 41. The spindle table 53 mounted above the spindle motor 51 is exposed to a space above the bottom plate 41a through an opening 72 bored through the bottom plate 41a. The cartridge holder 56 comprises a horizontal ceiling plate 56a, right and left plates 56b installed downward in a vertical posture on the right and left sides of the ceiling plate 56a, and a pair of bottom plates 56c formed by bending inward the lower ends of the right and left plates 56b horizontally. The entire cross section of the cartridge holder 56 thus has a flat U-like shape. The floppy disk cartridge HFDC having a large storage capacity or the floppy disk cartridge FDC having a small storage capacity is inserted and pulled out horizontally into and from a cartridge insertion space 56d enclosed by the ceiling plate 56a, the right and left plates 56b and the right and left bottom plates 56c of the cartridge holder 56 in directions indicated by arrows a and b. A head insertion opening 73 is formed by cutting out an area of the ceiling plate 56a of the cartridge holder 56 at the center on the rear end side, that is, a side opposite to the side of the front panel 44. Much like the chassis 41, the slide plate 57 has a horizontal bottom plate 57a and right and left plates 57b each erected upward in a vertical posture on the right and left sides of the bottom plate 57a respectively. The slide plate 57 is put in a state of being engaged with a total of 4 pins, namely, the positioning reference pins 64 and the height reference pins 65, in such a way that the slide plate 57 is freely slidable along a total of 4 guide grooves 74 formed on the bottom plate 57b. To be more specific, the slide plate 57 is so designed that the slide plate 57 is freely slidable over the bottom plate 41a of the chassis 41 between an cartridge unloading position P11 and a cartridge loading position P12 in the directions indicated by the arrows a and b.

As shown in FIGS. 2, 3, 4, 7 and 8, the cartridge loading mechanism 58 comprises a total of 4 guide pins 75, a total of 4 slanting guide grooves 76, a pair of right and left guide protrusions 77 and a pair of right and left vertical guide grooves 78. The 4 guide pins 75 are formed by a drawing process on the front and rear edges of the right and left plates 56b of the cartridge holder 56. The 4 slanting guide grooves 76 are formed on the right and left plates 57b of the slide plate 57. The 4 guide pins 75 are in a state of being engaged with the 4 respective slanting guide grooves 76 in such a way that the 4 guides 75 are freely slidable along the 4 respective slanting guide grooves 76. The right and left guide protrusions 77 are integrated at approximately the longitudinal direction centers of the right and left plates 56b of the cartridge holder 56. The right and left vertical guide grooves 78 are formed respectively on the right and left plates 41b of the chassis 41. The right and left guide protrusions 77 are in a state of being engaged with the right and left vertical guides grooves 78 respectively in such a way that the right and left guide protrusions 77 can be sled freely along the right and left vertical guides grooves 78 respectively. It should be noted that the slide plate 57 is sled naturally by a pull coil spring 79 installed between the slide plate 57 and the chassis 41 in an onward direction, that is, the direction indicated by the arrow b. The pull coil spring serves as a means for sliding the slide plate 57. An eject motor 80 is installed on one part of the rear edge side, that is, a side opposite to the side of the front panel 44, on the bottom plate 41a of the chassis 41. An eject cam 82 is attached to the eject motor 80. An eject driving pin 81 is provided at an eccentric location of the eject cam 82. In this configuration, the eject driving pin 81 drives an eject arm 83 which protrudes backward from the rear end of one of the side plates 57b of the slide plate 57. At a front side location (that is, a location on the side of the front panel 44) of the eject motor 80 on the bottom plate 41a of the chassis 41, a cartridge insertion detecting lever 84 used also as a shutter opening/closing lever is installed in such a way that the lever 84 is freely rotatable in directions indicated by arrows i and j with a support pin 85 serving as a center of rotation between a lock position shown by a solid line in FIG. 4 and a lock-released position shown by a single-dot dashed line in the same figure. The cartridge insertion detecting lever 84 is naturally rotated in the direction indicated by the arrow i till the lock position by a rotation forcing means which is not shown in the figure. The cartridge insertion detecting lever 84 is designed into a configuration with functions to lock a locked unit 86 and release the locked unit 86 from a locked state. The locked unit 87 is provided on the slide plate 57.

Figure 3:
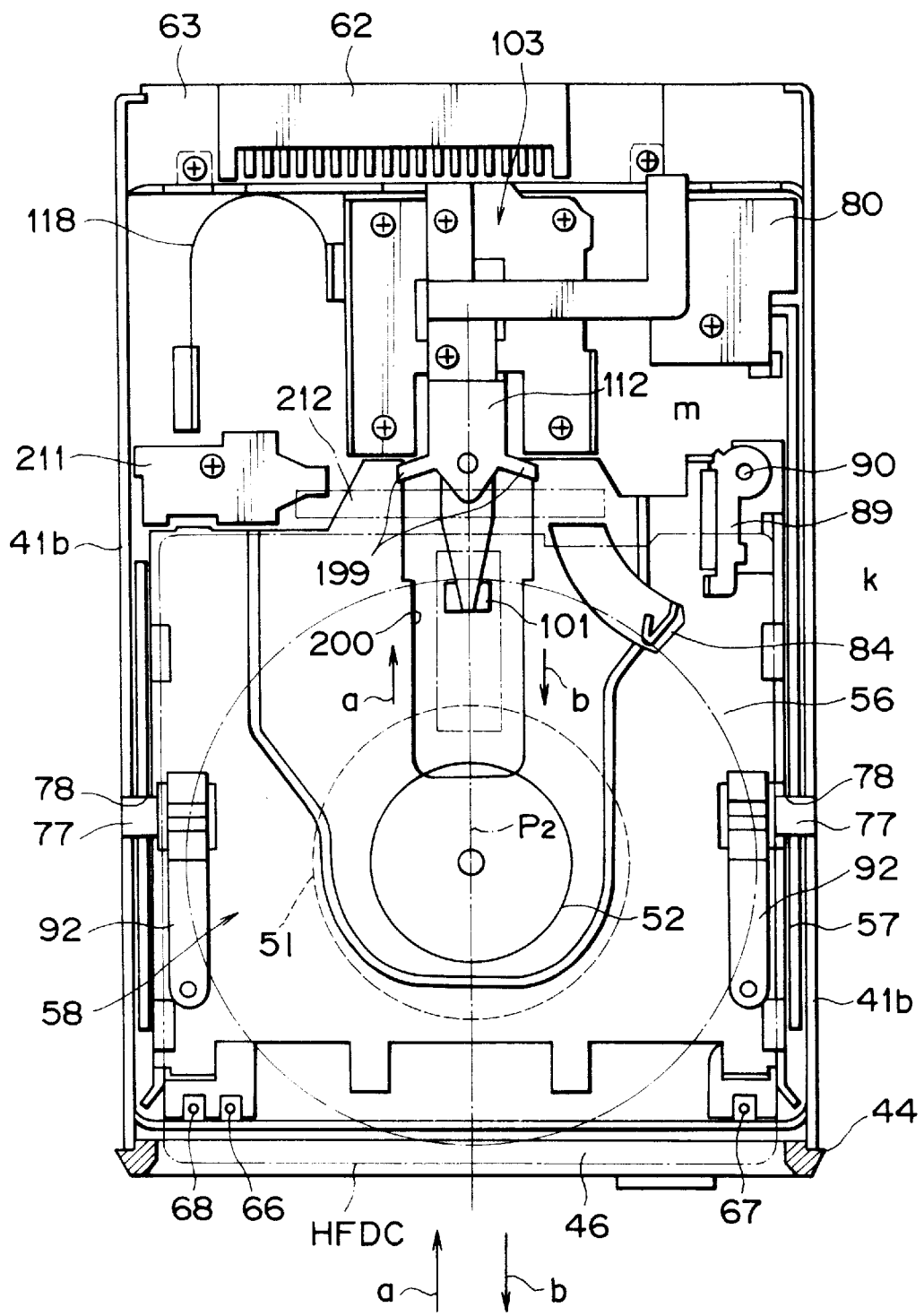
FIG. 3 is a diagram showing a top view of the floppy disk drive shown in FIG. 1 with the top cover thereof removed.
Figure 4:
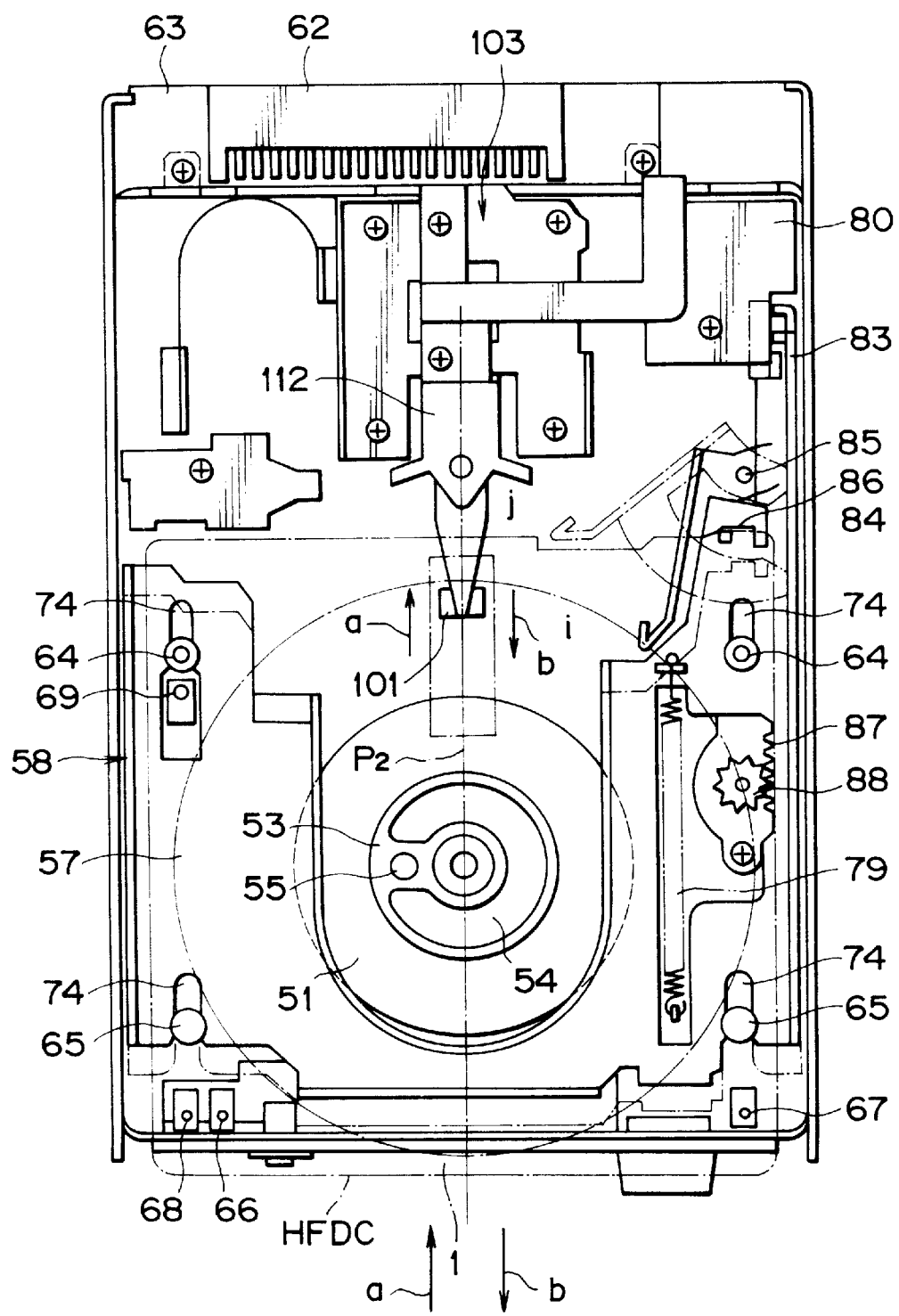
FIG. 4 is a diagram showing the top view shown in FIG. 3 with a cartridge holder removed.
Figure 5:
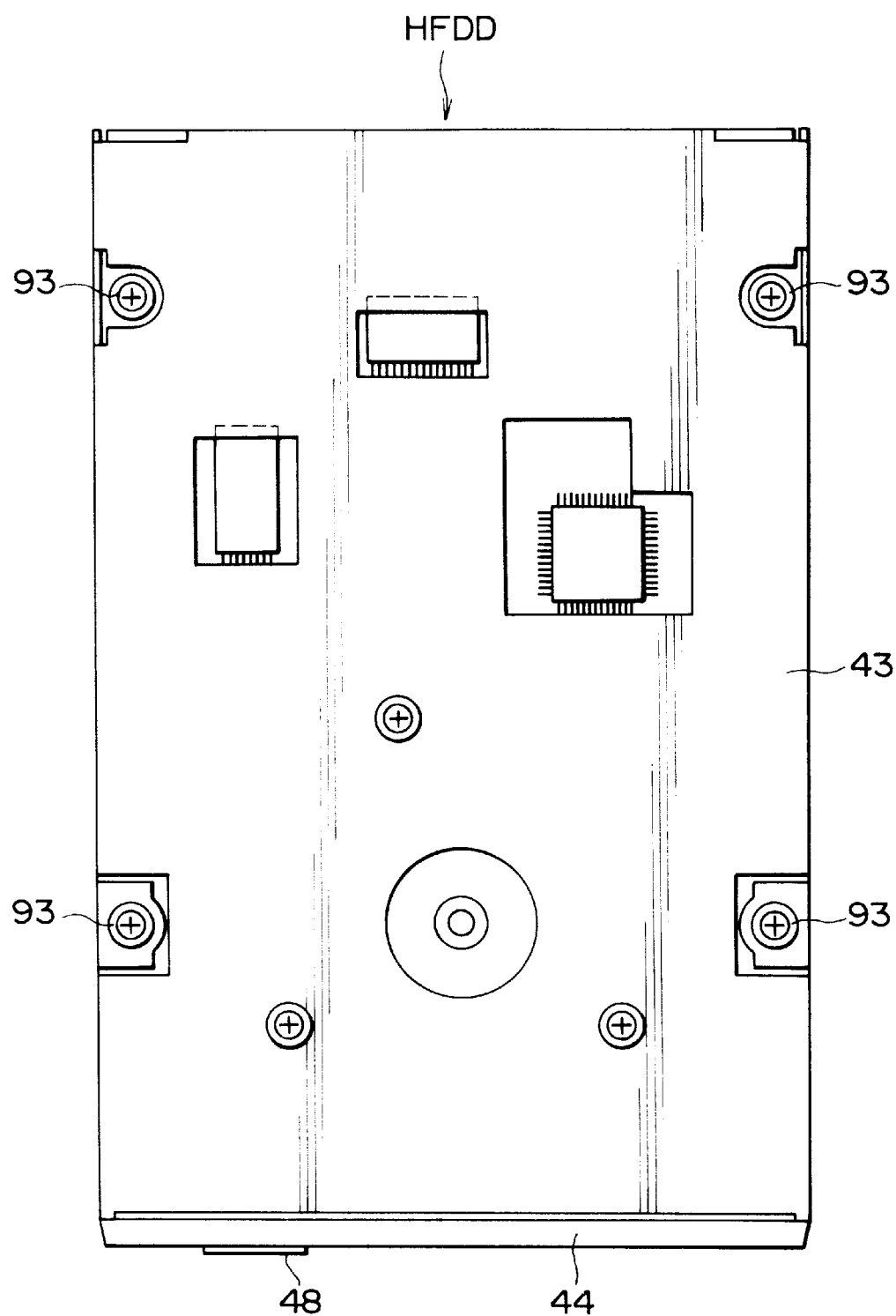
FIG. 5 is a diagram showing a bottom view of the floppy disk drive shown in FIG. 1.
Figure 6:
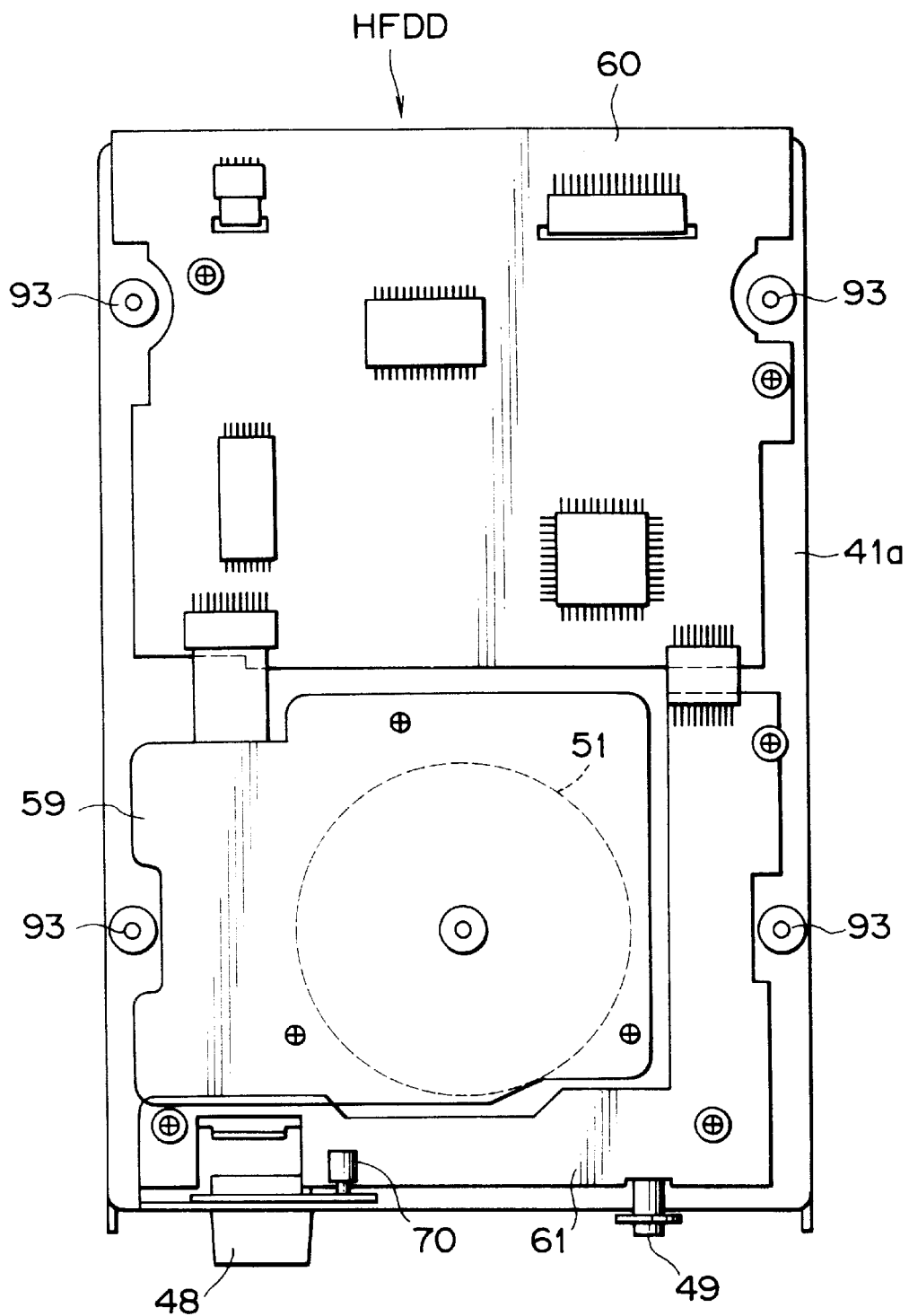
FIG. 6 is a diagram showing a bottom view of the floppy disk drive shown in FIG. 1 with the bottom cover thereof removed.

As shown in FIGS. 4 to 7, according to the cartridge loading mechanism 58, when the slide plate 57 is sled backward in the direction indicated by the arrow a till an unloading position P11, resisting a force generated by a pull coil spring 79, the slide plate 57 is locked by the cartridge insertion detecting lever 84 put in a state of being engaged with the locked unit 86 of the slide plate 57. In this state, the 4 guide pins 75 of the cartridge holder 56 are pushed upward in the direction indicated by the arrow h by the 4 slanting guide grooves 78 of the slide plate 57. As a result, while the right and left guide protrusions 77 are being guided by the right and left vertical guide grooves 78 respectively, the cartridge holder 56 is driven to move upward in a parallel movement till an unloading position P13 at the same altitude as the cartridge insertion window 46 shown in FIG. 7. Then, when the cartridge insertion detecting lever 84 is rotated in the direction indicated by the arrows j from the lock position shown by the solid line in FIG. 4 to the lock-released position shown by the single-dot dashed line in the same figure, the slide plate 57 is released from the locked state imposed by the cartridge insertion detecting lever 84, and the slide plate 57 is sled by the pull coil spring 79 in the direction indicated by the arrow b from the unloading position P11 shown in FIG. 7 to a loading position P12 in the front. At the same time, the 4 guide pins 75 of the cartridge holder 56 are pushed downward in the direction indicated by the arrow g by the 4 slanting guide grooves 78 of the slide plate 57. In addition, while the right and left guide protrusions 77 are being guided by the right and left vertical guide grooves 78 respectively, the cartridge holder 56 is driven to move downward in a parallel movement till a loading position P14 set beneath the unloading position P13. The loading position P14 is shown by a solid line in FIG. 8A. It should be noted that, at that time, the slide plate 57 is sled in the direction indicated by the arrow b at a low speed as shown in FIG. 4 due to a damping effect of a damper 88 put in a state of being engaged with a rack 87 formed on the slide plate 57 installed on the bottom plate 41a of the chassis 41. At the same time, in this configuration, the cartridge holder 56 is driven to move downward quietly from the unloading position to the loading position. Then, as the eject cam 82 is driven by the eject motor 80 to make 1 rotation from a position shown in FIG. 8A, the eject driving pin 81 is caught by the eject arm 83 of the slide plate 57 as shown in FIGS. 8B and 8C, driving the slide plate 57 to slide from the unloading position P12 to the loading position P11 behind the unloading position P12 in the direction indicated by the arrow a, resisting a force generated by the pull coil spring 79. At the same time, the cartridge holder 56 is driven to move upward in a parallel movement in the direction indicated by the arrow h from a loading position P14 shown in FIG. 8A to the unloading position P13 shown in FIG. 7 and the slide plate 57 is again automatically locked at the unloading position P13 by the cartridge insertion detecting lever 84 which is automatically returned in the direction indicated by the arrow i to the lock position shown by the solid line in FIG. 4. It should be noted that, as shown in FIG. 3, a cartridge inadvertent insertion preventing lever 89 is installed at one end on the rear edge side of the ceiling plate 56a of the cartridge holder 56 in such a way that the lever 89 is freely rotatable with a support pin 90 serving as the center of the rotation in directions indicated by arrows k and m. The cartridge inadvertent insertion preventing lever 89 is a pull coil spring 91 naturally rotated in the direction indicated by the arrow i. Installed between the cartridge inadvertent insertion preventing lever 89 and the ceiling plate 56a, the pull coil spring 91 serves as a rotation forcing means. In addition, a pair of right and left cartridge pressing springs 92 each implemented by a plate spring are provided respectively on the right and left positions of the ceiling plate 56a of the cartridge holder 56. The floppy disk drive HFDD for driving a floppy disk cartridge having a large storage capacity with the configuration described above is accommodated in an internal chassis of equipment such as a computer and veiled by a lower cover 43. The whole chassis 41 is elastically supported by a total of 4 insulators 93 on the lower cover 43 to realize durability of the floppy disk drive HFDD for driving a floppy disk cartridge having a large storage capacity against disturbances such as external vibration.

In the configuration of the floppy disk drive HFDD for driving a floppy disk cartridge having a large storage capacity described above, the floppy disk cartridge HFDC having a large storage capacity or the floppy disk cartridge FDC having a small storage capacity can be inserted through the cartridge insertion window 46. The floppy disk drive HFDD for driving a floppy disk cartridge having a large storage capacity is capable of identifying whether the inserted floppy disk subjected to a recording and/or playback operation is the large storage capacity floppy disk HFD designed for the floppy disk drive HFDD for driving a floppy disk cartridge having a large storage capacity or the small storage capacity floppy disk FD originally intended for the floppy disk cartridge FDC having a small storage capacity.

Figure 7:
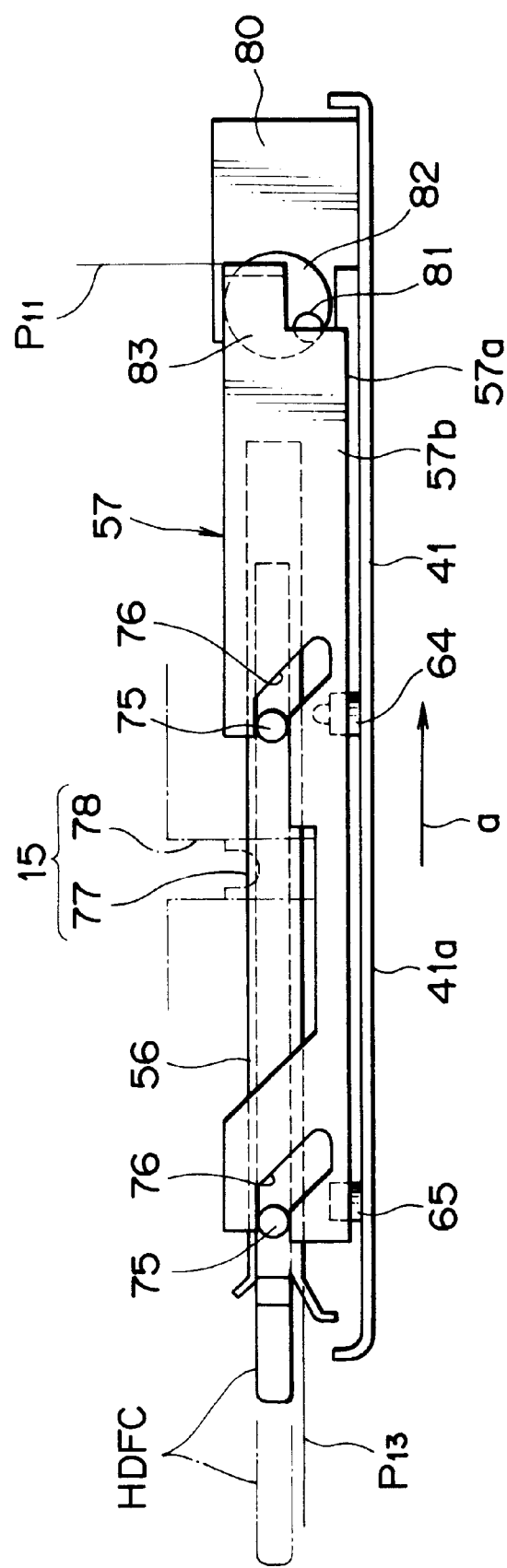
FIG. 7 is a diagram showing a side view of an unloading state of a cartridge loading mechanism employed in the floppy disk drive shown in FIG. 1.
Figure 8A:
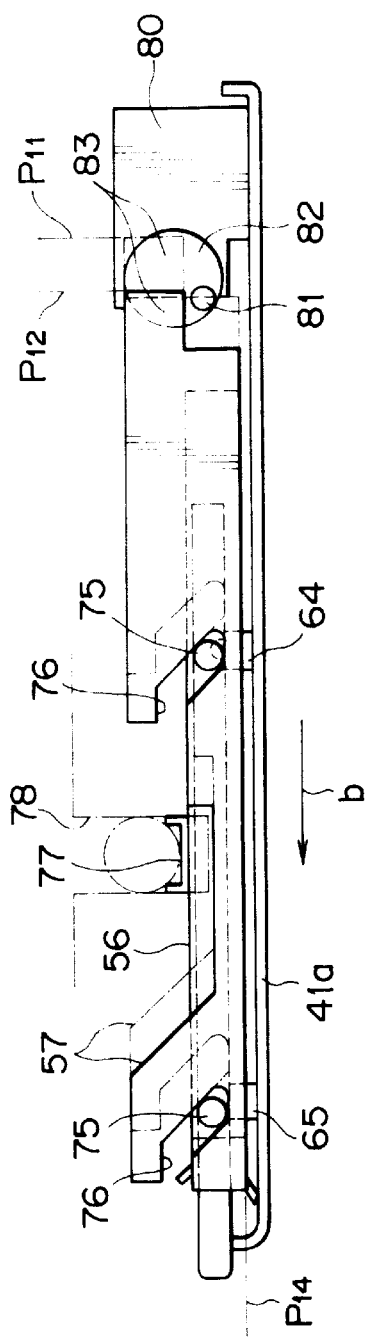
FIGS. 8A to 8C are diagrams showing a side view of a loading state of the cartridge loading mechanism employed in the floppy disk drive shown in FIG. 1.
Figure 8C:
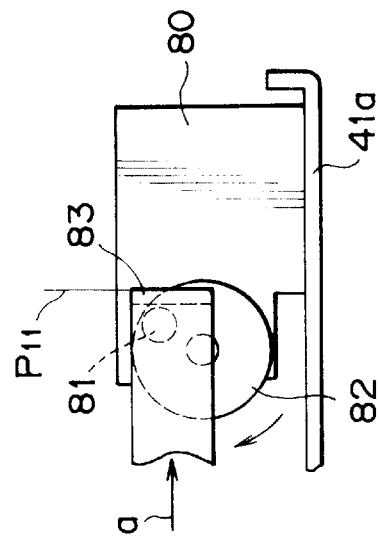
Figure 8B:
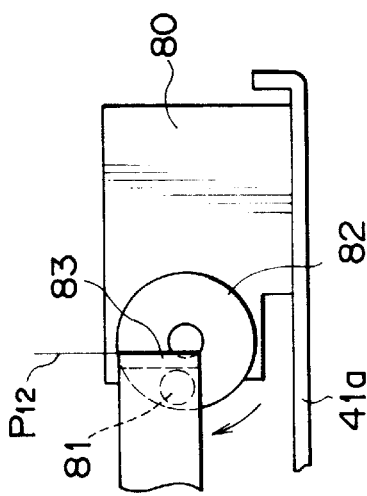

To put it in detail, when the floppy disk cartridge HFDC having a large storage capacity or the floppy disk cartridge FDC having a small storage capacity is inserted horizontally through the cartridge insertion window 46 in the direction indicated by the arrow a into the inside of the cartridge holder 56 elevated to the unloading position P13 as shown by the single-dot dashed lines in FIGS. 3, 4 and 7, the cartridge insertion detecting lever 84 is rotated in the direction indicated by the arrow j from the lock position to the released-lock position over the front edge surface 5a of the cartridge 5. During the rotation, the shutter 8 is moved by the cartridge insertion detecting lever 84 in the direction indicated by the arrow d to an open cover position, resisting a force generated by the shutter spring 8d. At the instance the cartridge insertion detecting lever 84 reaches the released-lock position in the rotation in the direction indicated by the arrow j, the floppy disk cartridge HFDC having a large storage capacity or the floppy disk cartridge FDC having a small storage capacity is driven by the cartridge holder 56 to move downward in the direction indicated by the arrow g from the unloading position P13 to the loading position P14 shown in FIG. 8. At the loading position P14, the floppy disk cartridge HFDC having a large storage capacity or the floppy disk cartridge FDC having a small storage capacity is loaded horizontally.

It should be noted that, if the floppy disk cartridge HFDC having a large storage capacity or the floppy disk cartridge FDC having a small storage capacity is inserted correctly through the cartridge insertion window 46, the incorrect insertion preventing groove 20 or the slanting surface 12 allows the incorrect cartridge insertion preventing lever 89 to permit the insertion of the floppy disk cartridge HFDC having a large storage capacity or the floppy disk cartridge FDC having a small storage capacity respectively. If the floppy disk cartridge HFDC having a large storage capacity or the floppy disk cartridge FDC having a small storage capacity is inserted incorrectly through the cartridge insertion window 46, on the other hand, the incorrect cartridge insertion preventing lever 89 prohibits the insertion of the floppy disk HFDC having a large storage capacity or the floppy disk cartridge FDC having a small storage capacity. The floppy disk cartridge HFDC having a large storage capacity or the floppy disk cartridge FDC having a small storage capacity is said to be inserted incorrectly when it is inserted upside down or when the rear side thereof is inserted first.

Then, the floppy disk cartridge HFDC having a large storage capacity or the floppy disk cartridge HFDC having a small storage capacity loaded at the loading position P14 is pressed and positioned in a horizontal posture by the right and left cartridge pressing springs 92 on the 4 positioning reference pins 64 and the 2 height reference pins 65. When the cartridge insertion detecting switch 66 detects the loading completion state of the floppy disk cartridge HFDC having a large storage capacity or the floppy disk cartridge FDC having a small storage capacity, the existence of a data erasure prevention of the floppy disk cartridge HFDC having a large storage capacity or the floppy disk cartridge FDC having a small storage capacity is detected by the inadvertent erasure prevention detecting switch 67 whereas the recording capacity of the floppy disk 1 is detected by the large storage capacity detection switch 69 or the small storage capacity detection switch 68. Then, the center core 2 of the floppy disk 1 is chucked on the disk table 53 by the magnetic sheet 24 and the center hole 2a of the center core 2 is put in a state of being engaged with the spindle 52. At the same time, the rotation driving pin engagement hole 2b is put in a state of being engaged with the rotation driving pin 25. Then, the floppy disk 1 is driven into rotation by the spindle motor 51 at a rotational speed predetermined for the floppy disk cartridge HFDC having a large storage capacity or the floppy disk cartridge FDC having a small storage capacity and, at the same time, while the upper and lower magnetic heads 101 and 102 are being transported by the linear actuator in the direction indicated by the arrows a and b along the scanning center P2, an operation to record and/or play back data onto and/or from the floppy disk 1 is carried out by determining whether the inserted floppy disk cartridge is the floppy disk cartridge HFDC having a large storage capacity or the floppy disk cartridge FDC having a small storage capacity.

In the case of the floppy disk 1 of the floppy disk cartridge FDC having a small storage capacity, a position on a circumference on the floppy disk 1 relative to the upper and lower magnetic heads 101 and 102 is determined by a function using a relation of engagement of the rotation driving pin 25 with the rotation driving pin engagement hole 2b of the center core 2, and the floppy disk 1 is driven into rotation by the spindle motor 51 at a low rotational speed in the range 200 to 250 rpm. The upper and lower magnetic heads 101 and 102 are then brought into contact with the upper and lower surfaces of the floppy disk 1 respectively to record and/or play back data onto and/or from the floppy disk 1.

In the case of the floppy disk 1 of the floppy disk cartridge HFDC having a large storage capacity, on the other hand, the rotation driving pin engagement hole 2b of the center core 2 has a diameter large enough for putting the rotation driving pin 25 in a state of being loosely engaged with the rotation driving pin engagement hole 2b. Thus, a position on a circumference on the floppy disk 1 of the floppy disk cartridge HFDC having a large storage capacity is not determined by using the rotation driving pin 25 as is the case with the floppy disk cartridge FDC having a small storage capacity. Instead, while tracking is being performed by adoption of a tracking technique to be described later, the floppy disk 1 is driven into rotation by the spindle motor 51 at a high rotational speed of at least 3,600 rpm. Then, the upper and lower magnetic heads 101 and 102 are put in a state of non-contact with the upper and lower surfaces of the floppy disk 1 respectively, being floated above the surfaces at a distance of the sub-micron order from the surfaces by air films generated on the surfaces in the so-called flying phenomenon to record and/or play back data onto and/or from the floppy disk 1 with a storage capacity of at least 100 MB at a high density.

When the eject button 48 is pressed after the operation to record and/or play back data onto and/or from the floppy disk 1 described above is completed, the eject switch 70 is turned on, causing the eject motor 80 to drive the eject cam 82 to make 1 rotation. As a result, the floppy disk cartridge HFDC having a large storage capacity or the floppy disk cartridge FDC having a small storage capacity is driven by the cartridge holder 56 to move upward in the direction indicated by the arrow h from the loading position P14 shown in FIG. 8A to the unloading position P12 shown in FIG. 7. Furthermore, the floppy disk cartridge HFDC having a large storage capacity or the floppy disk cartridge FDC having a small storage capacity is expelled in the direction indicated by the arrow b as shown by the single-dot dashed line in FIG. 7 from the cartridge insertion window 46 by the cartridge insertion detecting lever 84 which is rotated in the direction indicated by the arrow i from the released-lock position shown by the single-dot dashed line in FIG. 4 to a lock position shown by the solid line in the same figure. At the same time, the shutter 8 is moved by the shutter spring 8d in the direction indicated by the arrow c to the closed cover position.

(4) Description of a Linear Actuator

Next, a linear actuator 103 is explained by referring to FIGS. 9 to 20. The linear actuator 103 transports the upper and lower magnetic heads 101 and 102 forming a flying head configuration in the directions indicated by the arrows a and b along the scanning center P2. The linear actuator 103 is implemented by a voice coil motor 109 composed of a pair of right and left coils 104 and a pair of right and left magnetic circuits 108 comprising a pair of right and left magnet plates 105 and a couple of upper and lower yokes 106 and 107 which together form a closed magnetic path. As will be described later, the upper and lower magnetic heads 101 and 102 are supported by a carriage 111 made of synthesis resin through a pair of upper and lower head arms 112 and 113 respectively. In this configuration, the carriage 111 is freely slidable in the directions indicated by the arrows a and b along the scanning center P2 while being guided by a guide main shaft 114 and a guide auxiliary shaft 115 installed in parallel to the scanning center P2 on the bottom plate 41a of the chassis 41. The right and left coils 104 are stuck by an adhesive material 117 in a horizontal posture on a coil base 116 integrated on the right and left sides of the carriage 111. On the other hand, the right and left magnetic circuits 108 installed in a horizontal posture form an angular closed magnetic path by vertically confronting both longitudinal direction ends of the upper and lower yokes 106 and 107 which are installed in a horizontal posture, being vertically separated from each other. The magnetic plates 105 are tightly joined to the lower surface of the upper yoke 106 or the upper surface of the lower yoke 107 by magnetic forces generated by themselves. The right and left magnetic circuits 108 are install in a horizontal posture parallel to the scanning center P2 on the bottom plate 41a of the chassis 41. The right and left coils 104 installed to form a right angle with the scanning center P2 are inserted in a state of non-contact with an outer circumference of the lower yoke 107 or the upper yoke 106 of the right and left magnetic circuits 108. The right and left coils 104 are electrically connected to the main board 60 through a flexible print board 118 shown in FIGS. 4 and 6. By flowing a control current to these right and left coils 104, forces driving the right and left coils 104 are generated by the magnetic circuits 108, transporting the carriage 111 along the guide main shaft 114 and the guide auxiliary shaft 115 in the directions indicated by the arrows a and b in the so-called seek and tracking operations.

(5) Description of Members for Installing the Guide Main Shaft

As shown in FIGS. 9 to 15, members 121 for installing the guide main shaft 114 on the chassis 41 include a taper shaft 122 with a small diameter and a chamfer 123. Provided on one end 114a of the guide main shaft 114, the taper shaft 122 has a concentric shape. On the other hand, the chamfer 123 is provided on the outer circumference of the other end 114b of the guide main shaft 114. Formed on a front end fixed position of the guide main shaft 114 to form a right angle with the scanning center P2, a cut piece 124 is erected vertically upward from the bottom plate 41a of the chassis 41. A guide-mainshaft bearing hole 125 is bored through the cut piece 124. The taper shaft 122 of the guide main shaft 114 is inserted into the guide-main-shaft bearing hole 125. It should be noted that the guide-main-shaft bearing hole 125 is formed with a diameter approximately equal to the average of the maximum and the minimum of the diameters of the taper shaft 122. Provided on a rear end fixed position of the guide main shaft 114 to form a right angle with the scanning center P2, a rear side plate 41c is erected vertically upward from the rear end of the bottom plate 41a of the chassis 41. A guide-main-shaft bearing groove 126 is cut out off the rear end plate 41c downward vertically from the upper end thereof. At the lower end of the guidemain-shaft bearing groove 126, a taper surface 127 with a V shape is formed. A plate spring 128 is attached to a pair of right and left positioning dowels 130 on the back surface of the rear end plate 41c by a machine screw 131 or a plurality of machine screws 131 in such a way that the plate spring 128 can be attached and removed from a position behind the back surface. It should be noted that the back surface of the rear end plate 41c is a surface on a side opposite to the front panel 44. Provided on the center of the plate spring 128 and integrated with the plate spring 128, a pressure piece 129 is inclined at an angle θ1 with respect to an axial center P114 of the guide main shaft 114.

Figure 15B:
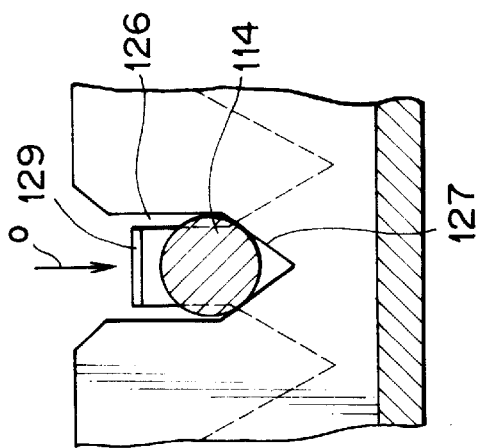
FIGS. 15A and 15B are diagrams showing cross sections at positions indicated by arrows 15A—15A and arrows 15B—15B in FIG. 14.
Figure 15A:
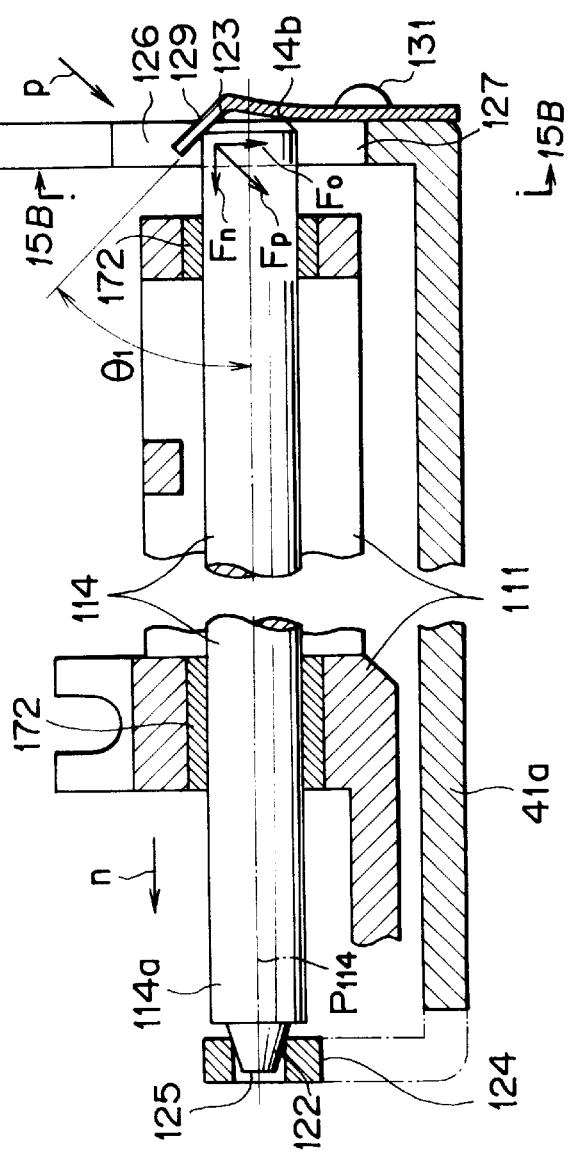

When the guide main shaft 114 is installed in a horizontal posture parallel to the scanning center P2 on the chassis 41, the taper shaft 122 of the guide main shaft 114 is inserted into the guide-main-shaft bearing hole 125 in a direction indicated by an arrow n while the rear end 114b of the guide main shaft 114 is inserted into the guide-main-shaft bearing groove 126 in a direction indicated by an arrow o as shown in FIG. 15. Then, the plate spring 128 is put in a state of being engaged with the right and left positioning dowels 130 on the rear side plate 41c of the chassis 41 through a pair of right and left positioning dowel holes 132 respectively from the back surface side, and a pair of right and left machine screws 131 inserted forward respectively into a pair of right and left machine screw passing-through holes 133 on the plate spring 128 are attached to a machine screw holding hole 155 of a plurality of machine screw holding holes 155 formed on the rear side plate 41c. In this way, the plate spring 128 is fixed to the back surface of the rear side plate 41c by machine screws in a direction indicated by an arrow n. By doing so, the pressure piece 129 of the plate spring 128 is pressed elastically against the chamfer 123 on the rear end 114a of the guide main shaft 114 in a direction indicated by an arrow p, that is, a direction inclined with respect to the axial center P114, applying a pressing force Fp of the pressure piece 129 to the chamfer 123 of the guide main shaft 114 in the direction indicated by the arrow p. A horizontal direction component Fn of the pressing force Fp presses the guide main shaft 114 in a direction indicated by a narrow, that is, the axial direction. As a result, the taper shaft 122 of the guide main shaft 114 is inserted into the guide-main-shaft bearing hole 125 by a wedge effect. At the same time, a vertical direction component Fo of the pressing force Fp presses the guide main shaft 114 in a direction indicated by an arrow o, that is, a direction perpendicular to the axial direction. By the same token, the rear end 114b of the guide main shaft 114 is pressed against the taper surface 127 of the guide-main-shaft bearing groove 126 by a wedge effect. As a result, the guide main shaft 114 is fixed on the chassis 41. In addition, the posture of guide main shaft 114 parallel to the scanning center P2 is adjusted with a high degree of precision by virtue of a self-aligning effect of the taper shaft 122 and the taper surface 127.

With the guide-main-shaft installation members 121 having the configuration described above, the guide main shaft 114 can be attached to the chassis 41 very easily with a high degree of precision by using only a small number of components and by carrying out only few assembly processes or, to be more specific, by merely fixing a single component comprising the plate spring 128 and the pressure piece 129 to the back surface of the rear side plate 41c of the chassis 41 using a machine screw 131 or a plurality of machine screws 131. As a result, the cost can be reduced much and the productivity can be improved substantially.

Figure 16:
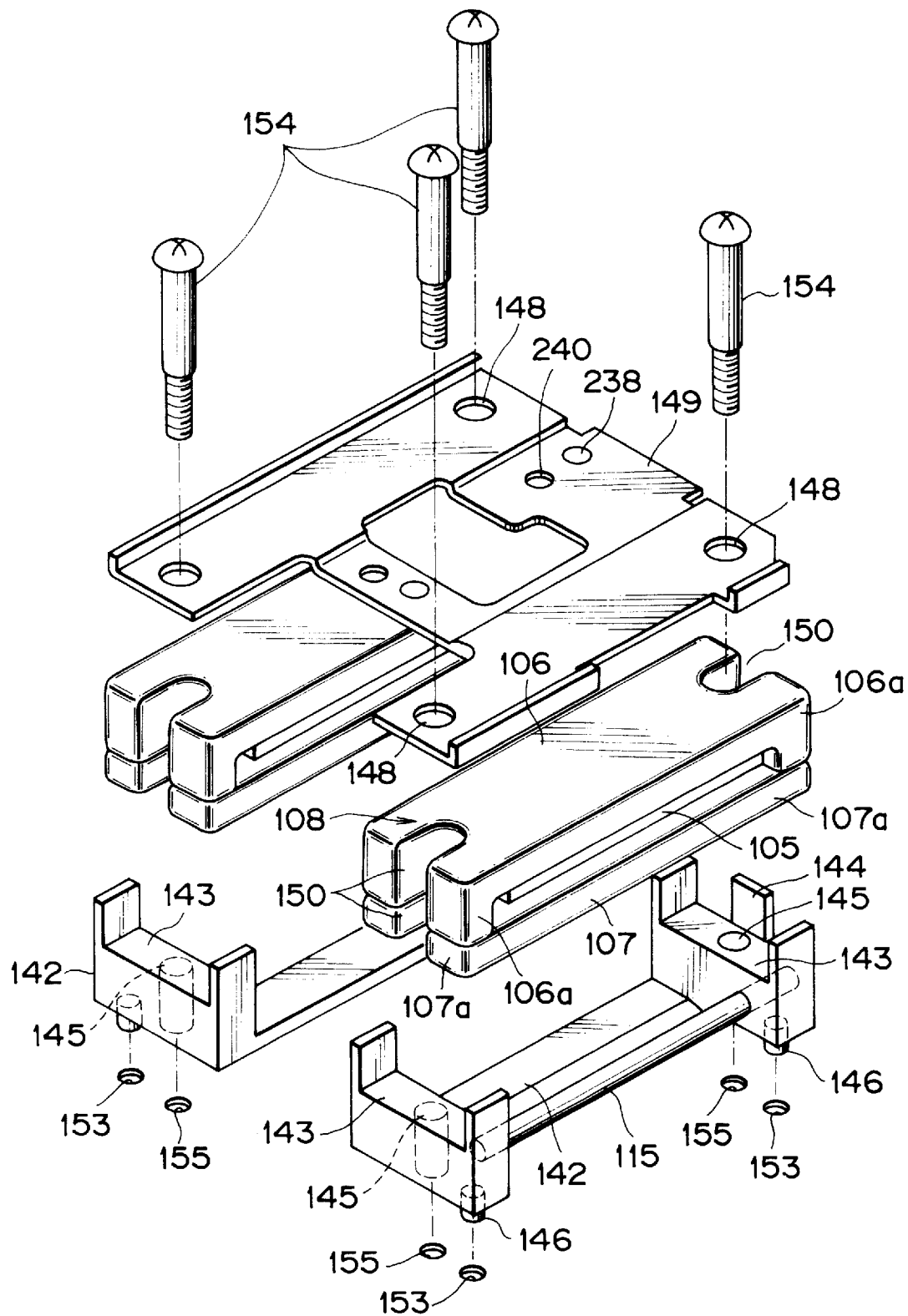
FIG. 16 is a diagram showing a squint view of disassembled members for installing the guide auxiliary shaft and the yokes.
Figures 17A, 17B, 17C:
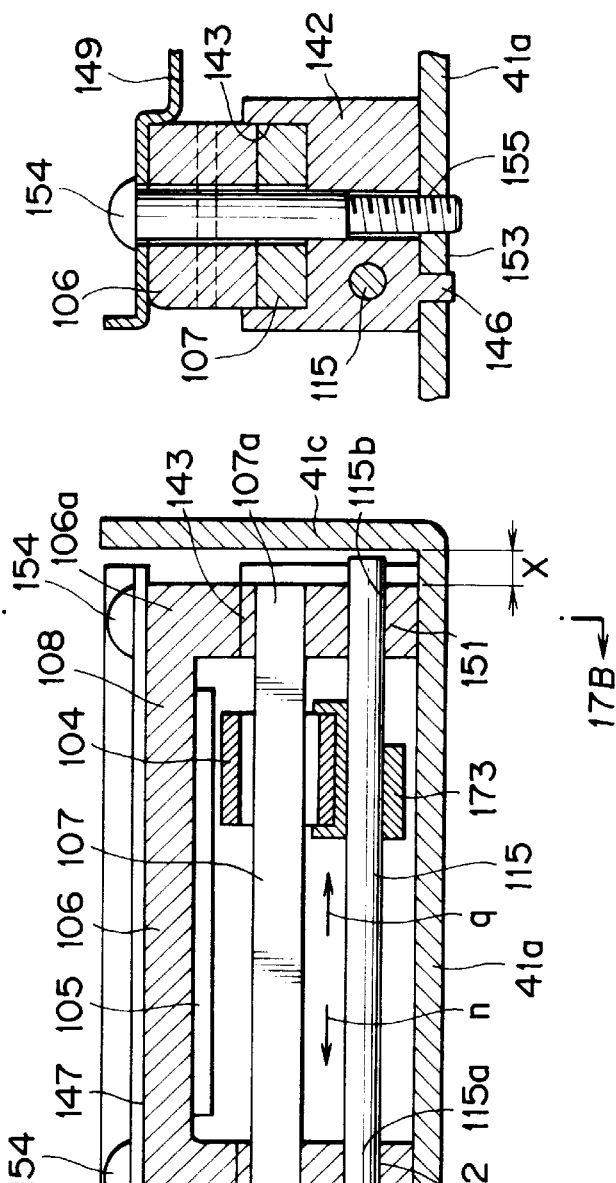
FIGS. 17A, 17B and 17C are diagrams showing cross sections along lines indicated by arrows 17A—17A and arrows 17B—17B in FIG. 9.
Figure 18B:
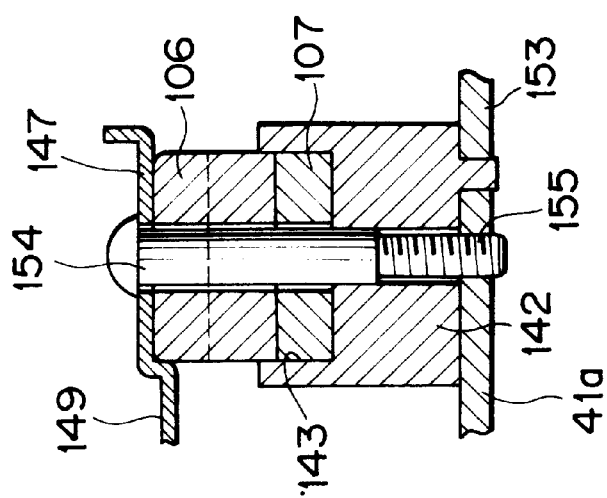
FIGS. 18A and 18B show diagrams indicating cross sections along lines indicated by arrows 18A—18A and arrows 18B—18B in FIG. 9.
Figure 18A:
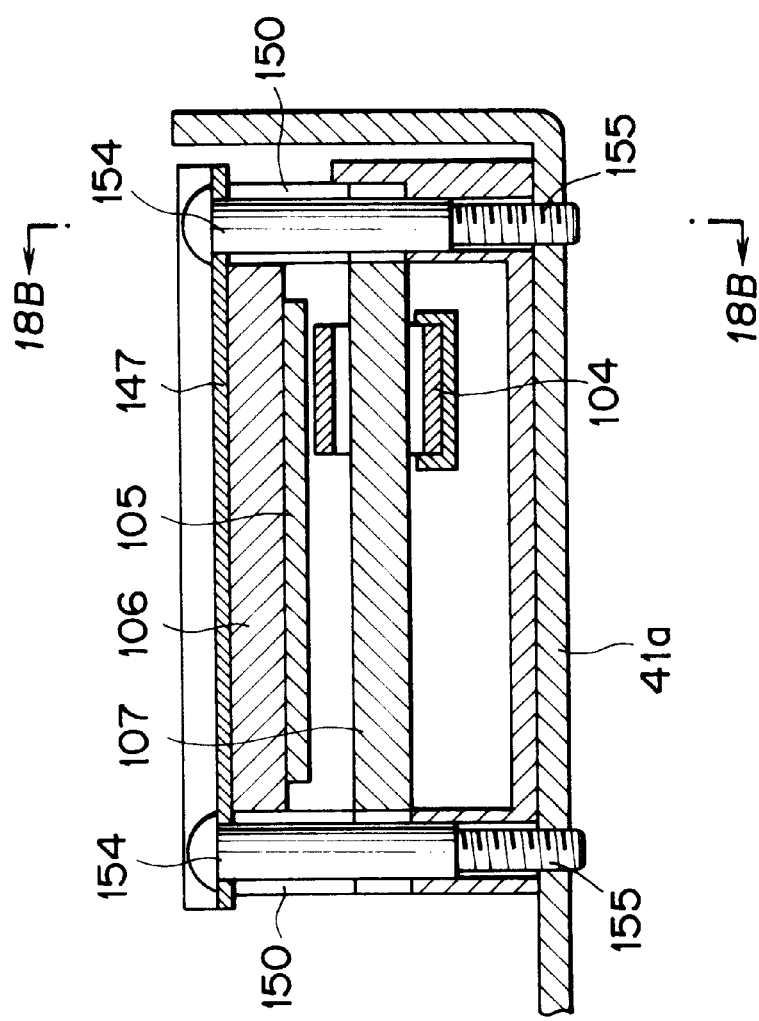

(6) Description of Installation Members of the Guide Auxiliary Shaft and the Yokes The following is a description of a pair of right and left members 141 and right and left yoke installation bases 142 used respectively for installing the guide auxiliary shaft 115 and the upper and lower yokes 106 and 107 of the magnetic circuit 108 on the chassis 41 as shown in FIGS. 16 to 18. The right and left yoke installation bases 142 are each made of a non-magnetic material such as synthesis resin. A pair of front and rear yoke engagement units 143 are formed respectively on front and rear longitudinal-direction ends of the right and left yoke installation bases 142. A pair of front and rear yoke contact pieces 144 are formed on the rear or front side of one of the yoke engagement units 143, being integrated with the yoke engagement unit 143 A pair of front and rear machine screw passing-through holes 145 for vertically passing through the yoke installation bases 142 are bored respectively through the centers of the front and rear longitudinal-direction ends of the yoke installation bases 142 whereas a pair of front and rear positioning dowels 146 are formed respectively on the lower surfaces of the front and rear longitudinal-direction ends of the yoke installation bases 142 respectively. Machine screw passing-through holes 148 are bored through 4 corners of a yoke restraining plate 147 mounted in a horizontal posture stretched over a surface between spaces above the right and left magnetic circuits 108. At the right-to-left direction center of the yoke restraining plate 147, there is formed a positioning dent 149 for the upper yoke 106. Machine screw passing-through grooves 150 are formed at the front and rear ends of the upper and lower yokes 106 and 107. It should be noted that the front and rear ends 107a of the lower yoke 107 are confronted with confronting portions 106a of the upper yoke 106. The confronting portions 106a are formed as a result of vertically bending lower surfaces of both the front and rear ends of the upper yoke 106 downward. The magnetic forces generated by the magnet plates 105 tightly join the upper and lower yokes 106 to 107 to each other to form a closed magnetic path. Identical confronting portions can also be formed on the upper surfaces of the front and rear ends of the lower yoke 107 and the upper and lower surfaces of the front and rear ends of the upper and lower yokes 106 and 107. In addition, as shown in FIGS. 17A and 17B, a passing-through hole 151 is bored through the rear end side at the lower portion of the front and rear yoke engagement units 143 of one of the right and left yoke installation bases 142 whereas a blind hole 152 is bored through the front end side. The guide auxiliary shaft 115 is horizontally passed through the passing-through hole 151. The passing-through hole 151 and the blind hole 152 are formed in such a way that a line connecting the centers thereof is oriented in a horizontal direction parallel to the scanning center P2.

When the guide auxiliary shaft 115 and the upper and lower yokes 106 and 107 are installed on the chassis 41 in a horizontal posture parallel to the scanning center P2, first of all, as shown in FIGS. 16 and 17A and 17B, the guide auxiliary shaft 115 is inserted forward into the passing-through hole 151 of one of the yoke installation bases 142 starting with the front end 115a of the shaft 115 in the direction indicated by the arrow n till the front end 115a is put in a state of being engaged with the blind hole 152. It should be noted that, in this engaged state, the rear end 115b of the guide auxiliary shaft 115 protrudes out off the passing-through hole 151 to a space behind the hole 151 by an amount of protrusion X.

Then, as shown in FIGS. 17A, 17B, and 17C and 18A and 18B, the right and left yoke installation bases 143 are put in a state of being engaged respectively with a pair of right and left dowel holes 153 formed on the bottom plate 41a of the chassis 41 by the front and rear positioning dowels 146. As the right and left yoke installation bases 143 are positioned on the bottom plate 41a of the chassis 41 in a horizontal posture parallel to the scanning center P2, the rear end 115b of the guide auxiliary shaft 115 is inserted into the inside of the rear side plate 41c of the chassis 41. Subsequently, the front and rear ends of the right and left yokes 106 and 107 are put in a state of being engaged respectively with the front and rear yoke contact pieces 144 of the right and left yoke installation bases 142 in the downward direction and suspended in a horizontal posture. At that time, since the rear ends (or the front ends) of the right and left yokes 106 and 107 can be brought into contact with the rear side or front side yoke contact piece 144, the right and left yokes 106 and 107 can be positioned inside the yoke installation bases 143 with ease and yet with a high degree of accuracy.

Then, as shown in FIGS. 17A, 17B, and 17C and 18A and 18B, the yoke restraining plate 147 is mounted in a horizontal posture between upper portions of the right and left upper yokes 106. At that time, the positioning dent 149 of the yoke restraining plate 147 is put in a state of being engaged with the inner sides of the right and left upper yokes 106 so as to allow the yoke restraining plate 147 to be positioned with respect to the upper yokes 106 with ease. Then, afterwards, a total of 4 machine screws 154 each having a long axis are inserted downward in a vertical posture into machine screw passing-through holes 148 bored through the yoke restraining plate 147. The 4 machine screws 154 are further passed downward through the 4 machine screw passing-through holes 145 bored through the right and left yoke installation bases 142 through the machine screw passing-through grooves 150 formed on the right and left yokes 106 and 107. Finally, the bottom ends of the 4 machine screws 154 are put in a state of being engaged with a total of 4 machine screw holding holes 155 bored through the bottom plate 41a of the chassis 41. As a result, the yoke restraining plate 149, the right and left yokes 106 and 107 and the yoke installation bases 142 are fixed on the bottom plate 41a by the 4 machine screws 154 by using a collective tightening technique.

With the yoke installation bases 142 fixed on the bottom plate 41a of the chassis 41 by the machine screws 154, the rear end 115a of the guide auxiliary shaft 115 is positioned on the inner side of the rear side plate 41c of the chassis 41 which serves as a stopper of the guide auxiliary shaft 115. In this state, the guide auxiliary shaft 115 will never depart from the yoke installation bases 142 in a direction indicated by an arrow q, that is, the backward direction.

According to the members having the configuration described above for installing the guide auxiliary shaft 115 and the yokes 106 and 107, the yoke installation bases 142 for installing the yokes 106 and 107 on the chassis 41 also serve as bases for installing the guide auxiliary shaft 115. In addition, a fallout prevention stopper on the rear side plate 41c of the chassis 41 also serves as a means for preventing the guide auxiliary shaft 115 from departing from the yoke installation bases 142. Thus, the guide auxiliary shaft 115 can be attached to the chassis 41 by using only a small number of components and by carrying out only few assembly processes. As a result, the cost can be reduced much and the productivity can be improved substantially.

In the configuration described above, the front end 115a of the guide auxiliary shaft 115 is put in a state of being engaged with the blind hole 152 as shown in FIG. 17A. It should be noted, however, that the following alternative configuration shown in FIG. 17B is also capable of providing the same effect as the blind hole 152 described above. In this alternative configuration, a passing-through hole 156 is bored through the front end of the yoke installation base 142. The passing-through hole 156 has a diameter smaller than that of the guide auxiliary shaft 115. In addition, a shaft 157 having a small diameter and a form concentric with the guide auxiliary shaft 115 is formed on the front end of the shaft 115. The small diameter shaft 157 is put in a state of being engaged with the small diameter passing-through hole 156 and the guide auxiliary shaft 115 is brought into contact with a contact surface 159 on the yoke installation base 142 in a direction indicated by an arrow n by a stair-shaped portion 158 created on the outer circumference of the small diameter shaft 157.

Figure 21:
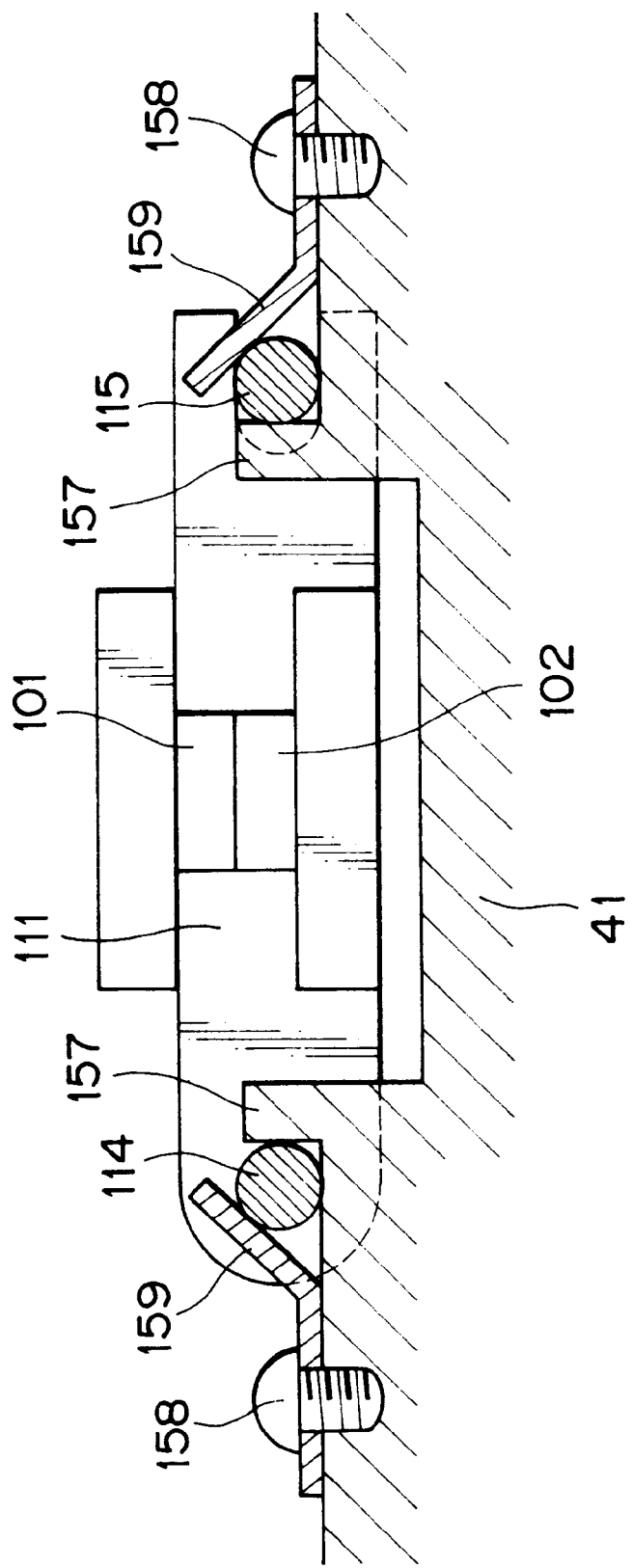
FIG. 21 is an explanatory diagram showing the cross section of the conventional bearing.

It should be noted that FIG. 21 is a diagram showing the conventional technology whereby the guide main shaft 114 and the guide auxiliary shaft 115 are installed on the chassis 41. According to the conventional technology, positioning references 161 of the guide main shaft 114 and the guide auxiliary shaft 115 are provided on the chassis 41. The guide main shaft 114 and the guide auxiliary shaft 115 are fixed to the chassis 41 by using a total of 4 restraining plates 163, which are attached to the chassis 41 by a total of 4 machine screws 162, to press the front and rear ends of the guide main shaft 114 and the guide auxiliary shaft 115 against the positioning references 161. In addition, according to the conventional technology, a number of components including the positioning references 161, the machine screws 162 and the restraining plates 163 are required in spite of the fact that the yokes are not installed at all. Thus, the guide main shaft 114 and the guide auxiliary shaft 115 have to be attached to the chassis 41 by using a large number of components and by carrying out a lot of assembly work. As a result, the cost is increased and the productivity deteriorates.

By virtue of the members 141 for installing the guide auxiliary shaft 115 and the yokes 106 and 107, on the other hand, the number of components and the number of assembly processes can be each reduced to a minimum in spite of the fact that the guide auxiliary shaft 115 as well as the upper and lower yokes 106 and 107 are also attached to the chassis 41.

Figure 9:
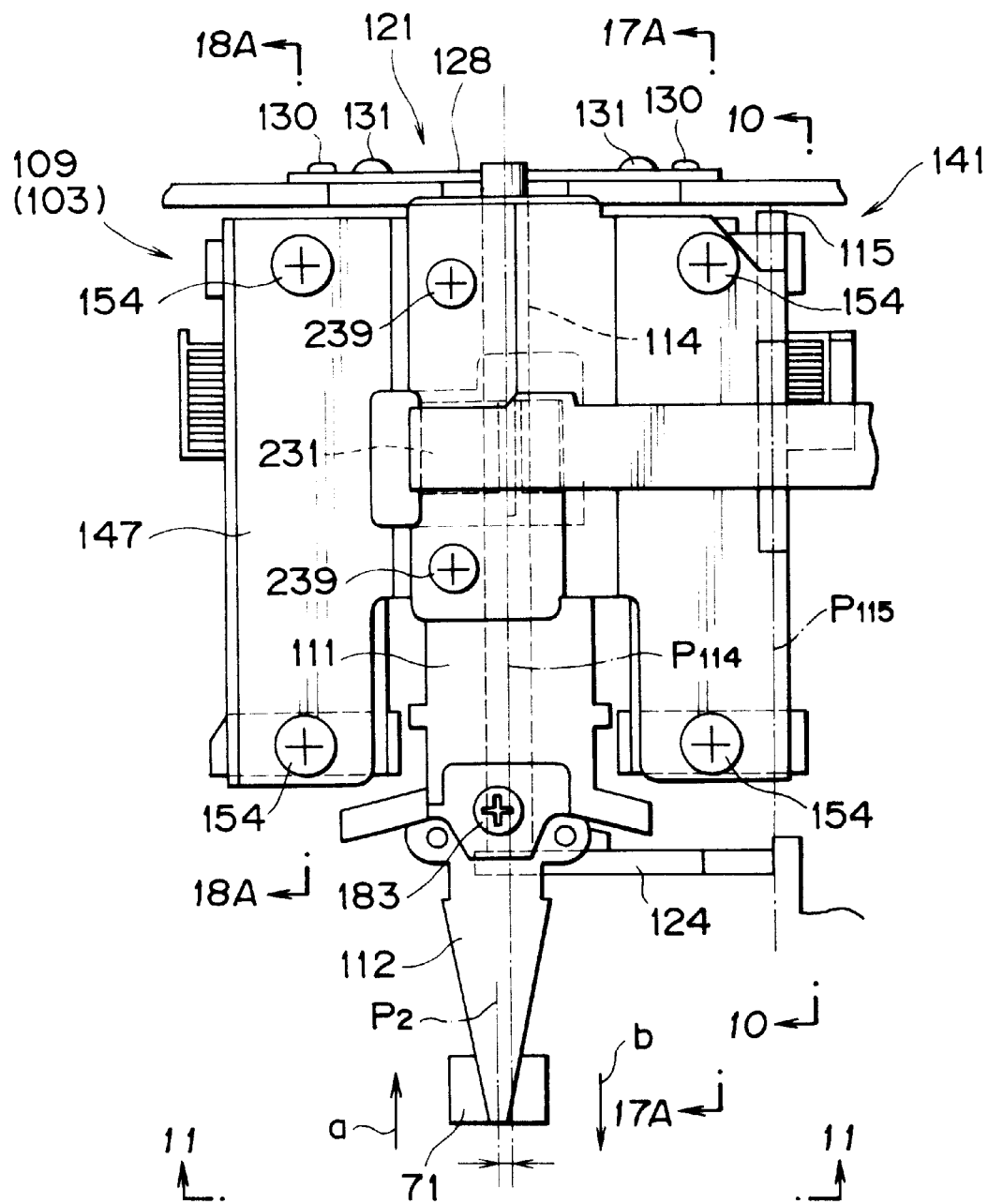
FIG. 9 is an explanatory diagram showing a top view of members for installing a guide main shaft, a guide auxiliary shaft and yokes employed in the floppy disk drive shown in FIG. 1.
Figure 10:
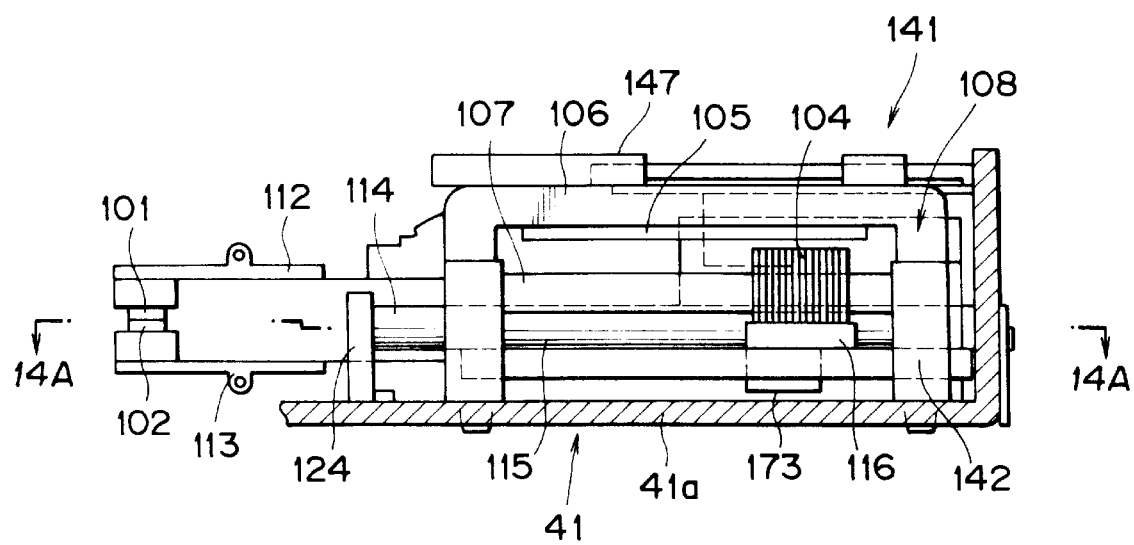
FIG. 10 is a diagram showing a cross section along a line indicated by arrows 10—10 in FIG. 9.
Figure 11:
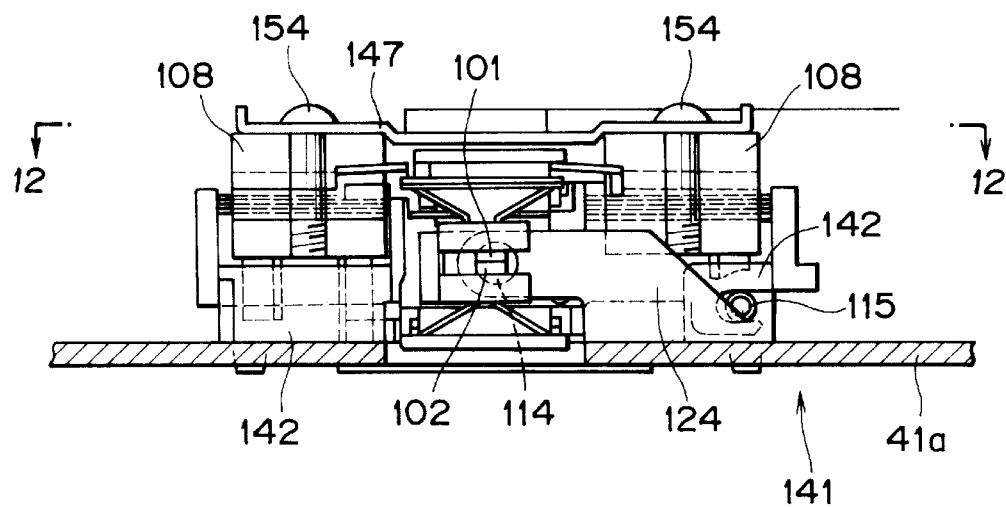
FIG. 11 is a diagram showing a cross section along a line indicated by arrows 11—11 in FIG. 9.
Figure 12:
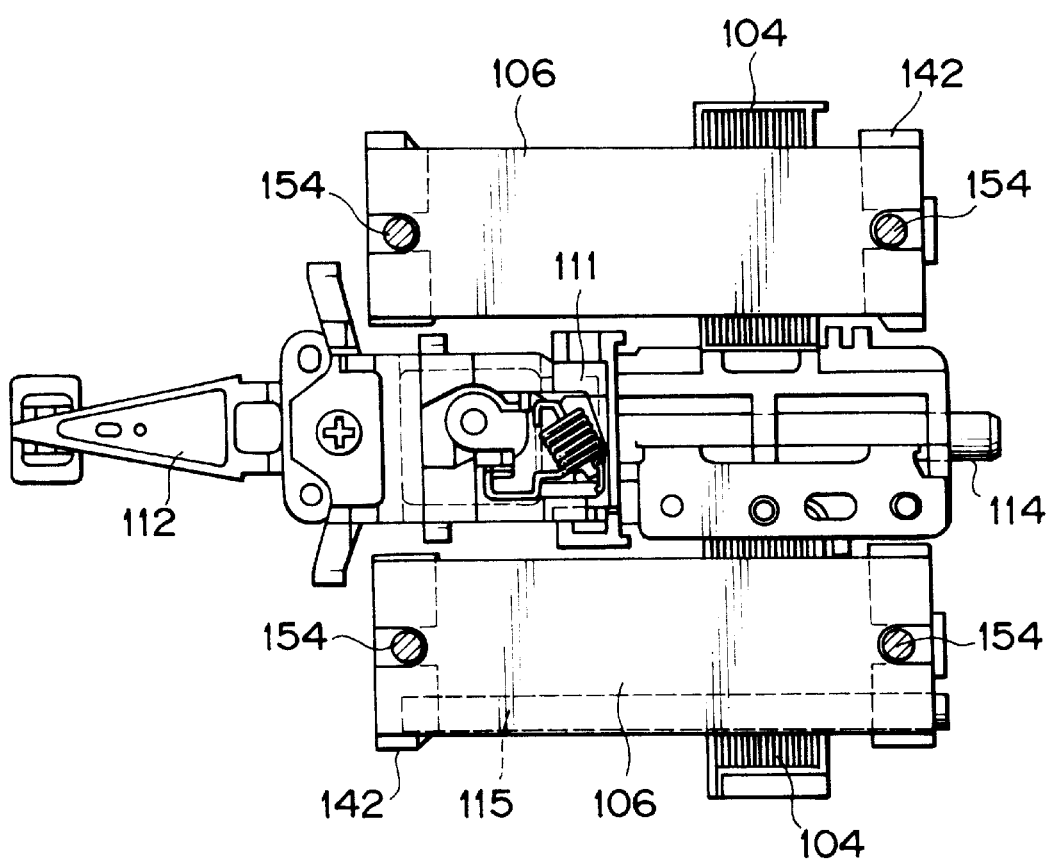
FIG. 12 is a diagram showing a cross section along a line indicated by arrows 12—12 in FIG. 11.
Figure 13:
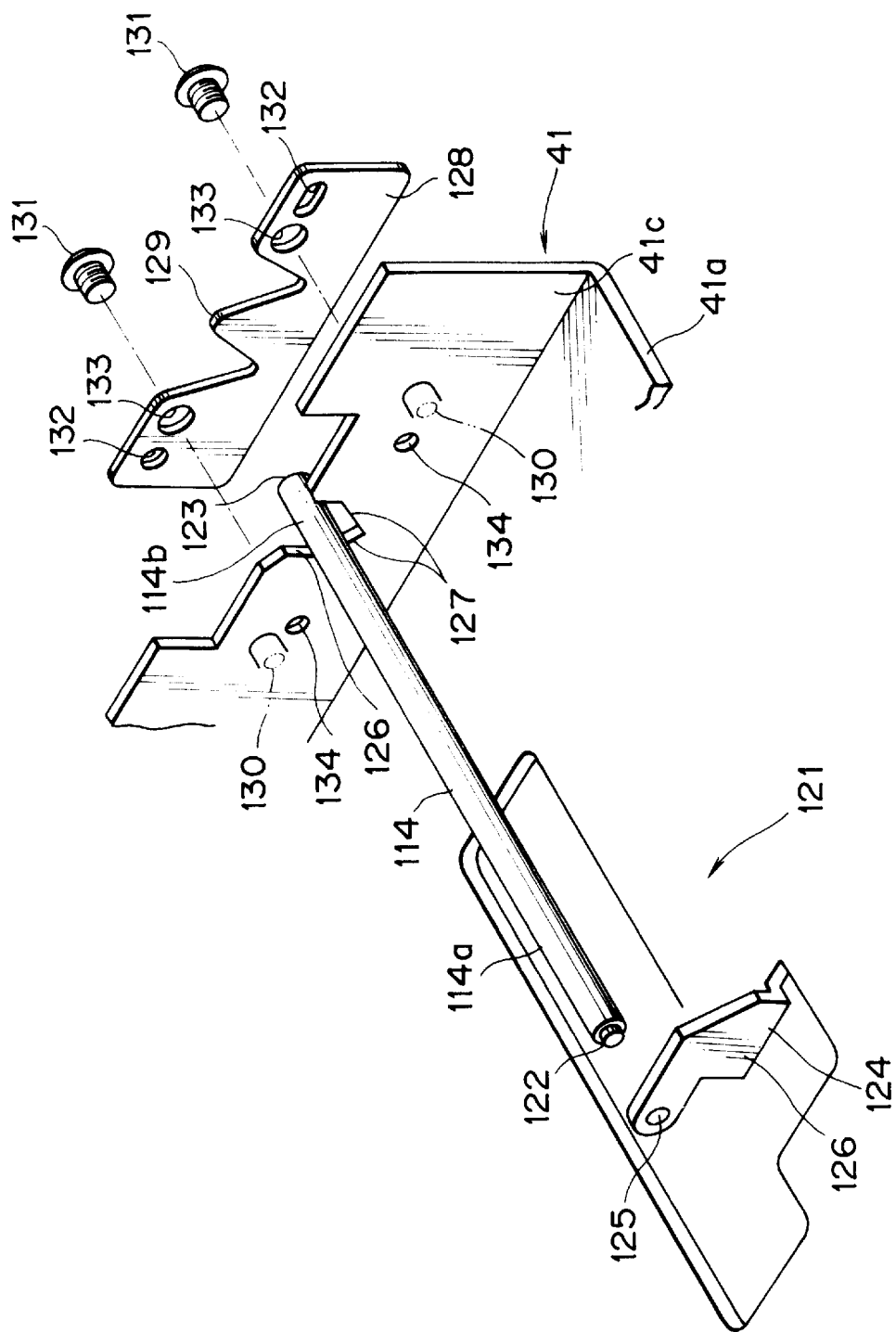
FIG. 13 is a diagram showing a squint view of disassembled members for installing the guide main shaft.
Figure 20:
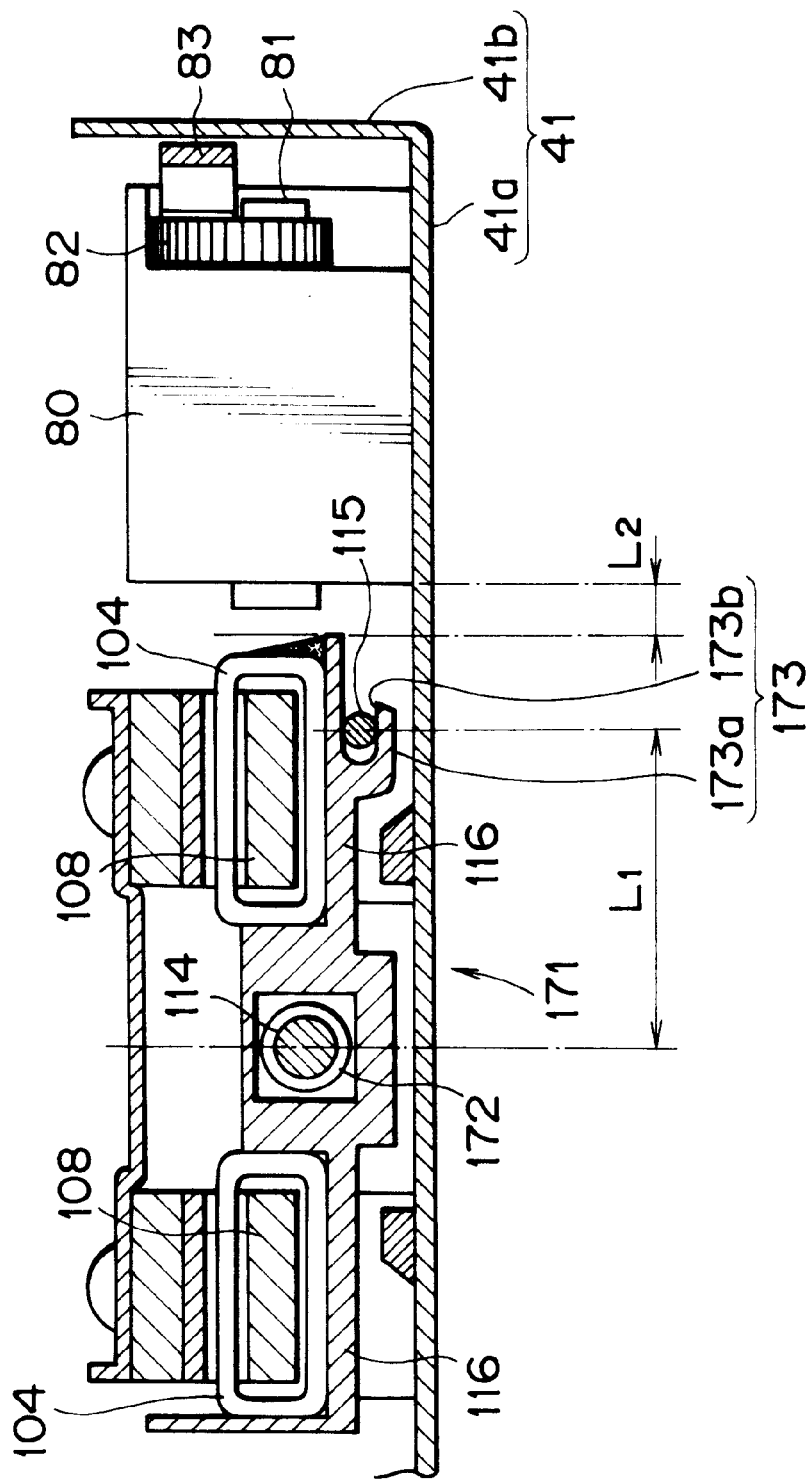
FIG. 20 is a diagram showing a cross section along a line indicated by arrows 20—20 in FIG. 19.

(7) Description of Bearing Members of the Guide Main Shaft and the Guide Auxiliary Shaft The following is a description of bearing members 171 for bearing the guide main shaft 114 and the guide auxiliary shaft 115 with reference to FIGS. 9, 19 and 20. In the first place, the guide main shaft 114 is a cylindrical shaft with a large diameter made of typically a stainless material while the guide auxiliary shaft 115 is a cylindrical shaft with a small diameter also made of typically a stainless material as described above. At the front and rear ends of the approximately central portion of the carriage 111 to which the upper and lower magnetic heads 101 and 102 are attached through the head arms 112 and 113 respectively as described above, a pair of front and rear thrust bearings 172 are embedded by adoption of an outsert formation technique, being integrated with the carriage 111. The front and rear thrust bearings 172 are each a round bearing made of typically an oil-less metal. The carriage 111 can thus be inserted and sled freely over the outer circumference of the guide main shaft 114 by the front and rear thrust bearing 172. The axial center P114 of the guide main shaft 114 is placed in a posture parallel to the scanning center P2 at the scanning center P2 or at a very small offset of the order of several millimeters from the scanning center P2. On the other hand, a thrust bearing 173 of the guide auxiliary shaft 115 is formed beneath one of a pair of right and left coil bearing bases 116, being integrated with the bearing bases 116. In turn, the bearing bases 116 are integrated with the carriage 111. It should be noted that the thrust bearing 173 has a U-like groove 173b on the inner side of a protrusion 173a with a shape resembling the U character which is exposed to a side external portion of the coil bearing bases 116. The U groove 173b allows the carriage to be inserted and thrust freely over the outer circumference (mainly, the upper and lower surfaces) of the guide auxiliary shaft 115.

With the bearing members 171, a large span L1 can thus be set between the axial centers P114 and P115 of the guide main shaft 114 and the guide auxiliary shaft 115 respectively. Accordingly, it is possible to substantially reduce an effect of a backlash of the carriage 111 caused by clearances of the thrust bearings 172 and 173 for the guide main shaft 114 and the guide auxiliary shaft 115 respectively. As a result, the carriage 111 is capable of sliding the upper and lower magnetic heads 101 and 102 along the guide main shaft 114 in the directions indicated by the arrows a and b with a high degree of stability. In addition, it is possible to carry out operations to record and/or play back data onto and/or from the floppy disk 1 at a high density with a high degree of precision. Furthermore, by particularly placing the axial center P114 of the guide main shaft 114 at the scanning center P2 or at a location in close proximity thereto, it is possible to minimize torsion of the upper and lower magnetic heads 101 and 102 with respect to the scanning center P2 in the right and left directions.

In this way, since it is possible to place the guide main shaft 114 in a projection area of the carriage 111 and the guide auxiliary shaft 115 in a projection area of one of the coils 104, the guide auxiliary shaft 115 and the thrust bearing 173 thereof can not protrude to the side external portion of one of the coil bearing bases 116. Thus, a clearance L2 between one of the coil bearing bases 116 and other components such as the eject motor 80 can be reduced considerably, and a space factor inside the chassis 41 can therefore be increased. As a result, the floppy disk drive HFDD for driving a floppy disk cartridge having a large storage capacity can be made small in size and light. In addition, the thrust bearing 173 of the guide auxiliary shaft 115 can also be designed into a structure wherein the coil bearing base 116 is used to bear another component. By integrating the thrust bearing 173 with the coil bearing base 116, however, the number of components and the number of assembly processes can be reduced, allowing the cost to be lowered and the productivity to be increased. It should be noted that the thrust bearing 173 of the guide auxiliary shaft 115 can also be installed above the coil 104. By installing the thrust bearing 173 of the guide auxiliary shaft 115 beneath the coil bearing base 116, however, the thrust bearing 173 of the guide auxiliary shaft 115 can also be integrated with the coil bearing base 116 with ease, allowing the productivity to be improved.

Figure 22:
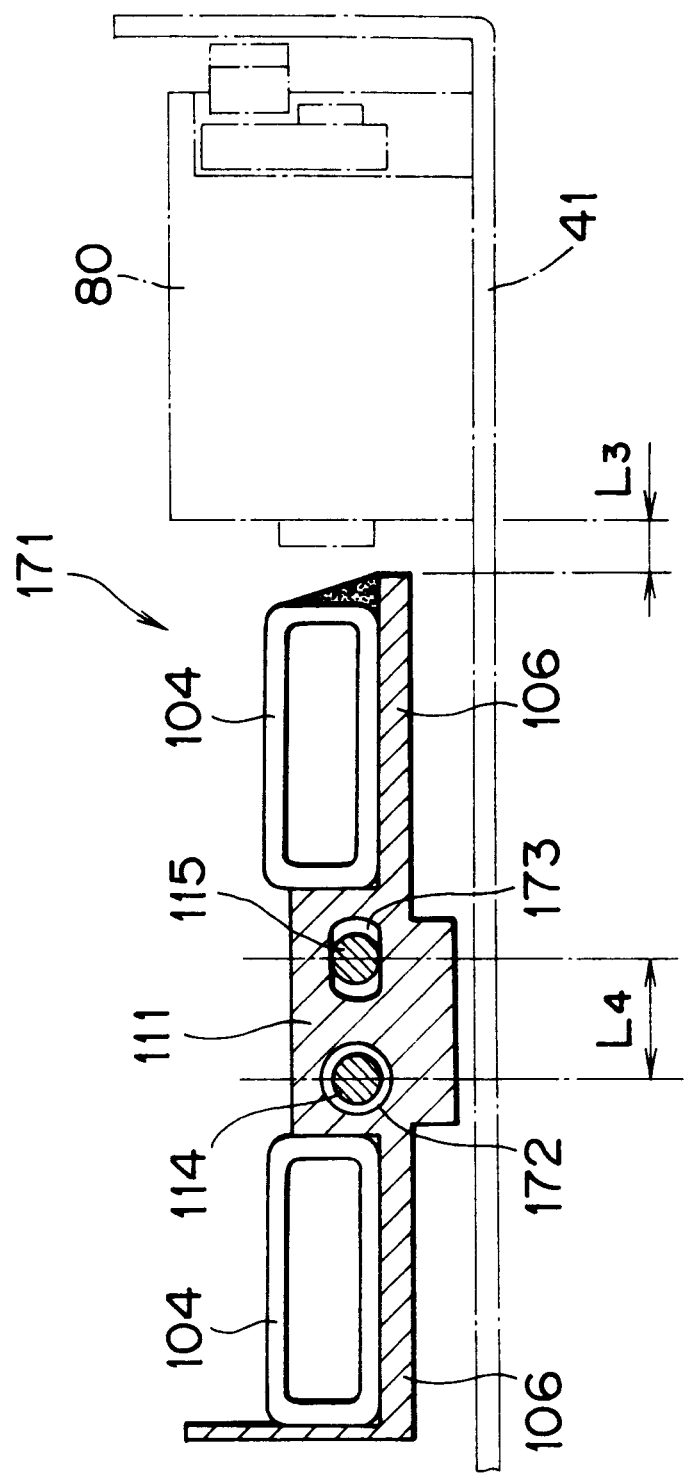
FIG. 22 is an explanatory diagram showing the cross section of the conventional bearing.
Figure 23:
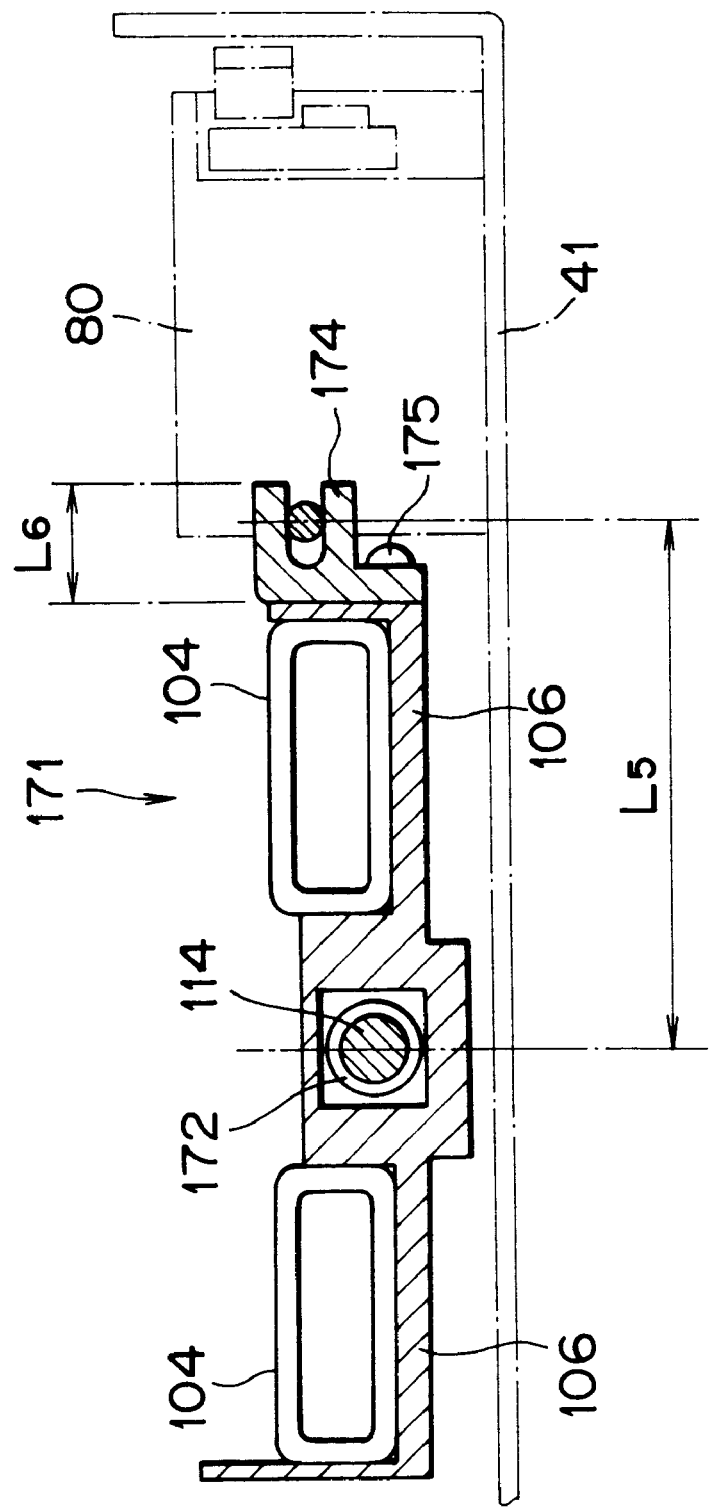
FIG. 23 is an explanatory diagram showing the cross section of the conventional bearing.

It should be noted that FIGS. 22 and 23 are diagrams to be referred to in consideration of a problem related to a span between the guide main shaft 114 and the guide auxiliary shaft 115 and a problem related to clearances between one of the coil bearing bases 116 and other components such as the eject motor 80. To put it in detail, FIG. 22 is a diagram showing a configuration in which the thrust bearings 172 and 173 of the guide main shaft 114 and the guide auxiliary shaft 115 respectively are placed at locations in close proximity to the center of the carriage 111. In this case, while the clearance L2 between one of the coil bearing bases 116 and other components such as the eject motor 80 can be increased, the span L4 between the guide main shaft 114 and the guide auxiliary shaft 115 decreases substantially. Thus, an effect of a backlash of the carriage 111 caused by clearances of the thrust bearings 172 and 173 for the guide main shaft 114 and the guide auxiliary shaft 115 respectively increases. As a result, operations to record and/or play back data onto and/or from the floppy disk 1 at a high density can no longer be carried out. On the other hand, FIG. 23 is a diagram showing a configuration in which a thrust bearing 174 is attached to the outer side of one of the coil bearing bases 116 typically by using a machine screw as a component separated from the carriage 111. In this case, while a span L5 between the guide main shaft 114 and the guide auxiliary shaft 115 can be increased sufficiently, the thrust bearing 174 protrudes to the side external portion of one of the coil bearing bases 116 by an amount of protrusion L6. Thus, the thrust bearing 174 most likely provides interference to other components such as the eject motor 80. As a result, a space factor inside the chassis 41 is decreased, giving rise to a floppy disk drive HFDD for driving a floppy disk cartridge with a large storage capacity that is large in size and heavy. In addition, in a configuration in which a thrust bearing 174 is attached to the outer side of one of the coil bearing bases 116 typically by using a machine screw as a component separated from the carriage 111, the number of components and the number of assembly processes increase, deteriorating the productivity.

(8) Description of a Head Assembly

Figure 24:
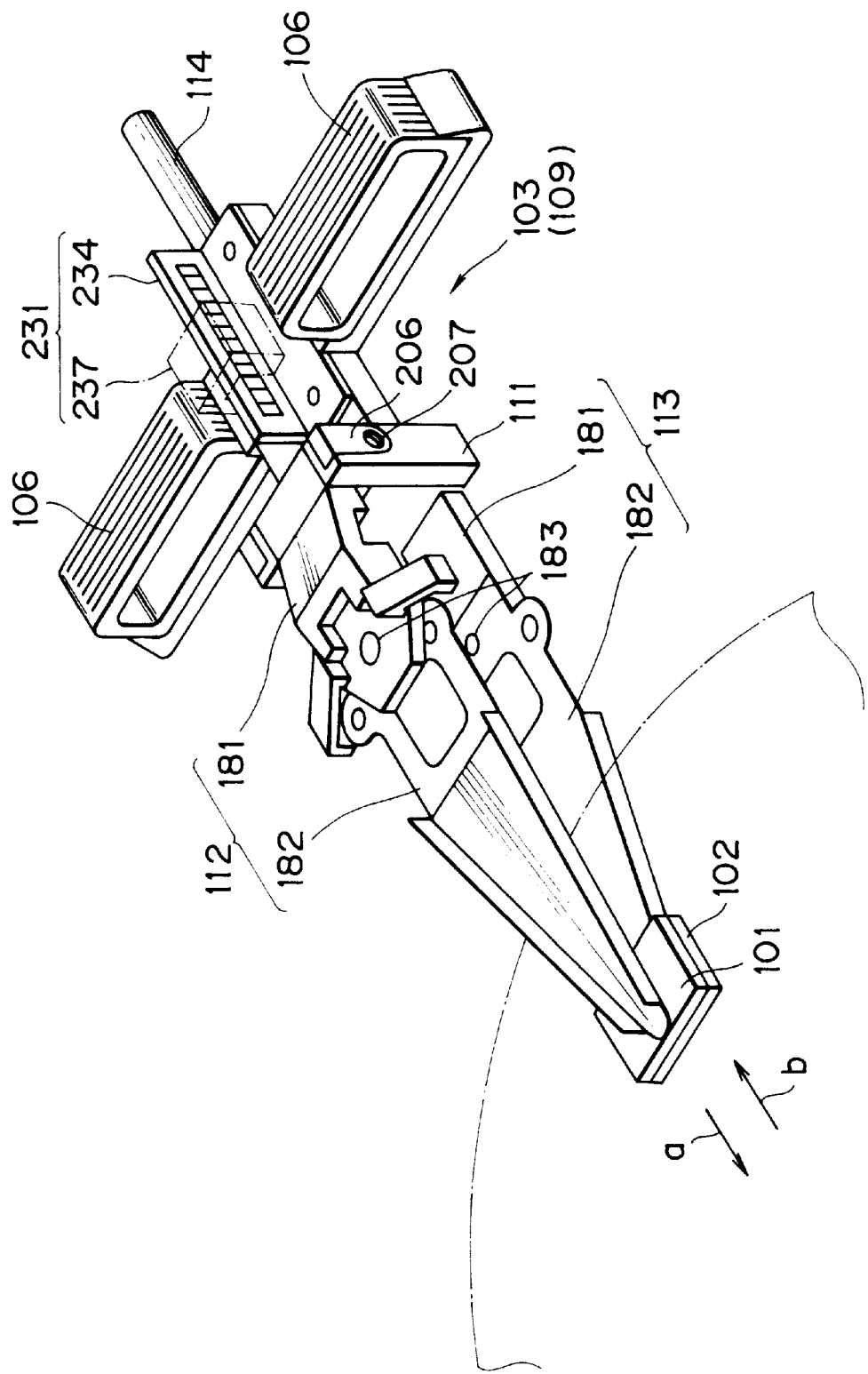
FIG. 24 is an explanatory diagram showing a squint view of a head assembly.
Figure 25:
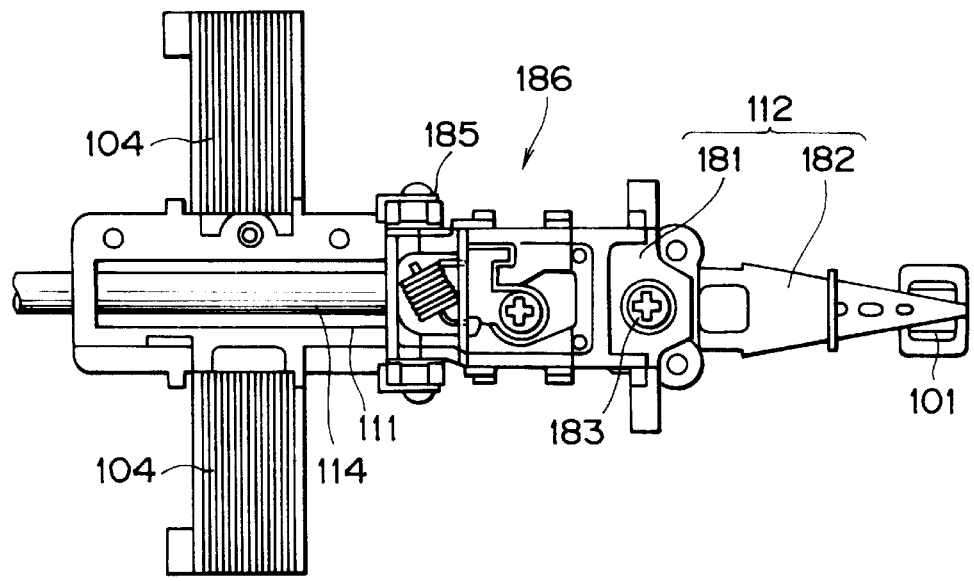
FIG. 25 is a diagram showing a top view of the head assembly shown in FIG. 24.
Figure 26:
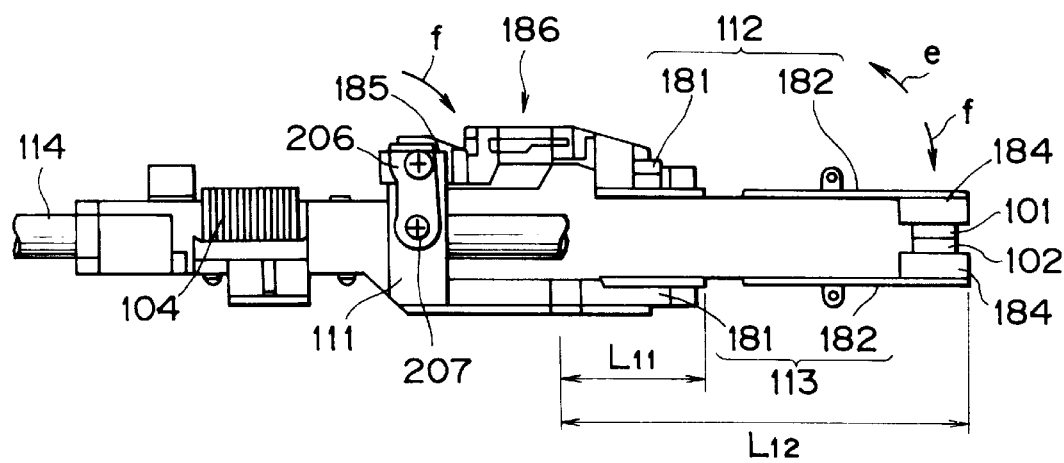
FIG. 26 is a diagram showing a side view of the head assembly shown in FIG. 25.
Figure 27:
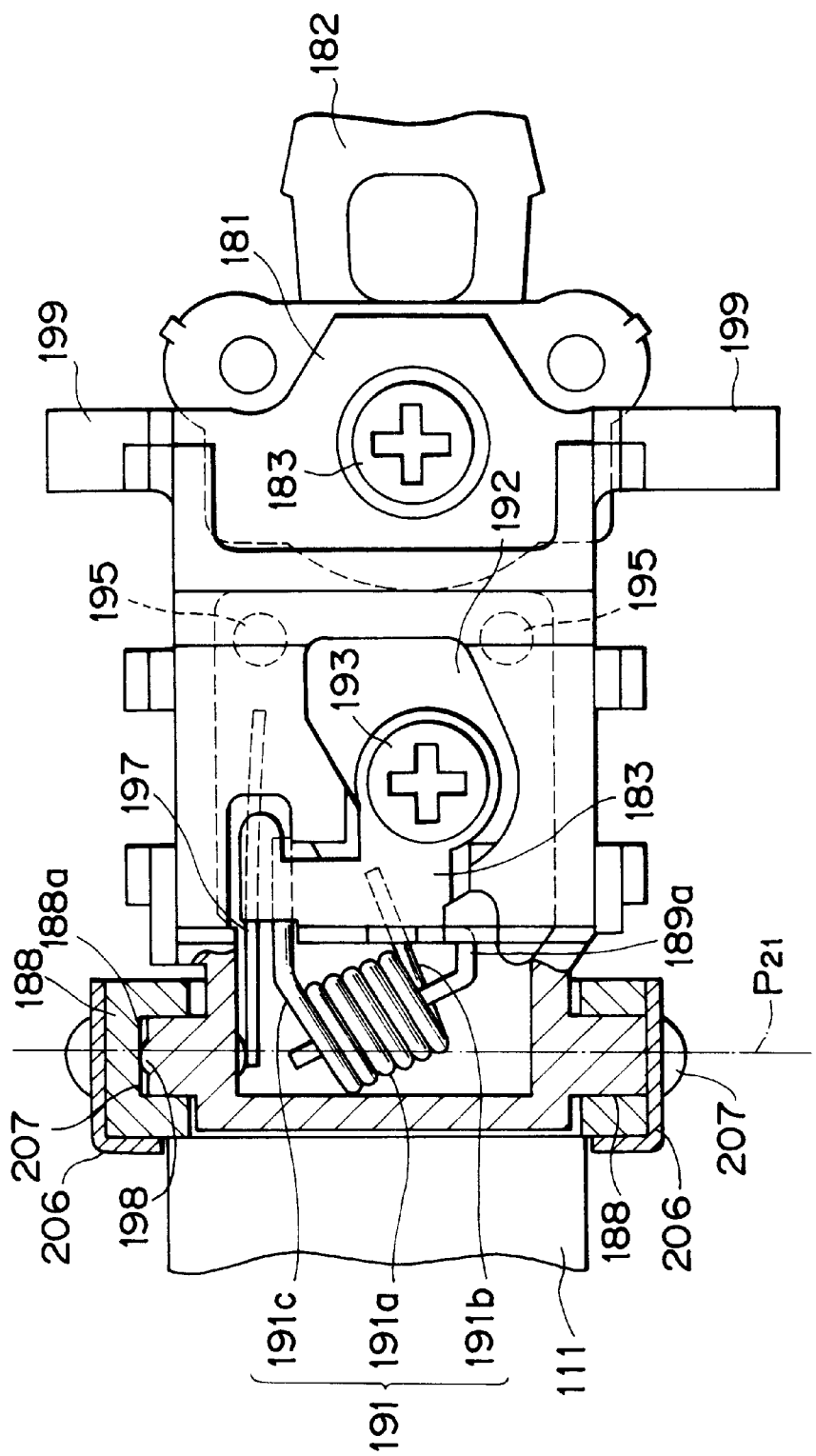
FIG. 27 is a diagram showing a top view of part of a rotation supporting mechanism of the head assembly shown in FIG. 24.

Ahead assembly 110 is described next by referring to FIGS. 24 to 26. The carriage 111 of the head assembly 110 is made of a rigid material such as synthesis resin or a light metal such as aluminum and magnesium. Designed into a flying head structure, the upper and lower magnetic heads 101 and 102 are attached to the front end of the carriage 111 by the upper and lower head arms 112 and 113 respectively. The upper and lower head arms 112 and 113 each comprise an arm base 181 and a suspension 182. The arm base 181 is a mold part made of a rigid material such as synthesis resin or a light metal such as aluminum and magnesium. On the other hand, the suspension 182 is a plate spring made of an elastic material. The suspension 182 is attached to the tip of the arm base 181 by adoption of a machine screw tightening technique using a machine screw 183 or an outsert formation technique, being integrated with the arm base 181. A pair of upper and lower head bases 184 are attached to vertically interfacing surfaces of the ends of the suspensions 182 of the upper and lower head arms 112 and 113. The upper and lower magnetic heads 101 and 102 each having a shape resembling a chip are attached to vertically interfacing surfaces of the upper and lower head bases 184 through gimbal plates which are shown in none of the figures. The length L11 of the arm base 181 of each of the upper and lower magnetic arms 112 and 123 is set at ⅓ of the total length L12 of each of the upper and lower magnetic arms 112 and 123. When the floppy disk cartridge HFDC having a large storage capacity or the floppy disk cartridge FDC having a small storage capacity is loaded and unloaded to the floppy disk drive HFDD for driving a floppy disk cartridge having a large storage capacity in the directions indicated by the arrows a and g and the directions indicated by the arrows h and b as described earlier by referring to FIGS. 7 and 8, it is all but unnecessary to move the lower magnetic head 102 up and down. Thus, the arm base 181 of the lower head arm 113 for supporting the lower magnetic head 102 can be integrated with the carriage 111 or fixed to the carriage 111 by using a machine screw. When the floppy disk cartridge HFDC having a large storage capacity or the floppy disk cartridge FDC having a small storage capacity is loaded and unloaded to the floppy disk drive HFDD for driving a floppy disk cartridge having a large storage capacity in the directions indicated by the arrows a and g and the directions indicated by the arrows h and b, however, it is necessary to move the upper magnetic head 101 up and down to avoid interference by the floppy disk cartridge HFDC having a large storage capacity or the floppy disk cartridge FDC having a small storage capacity. For this reason, the arm base 181 of the upper head arm 112 for supporting the upper magnetic head 101 is installed on an upper magnetic head installation base 185 integrated with the carriage 111 in such a way that the arm base 181 can be rotated by a rotation supporting mechanism 186 freely in the directions indicated by the arrows e and f, that is the up and down directions respectively.

In addition, as shown in FIGS. 27 to 31, the rotation supporting mechanism 186 includes a pair of right and left support pins 187 integrated with the mechanism 186. Provided on a rotational center line P21 perpendicular to the scanning center P2 on the right and left sides of the rear end of the arm base 181 of the upper head arm 112, the support pins 185 are each a round shaft. The right and left support pins 187 are moved downward to be put in a state of being engaged with V-shaped support-pin engagement grooves 188 created on the right and left sides of the upper magnetic head installation base 185 as integrated parts of the base 185. A coil 191a of a torsion coil spring 191 is inserted horizontally into a spring supporting arm 190 formed in a horizontal posture on a spring bearing 189 made of a sheet metal or synthesis resin. The torsion coil spring 191 serves as a means for naturally causing a rotation. The spring bearing 189 and the torsion coil spring 191 are inserted into an opening 192 formed on the arm base 181. The spring bearing 189 is fixed downward on the upper magnetic head installation base 185 by a machine screw 193 in order to set the torsion coil spring 191 in a state close to a space between a pair of right and left support pins 187. A spring contact rib 194 is integrated with the arm base 181 in such a way that the spring contact rib 194 crosses a space beneath the torsion coil spring 191 at about the center of the opening 192. A movable end 191b of the torsion coil spring 191 is pressed downward against the spring contact rib 194, resisting a spring force, while a fixed end 191c of the torsion coil spring 191 is pressed upward against the spring bearing 189.

With the rotation supporting mechanism 186 having the configuration described above, since the entire arm base 181 is naturally moved by the torsion coil spring 191 in a direction indicated by the arrow r, that is, a downward direction, the right and left support pins 187 are pressed against a pair of right and left V-shaped grooves 188 in the direction indicated by the arrow r. Then, a rotation driving force is applied to the arm base 181 in a direction indicated by an arrow r, that is, the downward direction with the right and left support pins 181 serving as the center of the rotation. In this configuration, the arm base 181 is pressed in the direction indicated by the arrow f against a pair of right and left reference pins 195 to be settled thereon. The right and left reference pins 195 are integrated with the upper magnetic head installation base 185 on the top of the front end of the base 185. By the front end, the end on the side of the magnetic head 101 is implied.

Thus, with the right and left support pins 187 brought into contact with contact points P22 on the right and left V-shaped grooves 188 respectively in a steady and stable state, the upper head arm 112 can be rotated with the right and left support pins 187 serving as the center of the rotation in the directions indicated by the arrows e and f, that is, the upward and downward directions. Even when the arm base 181 is returned by a force generated by the torsion coil spring 191 in the direction indicated by the arrow f, being brought into contact with the right and left reference pins 195, there will by no means be generated a problem that the right and left support pins 187 are floated above the right and left V-shaped grooves 188. In addition, since an element becoming unstable due to torsion and twists of a component such as a plate spring does not exist at all between the carriage 111 and the upper head arm 112, basically a motion caused by such torsion and twists never occurs as long as no excessively large external force exceeding a spring force generated by the torsion coil spring 191 is applied in a direction indicated by an arrow v, that is, the upward direction. As a result, bad effects of a rolling phenomenon occurring on the upper magnetic head 101 can be effectively eliminated. In addition, it is possible to assure the precision of installation of the suspension 182 employed in the upper head arm 112 on the carriage 111.

Moreover, the front end of an aside setting spring 197 is inserted into a spring engagement groove 196 to be fixed therein. The aside setting spring 197 is typically implemented by a plate spring which serves an aside setting means. The spring engagement groove 196 is formed on a portion on the front end side of the upper magnetic head installation base 185 on the rotation supporting mechanism 186. The entire arm base 181 is sled naturally by the rear end of the aside setting spring 197 in a direction indicated by an arrow w, that is, an aside direction. A pivot 198 integrated on an end surface of one of the support pins 187 (or a side surface of one of the V-shaped grooves 188) is elastically pressed against a side surface of one of the V-shaped grooves 188 (or an end surface of one of the support pins 187). Thus, it is possible to assure the positioning precision of the upper magnetic head 101 supported by the front end of the suspension 182 employed in the upper head arm 112 in the circumferential direction of the floppy disk 1 in spite of the fact that the rotation of the upper head arm 112 in the directions indicated by the arrows e and f can be carried out smoothly. That is, the positioning precision of the upper magnetic head 101 on the floppy disk 1 can be assured with a high degree of reliability. In addition, by employing the arm base 181 made of a rigid material in each of the head arms 112 and 113, the length of the suspension 182 can be reduced. Thus, a vibrating resonance point of the suspension 182 which has a bad effect on the tracking servo can be brought to a high position. As a result, the resonance of the upper and lower magnetic heads 101 and 102 can be eliminated effectively. In addition, in the case of a head arm wherein a long suspension 182 is attached directly to the carriage 111, the spring constant of the suspension 182 becomes more lenient. Thus, when the posture of the floppy disk drive HFDD for driving a floppy disk cartridge having a large storage capacity is changed, the distances from the floppy disk 1 to the upper and lower magnetic heads 101 and 102 also change due to the effect of the weight of the suspension 182, and the floppy disk drive HFDD for driving a floppy disk cartridge having a large storage capacity becomes more sensitive to vibration generated by an external source. By making the suspension 182 short, however, these problems can be solved considerably.

Figure 2:
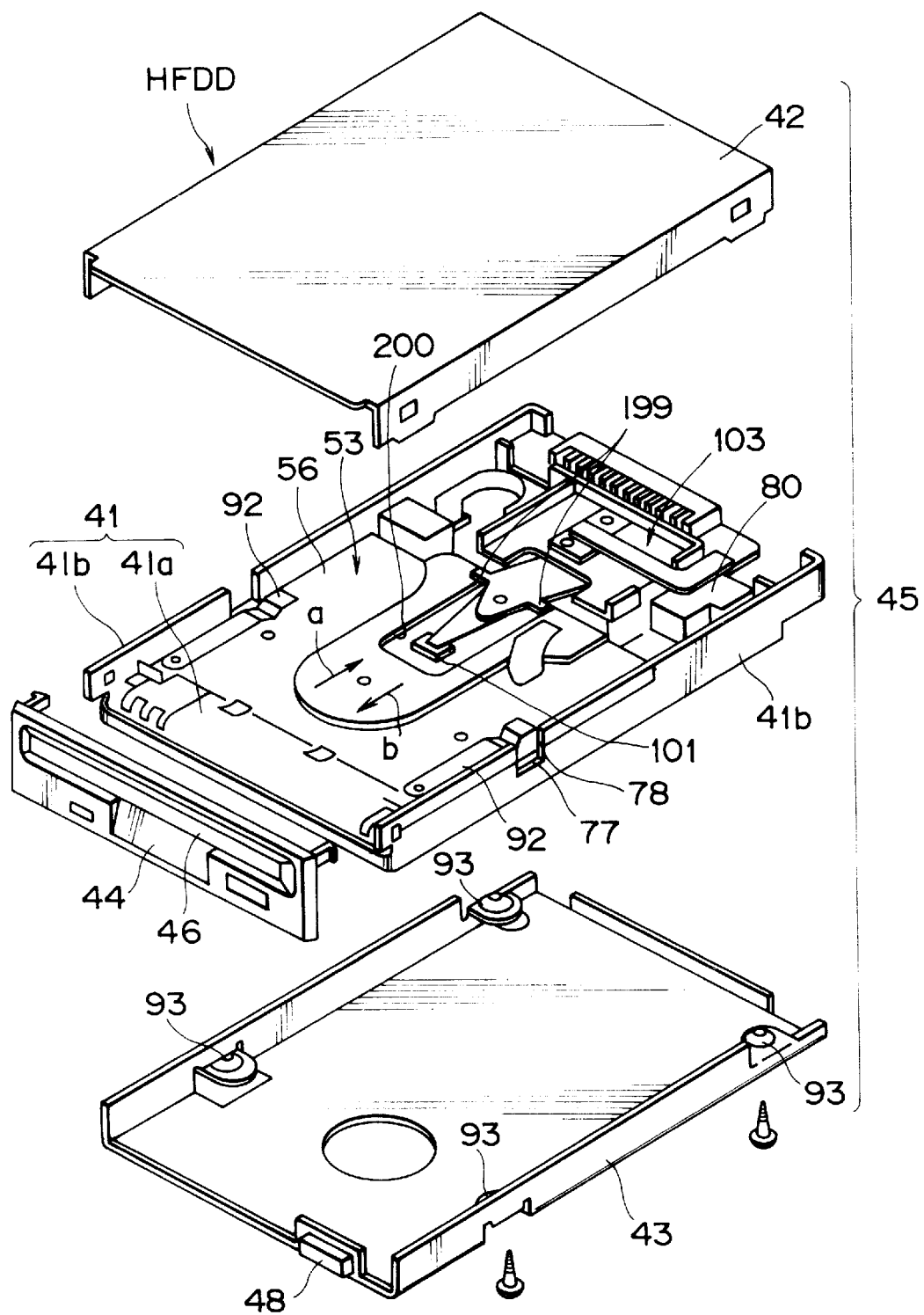
FIG. 2 is a diagram showing a squint view of the floppy disk drive shown in FIG. 1 with top and bottom covers and a front panel thereof disassembled.

In addition, a pair of right and left slide arms 199 are integrated respectively on the right and left sides of the front end, that is, the end on the side of the upper magnetic head 101, of the arm base 181 employed in the upper head arm 112. As shown in FIGS. 2 and 3, the right and left slide arms 199 are mounted on the upper portion of the edges on the right and left sides of a head insertion opening 200 in such a way that the right and left slide arms 199 can be sled freely in the directions indicated by the arrows a and b. The head insertion opening 200 is formed by cutting out the central portion on the rear edge side of the ceiling plate 56a of the cartridge holder 56 along the scanning center P2.

Figure 29:
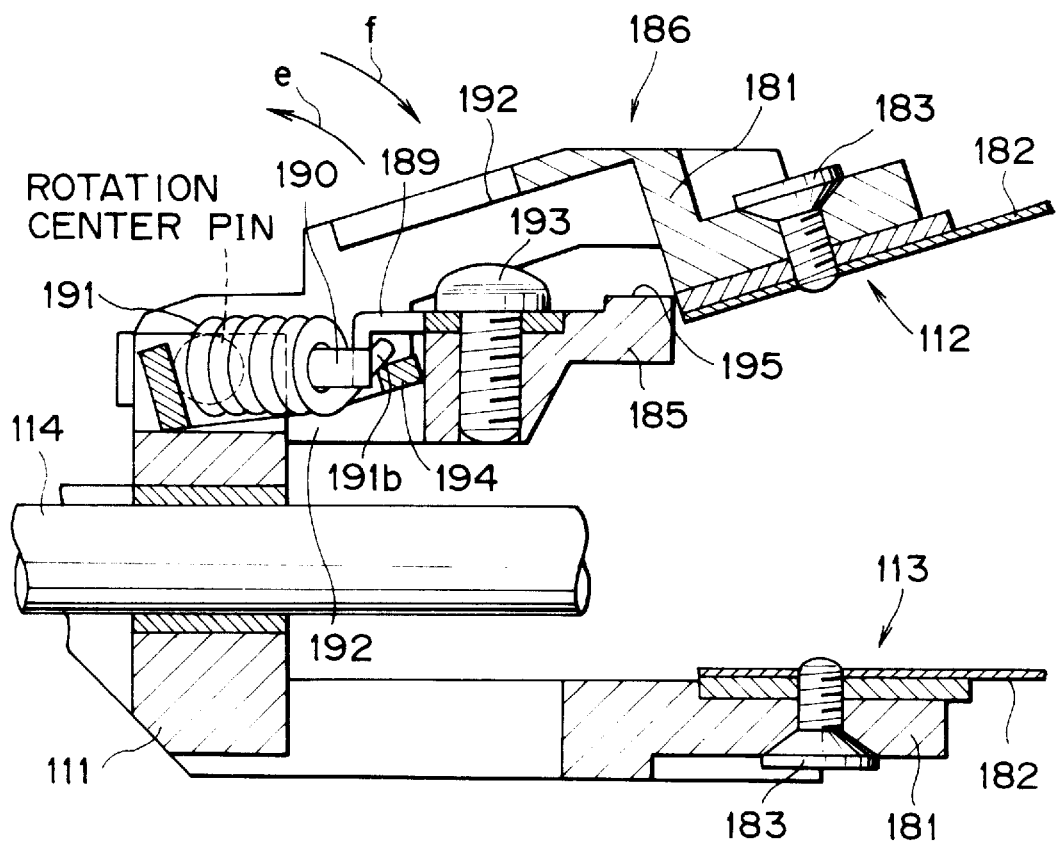
FIG. 29 is a diagram showing a cross section of an upper head arm of the rotation supporting mechanism shown in FIG. 27 with the upper head arm rotated upward.
Figure 31:
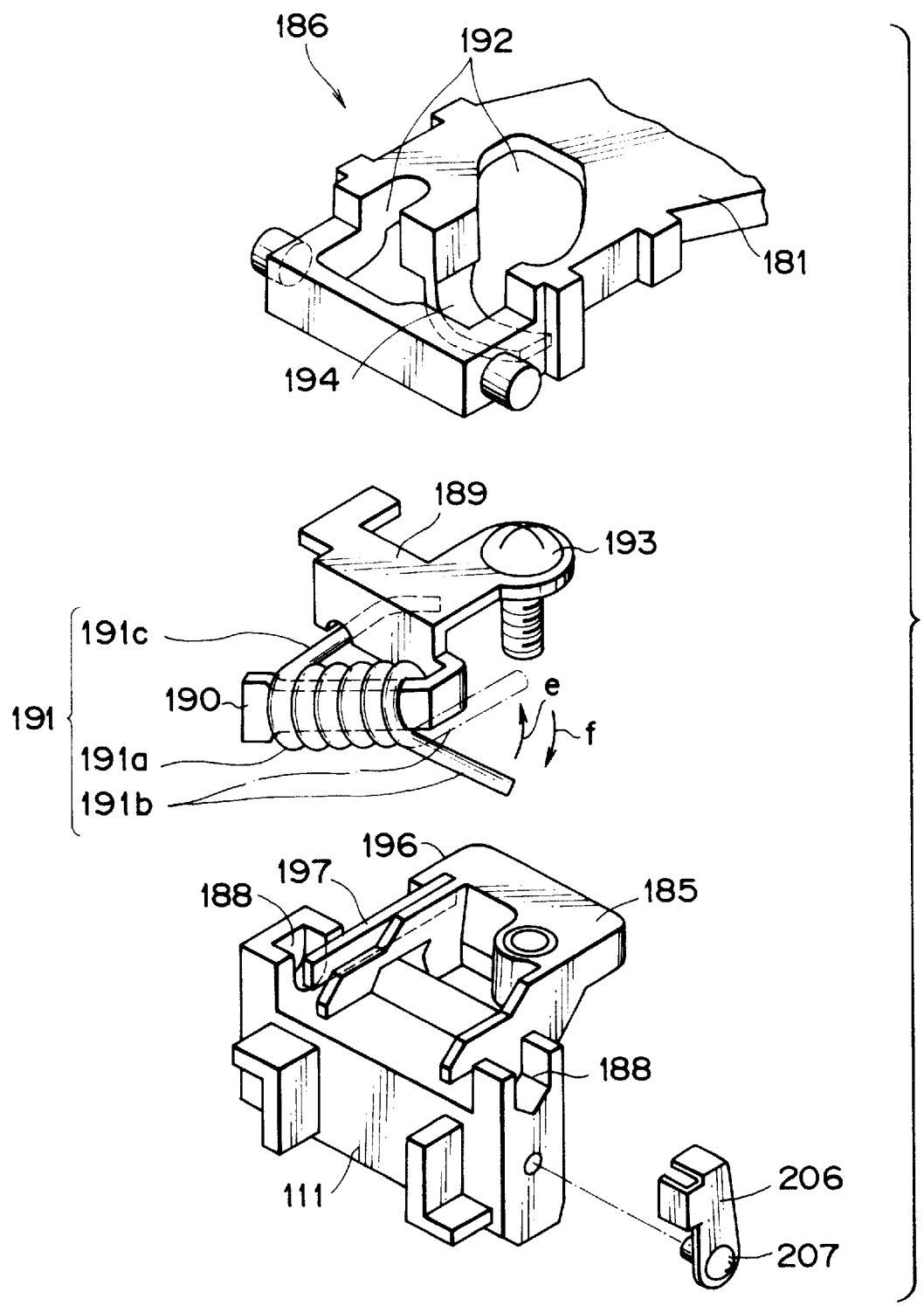
FIG. 31 is a diagram showing a disassembled view of the rotation supporting mechanism shown in FIG. 27.
Figure 32:
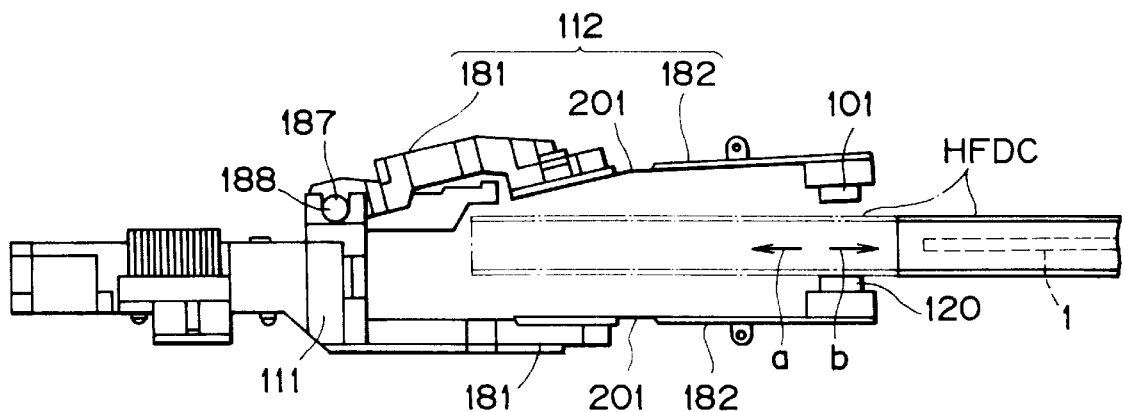
FIG. 32 is an explanatory diagram showing a side view used for describing insertion and removal of a cartridge into and from a space between upper and lower magnetic heads.

Thus, with the floppy disk cartridge HFDC having a large storage capacity or the floppy disk cartridge FDC having a small storage capacity put in an unloading state and the cartridge holder 56 elevated in the direction indicated by the arrow h to the unloading position P13 shown in FIG. 7 in the floppy disk drive HFDD for driving a floppy disk cartridge having a large storage capacity, the right and left slide arms 199 of the upper head arm 112 are pressed upward by the cartridge holder 56 in the direction indicated by the arrow h so that, as shown in FIGS. 29 and 32, the arm base 181 of the upper head arm 112 is rotated upward in the direction indicated by the arrow e with the right and left support pins 188 serving as the center of the rotation, resisting a force generated by the torsion coil spring 191 and the suspension 182 as well as the upper magnetic head 101 are elevated in the direction indicated by the arrow f, being saved at a high position which is not prone to interference by the floppy disk cartridge HFDC having a large storage capacity or the floppy disk cartridge FDC having a small storage capacity being inserted or taken out in the directions indicated by the arrow a or b respectively. On the other hand, the lower magnetic head 102 is set at a low position, which is not prone to interference by the floppy disk cartridge HFDC having a large storage capacity or the floppy disk cartridge FDC having a small storage capacity being inserted or taken out in the directions indicated by the arrow a orb respectively, from the beginning.

Figure 28:
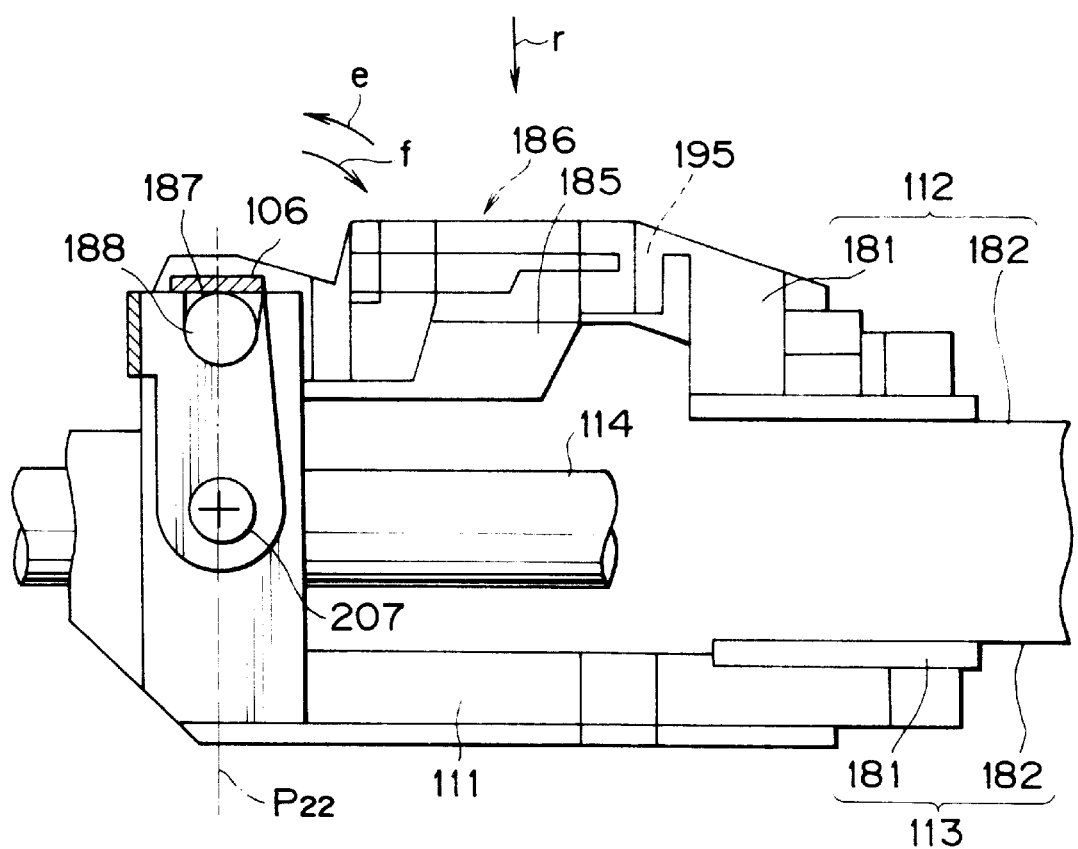
FIG. 28 is a diagram showing a side view of the rotation supporting mechanism shown in FIG. 27.
Figure 33:
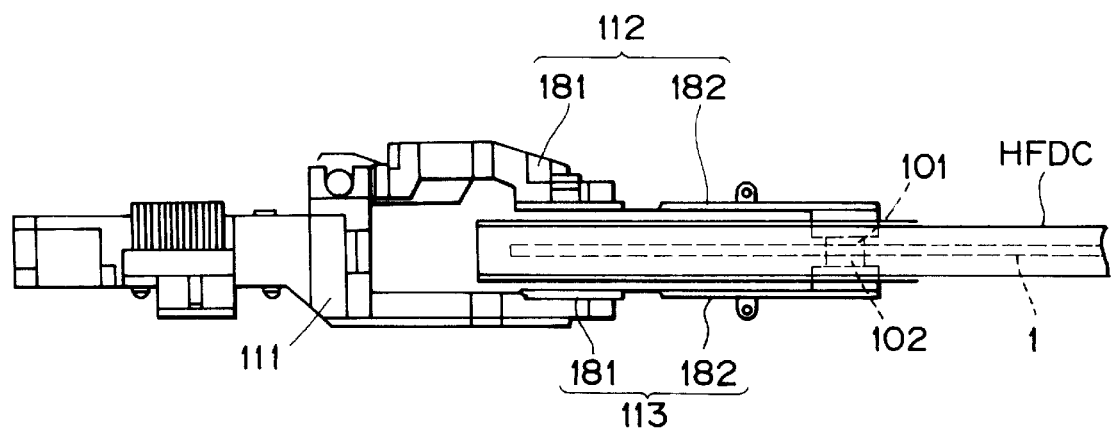
FIG. 33 is an explanatory diagram showing a side view used for describing an operation to record and/or play back data onto and/or from the cartridge inserted into the space between the upper and lower magnetic heads.

Next, when the operation to load the floppy disk cartridge HFDC having a large storage capacity or the floppy disk cartridge FDC having a small storage capacity is completed, the cartridge holder 56 is moved down in the direction indicated by the arrow g to the loading position P14 shown in FIG. 8. In this state, first of all, the lower magnetic head 102 is inserted upward into the lower head insertion hole 7 of the floppy disk cartridge HFDC having a large storage capacity or the floppy disk cartridge FDC having a small storage capacity, being brought into contact with the lower surface of the floppy disk 1 thereof as shown in FIGS. 26 and 33. Then, the cartridge holder 56 is moved down in the direction indicated by the arrow g to a position lower than the lowest possible position of the right and left slide arms 199 of the upper head arm 112. In addition, the arm base 181 of the upper head arm 112 is rotated downward in the direction indicated by the arrow f by the torsion coil spring 191 with the right and left support pins 188 serving as the center of the rotation, being brought into contact with the right and left reference pins 195 and settled thereon as shown in FIGS. 28, 30 and 33. Then, the upper magnetic head 101 is inserted downward by the suspension 182 of the upper head arm 112 into the upper head insertion hole 7 of the floppy disk cartridge HFDC having a large storage capacity or the floppy disk cartridge FDC having a small storage capacity, being brought into contact with the upper surface of the floppy disk 1 thereof.

The most important point is the fact that the distance, the parallelism and the levelness of the upper and lower suspensions 182 relative to the floppy disk 1 are controlled with a high degree of precision in a state wherein the upper and lower magnetic heads 101 and 102 have been brought into contact with the upper and lower surfaces of the floppy disk 1 respectively. It is the rotation supporting mechanism 186 described earlier that makes it possible to control the distance, the parallelism and the levelness of the upper and lower suspensions 182 relative to the floppy disk 1 with a high degree of precision. In addition, since the upper and lower suspensions 181 do not include an element becoming unstable due to torsion and twists at all, the upper and lower magnetic heads 101 and 102 can be floated from the upper and lower surfaces of the floppy disk 1 respectively with a high degree of stability by virtue of a balance of weights of the upper and lower suspensions 182 without causing an irregular rolling phenomenon on the upper and lower magnetic heads 101 and 102 at all particularly in the case of the floppy disk cartridge HFDC having a large storage capacity wherein the floppy disk 1 is driven into rotation at a high rotational speed of at least 3,600 rpm, and the upper and lower magnetic heads 101 and 102 are separated from the upper and lower surfaces of the floppy disk 1 respectively by air films in order to record and/or play back data at a high density onto and/or from the floppy disk 1 with a storage capacity of at least 100 MB. At the same time, the upper and lower magnetic heads 101 and 102 can be driven into smooth scanning even in the event of slight surface vibration occurring on the floppy disk 1, allowing the operation to record and/or play back data onto and/or from the floppy disk 1 to be carried out in a stable and steady state. It should be noted that, much like the upper head arm 112, the lower head arm 113 can also be attached to the carriage 111 by the rotation supporting mechanism 186 in such a way that the lower head arm 113 is freely rotatable in the directions indicated by the arrows e and f, that is, the upward and downward directions respectively.

Figure 34:
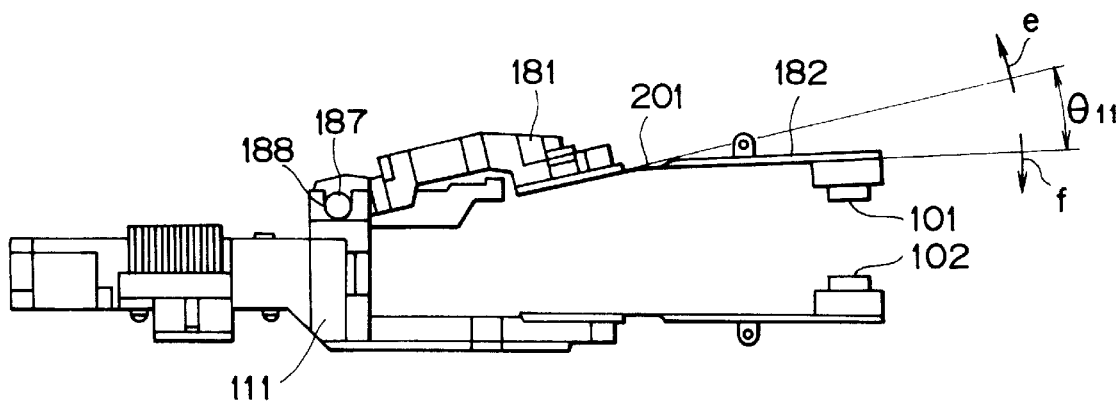
FIG. 34 is an explanatory diagram showing a side view of a freedom angle of the head arm.

By the way, if a freedom angle $\theta 11$ exists for the suspension 182 with respect to the arm base 181 as shown in FIG. 34, when the upper head arm 112 is rotated upward in the direction indicated by the arrow e by the cartridge holder 56 elevated in the direction indicated by the arrow h to the head unloading position, the upper magnetic head 101 may not be elevated by a sufficient distance due to variations in bending angle of a weight bent portion 201 of the suspension 182 in spite of the fact that the arm base 181 has been raised to a sufficient altitude in the direction indicated by the arrow e.

As a result, there may be a danger of the upper magnetic head 101 experiencing interference by the floppy disk cartridge HFDC with a large storage capacity or the floppy disk cartridge FDC with a small storage capacity being inserted and taken out in the directions indicated by the arrows a and b respectively.

Figure 35:
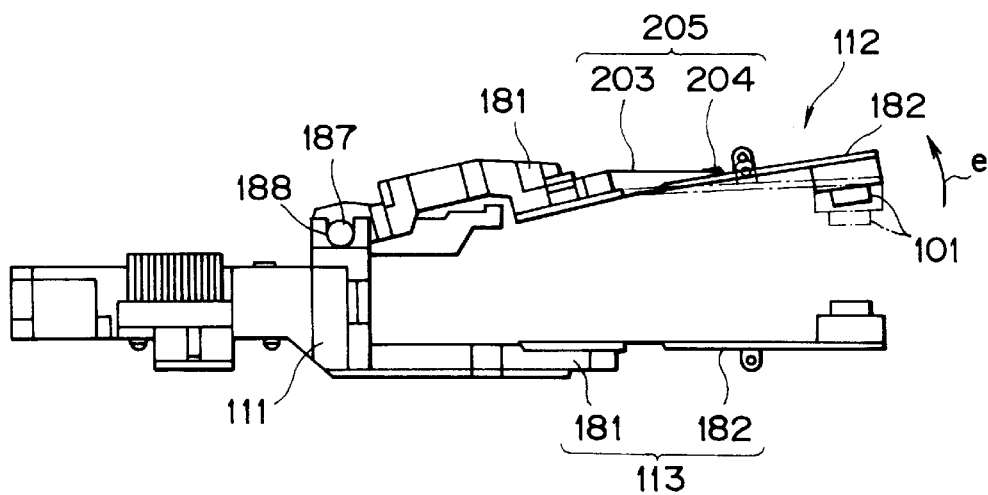
FIG. 35 is an explanatory diagram showing a raising mechanism of the head arm.
Figure 36:
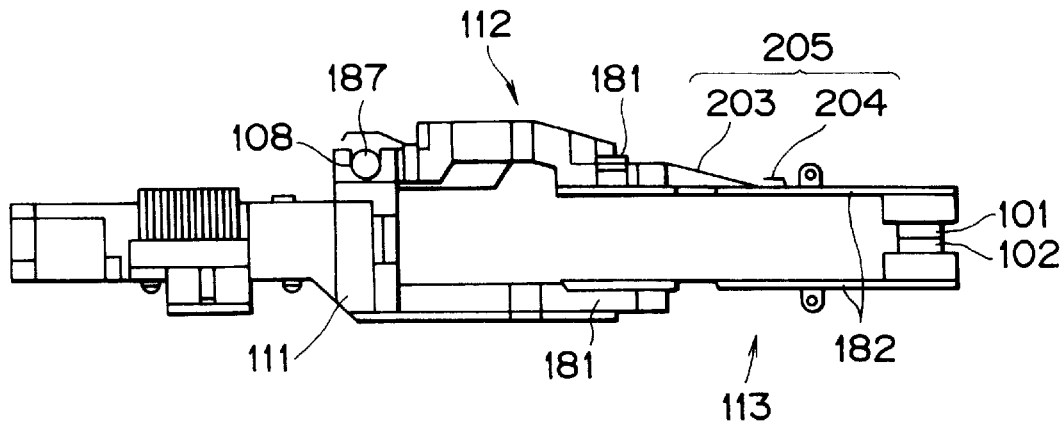
FIG. 36 is a diagram showing a side view of the raising mechanism shown in FIG. 35 with the head arm restored to a stationary position.

In order to avoid such a danger, a raising mechanism 205 is provided for raising the suspension 182 in the direction indicated by the arrow e as shown in FIG. 35. As shown in the figure, the raising mechanism 205 comprises a raising arm 202 and a hook member 204. The edge of the raising arm 202 is hooked on the hook member 204. Integrated with the arm base 181, the raising arm 202 is a forward extension from the front end of the arm base 181. The hook member 204 is provided on the suspension 182 at any position between the weight bent portion 201 and the upper magnetic head 101. With the raising mechanism 205, when the arm base 181 is raised in the direction indicated by the arrow e, the suspension 182 can always be elevated from the lowest position of the freedom angle θ11 shown by a single-dot dashed line in FIG. 35 to a safe high position shown by a solid line in the same figure with a high degree of reliability. As a result, it is possible to avoid the danger of the upper magnetic head 101 experiencing interference by the floppy disk cartridge HFDC with a large storage capacity or the floppy disk cartridge FDC with a small storage capacity being inserted and taken out in the directions indicated by the arrows a and b respectively and, hence, the danger of the upper magnetic head 101 being damaged thereby.

Figure 37:
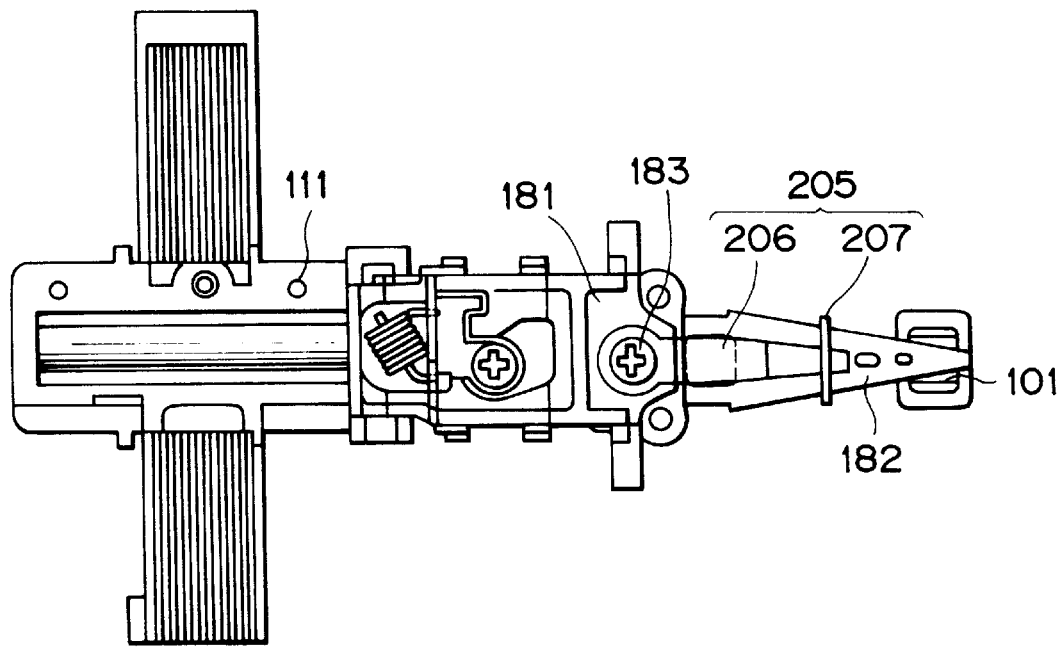
FIG. 37 is an explanatory diagram showing another embodiment implementing the raising mechanism of the head arm.
Figure 38:
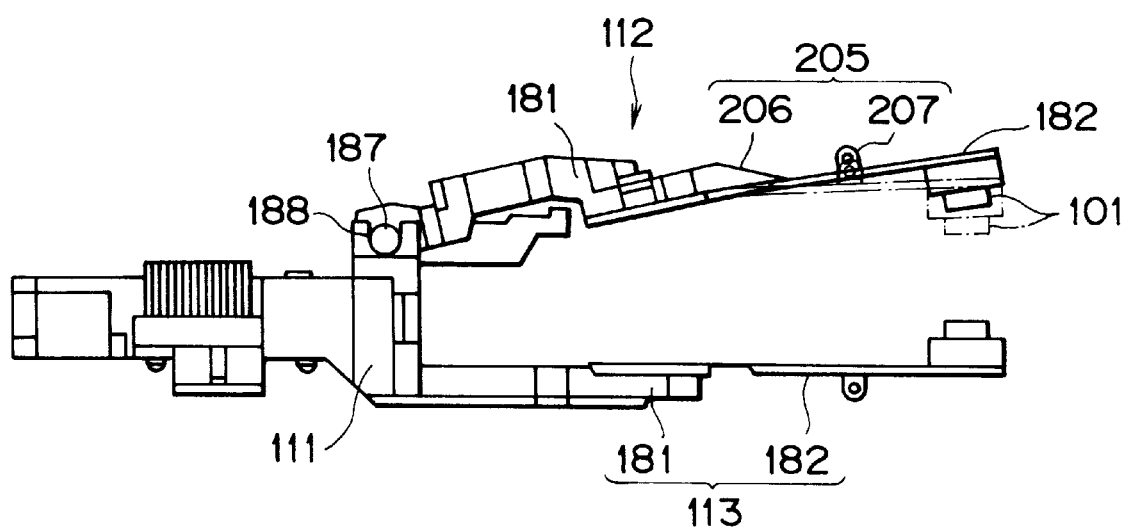
FIG. 38 is a diagram showing a side view of the raising mechanism shown in FIG. 37.

There are a variety of versions of the raising mechanism 205 such as ones shown in FIGS. 37 and 38. As shown in the figures, used for raising the suspension 182 in the direction indicated by the arrow e, the raising mechanism 205 comprises a raising arm 206 and a pin 207. The raising arm 206 is typically a plate spring which is tightened on the arm base 181 normally by a machine screw 183. The edge of the raising arm 206 is hooked on the pin 207 which is installed on the suspension 182 in a horizontal posture at any location between the weight bent portion 201 and the upper magnetic head 101.

(9) Description of a Soft Loading Mechanism

Figure 39:
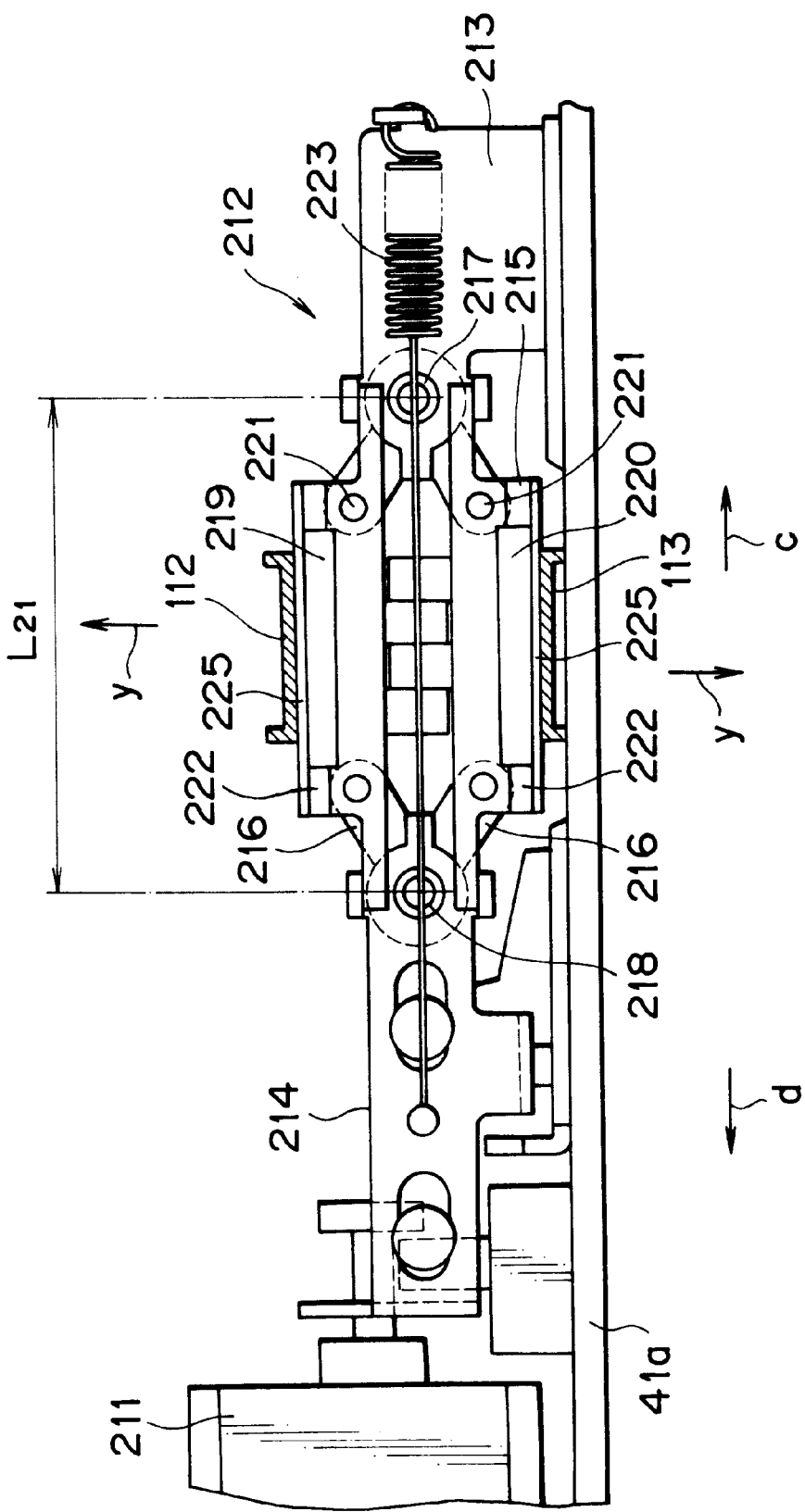
FIG. 39 is a diagram showing a front view of part of a soft loading mechanism with the head arm put in an opened state.

The following is a description of a soft loading mechanism 212 shown by a single-dot dashed line in FIG. 39. Provided on the chassis 41 at a location between the upper and lower head arms 112 as shown in the figure, the soft loading mechanism 212 includes a plunger solenoid 211, a fixed plate 213, a slide plate 214, a total of 4 V-shaped links 215 and 216, a pair of right and left common supporting-point pins 217 and 218, a pair of upper and lower raising members 219 and 220, a total of 4 joining pins 221 and 222 and a pull coil spring 223. In this configuration, the fixed plate 214 is fixed on the chassis 41. To put it in detail, the slide plate 214 is attached to the chassis 41 in such a way that the slide plate 214 can be sled over the surface of the chassis 41 freely in the directions indicated by the arrows c and d. The 4 V-shaped links 215 and 216 are attached to the slide plate 214 by the right and left common supporting-point pins 217 and 218 symmetrically with respect to the slide plate 214 in such a way that the 4 V-shaped links 215 and 216 is freely rotatable. The upper and lower raising members 219 and 220 are placed in a horizontal posture between the upper and lower ends of the 4 V-shaped links 215 and 216. The right and left ends of the upper and lower raising members 219 and 220 are attached to the edges of the 4 V-shaped links 215 and 216 by the 4 joining pins 221 and 222 in such a way that the upper and lower raising members 219 and 220 is freely rotatable. The slide plate 214 can be naturally sled by the pull coil spring 223 in the direction indicated by the arrow c and driven by a plunger 211a of the plunger solenoid 211 to slide in the direction indicated by the arrow d. The pull coil spring 223 is a natural sliding means installed between the fixed plate 213 and the slide plate 214. In addition, cams 224 are formed on the upper and lower surfaces of the upper and lower raising members 219 and 220 and cam driven units 225 are provided on mutually facing upper and lower surfaces of the upper and lower head arms 112 and 113.

Figure 41A:
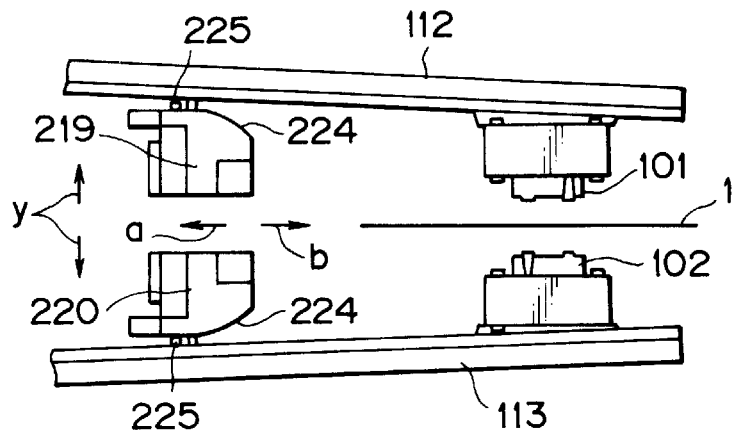
FIGS. 41A to 41C are explanatory diagrams used for describing a soft loading operation of the soft loading mechanism.

With this soft loading mechanism 212, when an operation to record and/or play back data onto and/from the floppy disk 1 is completed, the slide plate 214 is driven by the pull coil spring 223 to slide in the direction indicated by the arrow c as shown in FIGS. 39 and 41A. As the distance L21 between the right and left common-supporting-point pins 217 is shrunk, the 4 V-shaped links 215 and 216 are opened upward and downward, driving the upper and lower raising members 219 and 220 to open in directions indicated by an arrow y, that is, the upward and downward directions. Then, when the upper and lower magnetic heads 101 and 102 are moved in the direction indicated by the arrow a by the linear actuator 103 later on to be saved at the outermost circumference positions of the floppy disk 1, as shown in FIG. 41A, the cam driven units 225 of the upper and lower head arms 112 and 113 ascend the cams 224 of the upper and lower raising members 219 and 220 respectively in the direction indicated by the arrow a, opening the upper and lower head arms 112 and 113.

Figure 41B:
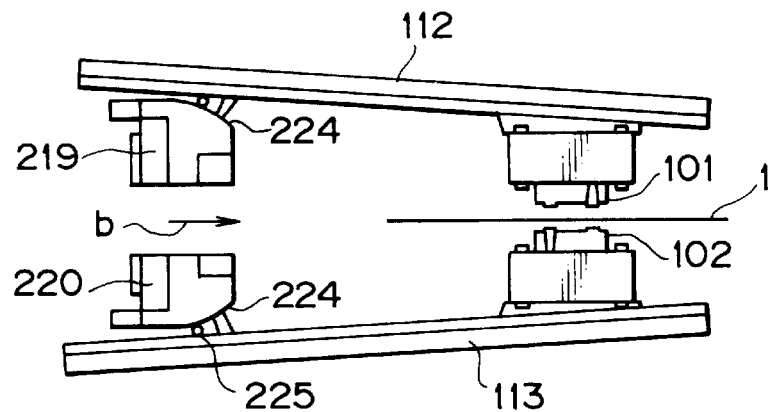
Figure 41C:
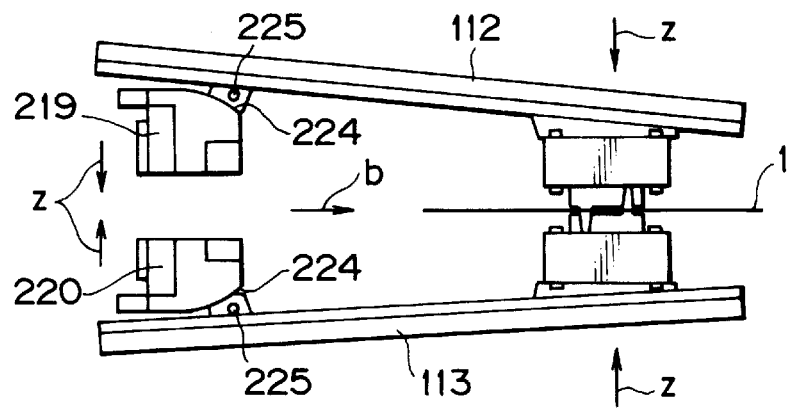

Next, when the upper and lower magnetic heads 101 and 102 are moved by the linear actuator 103 from the outermost circumference positions of the floppy disk 1 to a data recording area thereon in an operation to record and/or play back data onto and/or from the floppy disk 1 as show in FIG. 41A, the cam driven units 225 of the upper and lower head arms 112 and 113 quietly descend the cams 224 of the upper and lower raising members 219 and 220 respectively in the direction indicated by the arrow b as shown in FIG. 41B, causing the upper and lower magnetic heads 101 and 102 to eventually come in contact quietly with the upper and lower surfaces of the floppy disk 1 respectively as shown in FIG. 41C. In this way, a soft loading operation is implemented.

Figure 40:
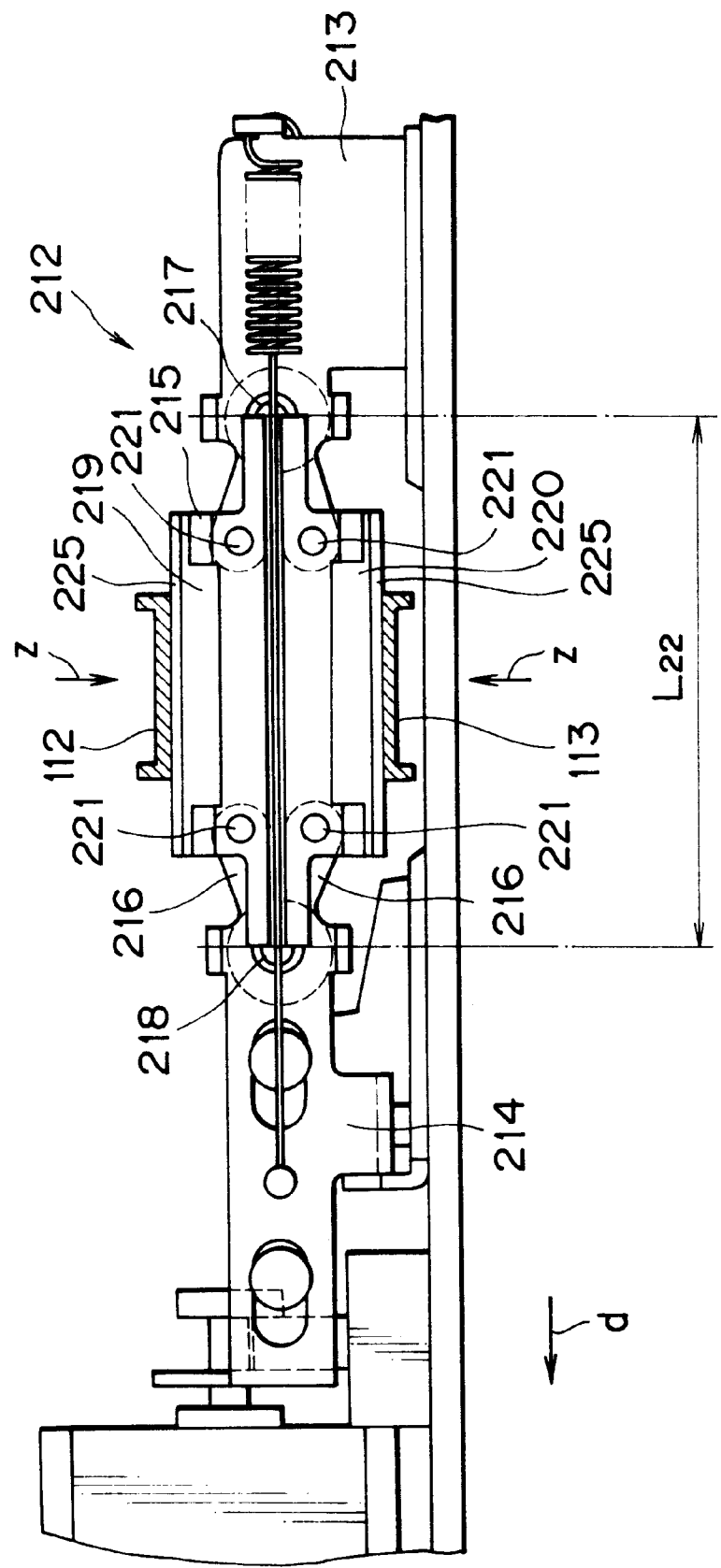
FIG. 40 is a diagram showing a front view of part of the soft loading mechanism with the head arm put in an closed state.

When a sensor shown in none of the figures detects the fact that the upper and lower magnetic heads 112 and 113 have advanced into the data recording area on the floppy disk 1, the plunger solenoid 211 is excited and, as a result, the plunger 211a thereof drives the slide plate 214 to slide in the direction indicated by the arrow d, resisting a force generated by the pull coil spring 223 as shown in FIG. 40. By doing so, the distance L22 between the right and left common-supporting point pins 217 increases and the 4 V-shaped links 215 and 216 are closed vertically, closing the upper and lower raising members 219 and 220 in a direction indicated by an arrow z, that is, the vertical direction. Thus, the upper and lower raising members 219 and 220 no longer experience interference by the cam driven units 225 of the upper and lower head arms 112 and 113 respectively. As a result, the operation to record and/or play back data onto and/or from the floppy disk 1 can be carried out smoothly.

In the floppy disk drive HFDD for driving a floppy disk cartridge having a large storage capacity having a soft loading mechanism 212 as described above, the flying head configuration allows the upper and lower magnetic heads 101 and 102, which can not be said to be sufficiently proof against impacts, to be brought respectively into contact with the upper and lower surfaces of the floppy disk 1 safely with a high degree of reliability. As a result, good safety and excellent durability can be assured.

(10) Description of a Scale for Tracking

Figure 43:
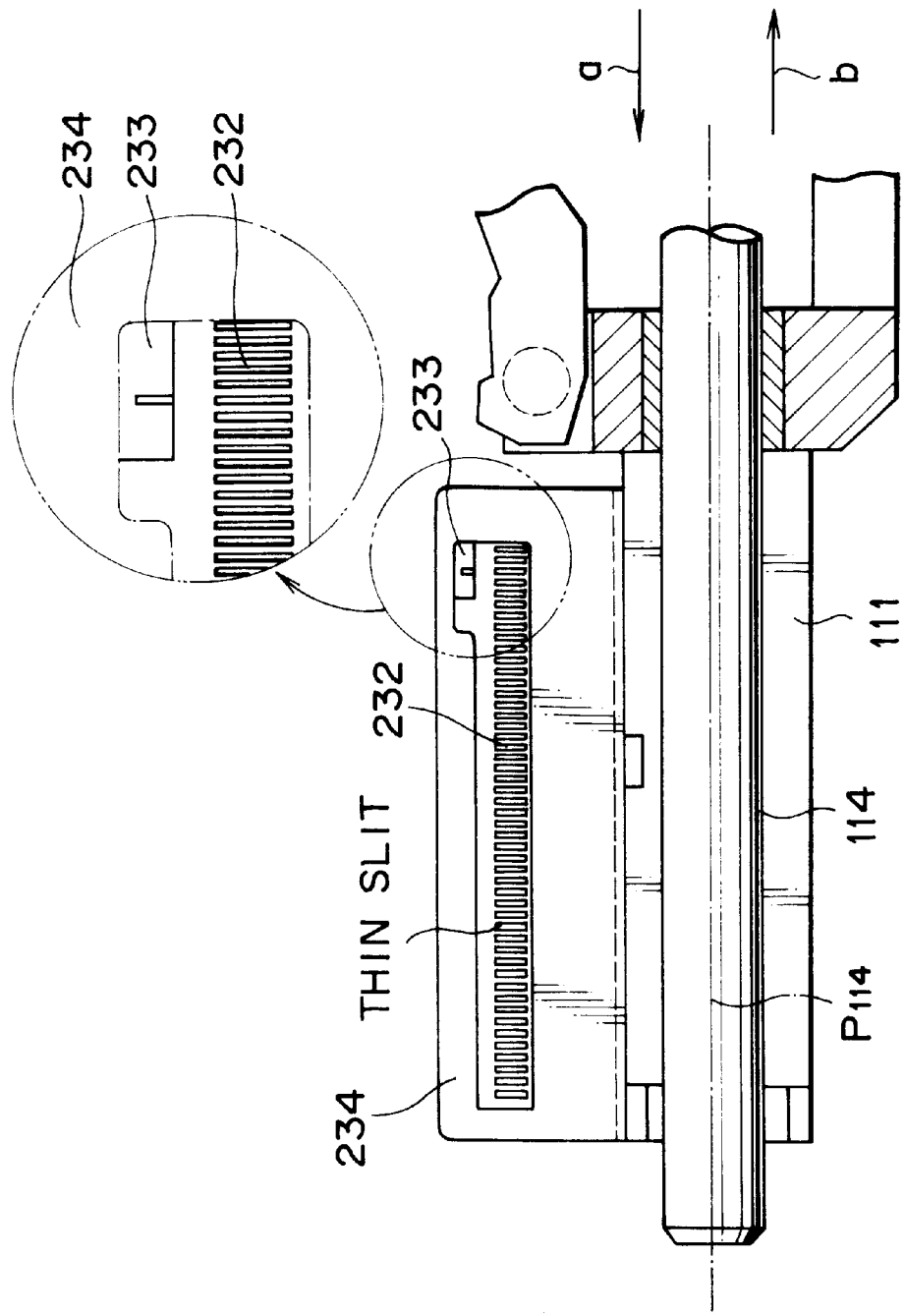
FIG. 43 is a diagram showing a cross section along a line indicated by arrows 43—43 in FIG. 42.
Figure 44:
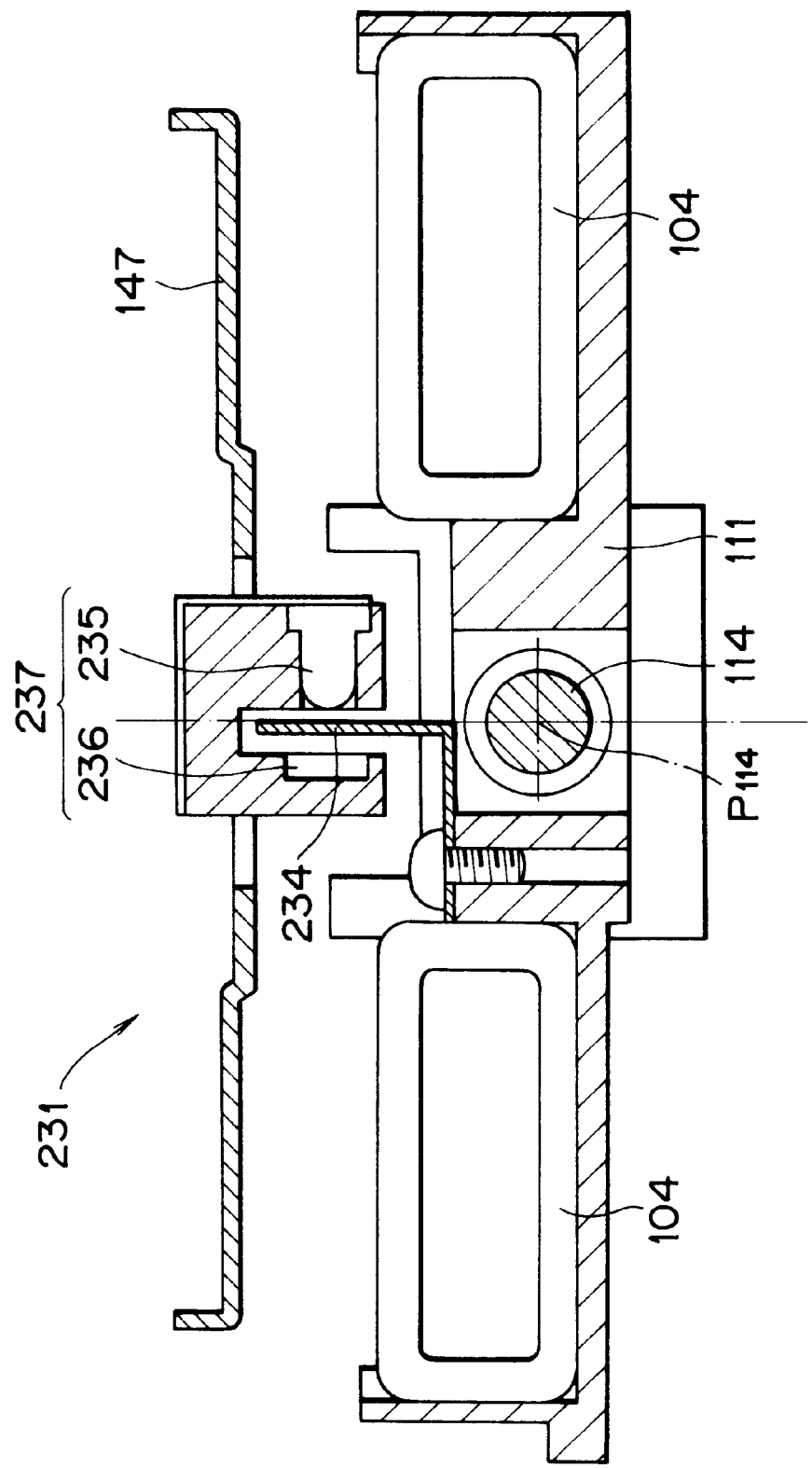
FIG. 44 is a diagram showing a cross section along a line indicated by arrows 44—44 in FIG. 42.

As shown in FIGS. 42 to 44, a tracking scale 231 is mounted on the linear actuator 103. The tracking scale 231 is a scale for making the floppy disk drive HFDD for driving a floppy disk cartridge having a large storage capacity compatible with the floppy disk 1 of the floppy disk cartridge FDC having a small storage capacity by tracking the floppy disk 1 of the small storage capacity floppy disk cartridge FDC. The tracking scale 1 includes a thin plate track gage 234 and an optical sensor 237. The thin plate track gage 234 has an opening 233 for detecting a lit group 232 having a pitch equal to that of the small storage capacity floppy disk 1 and the outermost circumference position of the small storage capacity floppy disk 1. The optical sensor 237 comprises a light emitting unit 235 implemented by a light emitting device for detecting the positions of the slit group 232 and the opening 233 and a light receiving unit 236 implemented by a light receiving device for receiving a light emitted by the light emitting unit 235. The track gage 234 is positioned on the carriage 111 by a positioning dowel 237 and fixed thereon in a vertical posture by using a machine screw 238. The track gage is installed in a posture parallel to the scanning center P2. On the other hand, the optical sensor 237 is installed beneath the yoke restraining plate 147 with the light emitting unit 235 and the light receiving unit 236 thereof placed on the right and left sides of the track gage 234 respectively. When the upper and lower magnetic heads 101 and 102 are moved by the linear actuator 103 along the scanning center P2 in a seek operation following a ray radiated from the center of the small storage capacity floppy disk 1, the slit group 232 of the track gage 234 is read out sequentially by the optical sensor 237 to detect the position of a data track in order to carry out tracking of the upper and lower magnetic heads 101 and 102 with respect to the position of a specified data track. In this configuration, the optical sensor 237 is capable of detecting the outermost circumference position of the small storage capacity optical disk 1 by detecting the opening 233.

By placing the track gage 234 at the axial center P114 of the guide main shaft 114 or at a location in close proximity to the axial center P114 in a posture parallel to the axial center P114, the tracking scale 231 is capable of substantially improving a tracking hysteresis and an off-track caused by a backlash of the thrust bearing 172 of the guide main shaft 114.

Figure 46:
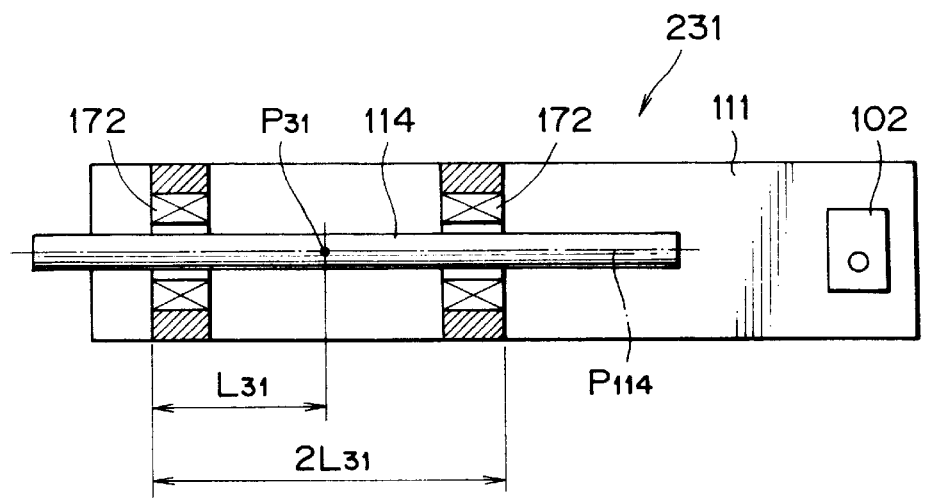
FIG. 46 is a diagram used for explaining another problem of the conventional tracking scale.
Figure 47:
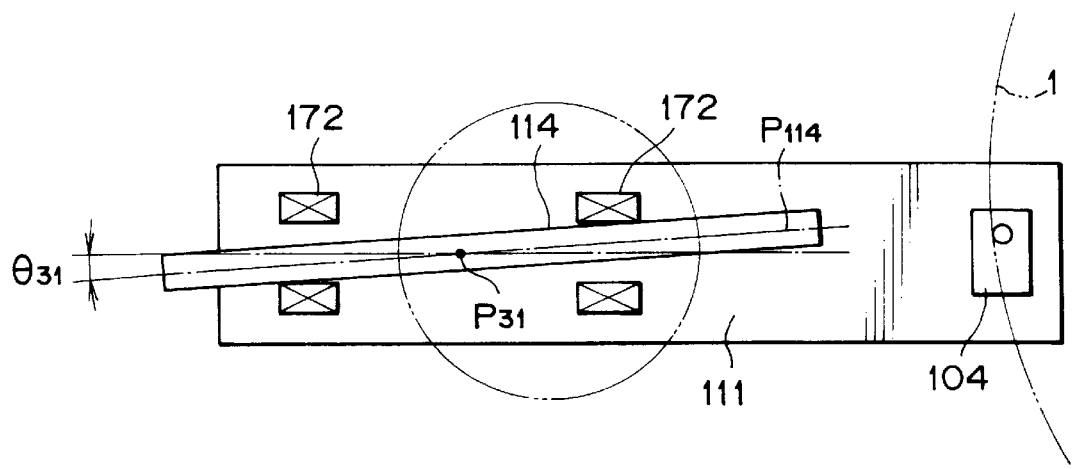
FIG. 47 is a diagram used for explaining still another problem of the conventional tracking scale.
Figure 48:
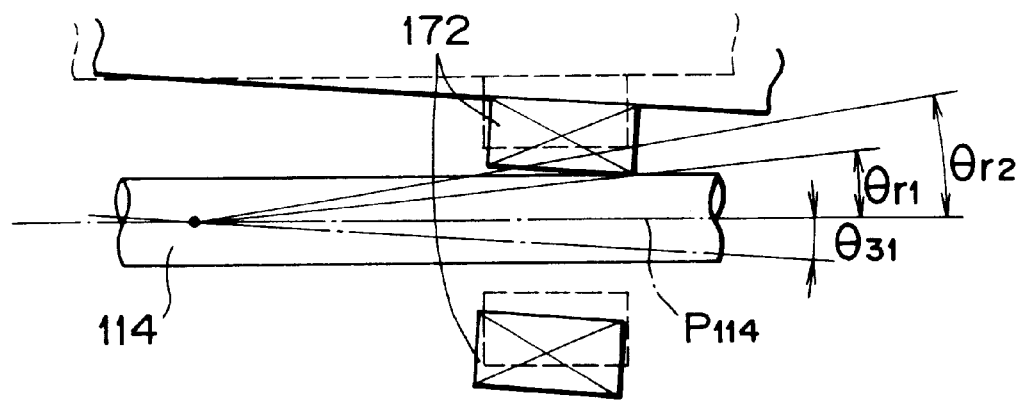
FIG. 48 is a diagram used for explaining a further problem of the conventional tracking scale.
Figure 49:
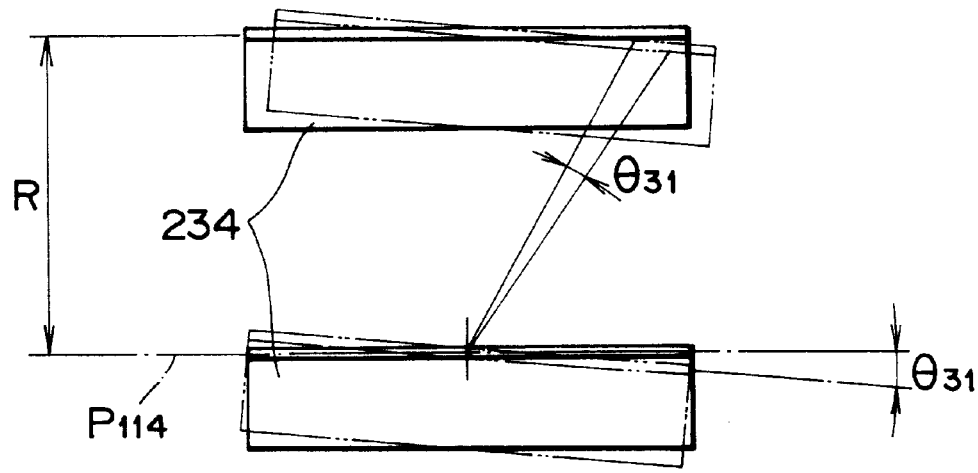
FIG. 49 is an explanatory diagram used for describing comparison of a tracking scale employed in a floppy disk drive for driving a floppy disk cartridge having a large storage capacity with the conventional one.

If the space factor of the space inside the chassis 41 is to be taken into consideration, it is a design merit to install the tracking scale 231 on the transversal side surface on the side opposite to the eject motor 80 of the carriage 111 as shown in FIG. 45. As shown in FIG. 46, however, there is a clearance of (2r2−2r1) in the thrust bearing 172 of the guide main shaft 114 where notation 2r1 is the diameter of the guide main shaft 114 and notation 2r2 denotes the diameter of the guide auxiliary shaft 115. This clearance gives rise to a backlash of guide main shaft 114. In addition, this clearance also causes the carriage 111 to swing from the guide main shaft 114 by θ31 with the middle point P31 of a span L31 between 2 thrust bearings 172 serving as the center of rotation as shown in FIG. 47. As shown in FIG. 48, the lengths of arcs θr1 and θr2 measured from the longitudinal axis of the carriage 111 at rotation radii r1 and r2 are proportional to the radii r1 and r2 respectively. As is also obvious from this principle, comparison of a state of the tracking scale 231 separated away from the axial center P114 of the guide main shaft 114 by a radius R with a state of the tracking scale 231 placed at the axial center P114 of the guide main shaft 114 indicates the displacements X1 and X2 in the seek direction at a point B of the tracking state increase in proportion to the radius R even for the same rotation angle θ31 of the carriage 111 as shown in FIG. 49.

Thus, if the tracking scale 231 is provided on the transversal side surface of the carriage 111, the distance between the tracking scale 231 and the axial center P114 of the guide main shaft 114 increases. Therefore, the positional shift of the tracking scale 231 in the seek direction accompanying the rotation of the carriage 111 increases. As a result, the tracking performance deteriorates as evidenced by, among other phenomena, an increased tracking hysteresis.

It should be noted that, when the tracking scale 231 is placed at the axial center P114 of the guide main shaft 114 or at a location in close proximity to the axial center P114, the track gage 234 can be provided on the side right above or right below the guide main shaft 114. In addition, either the tracking gage 234 or the optical sensor 237 can be mounted on the carriage 111 and fixed on the chassis 41. If the tracking gage 234 is fixed on the chassis 41 and the optical sensor 237 is mounted on the carriage 111, it is desirable to install the light receiving unit 236 at the axial center P114 of the guide main shaft 114 or at a location in close proximity to the axial center P114.

(11) Description of a Tracking Servo

Figures 50A, 50B:
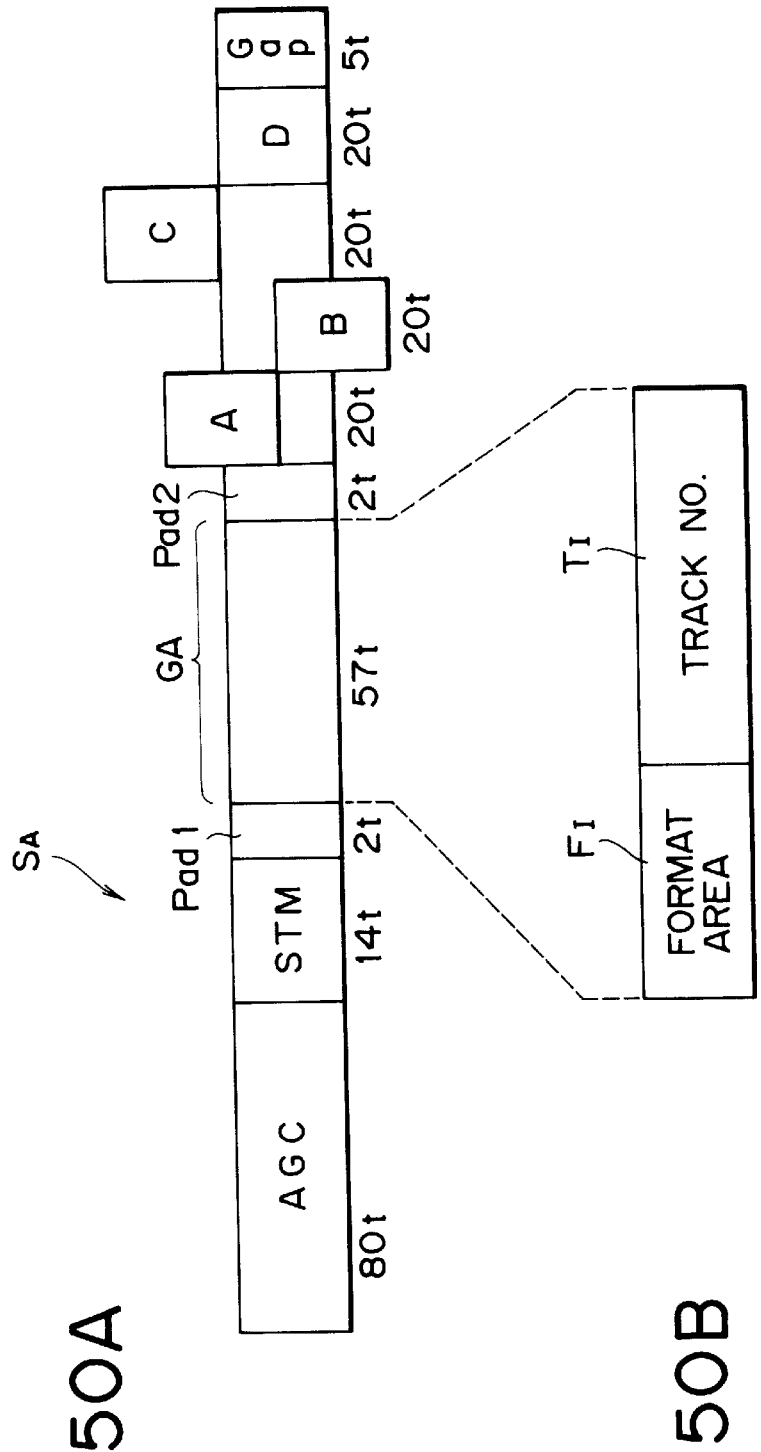
FIGS. 50A and 50B are explanatory diagrams showing a tracking servo.
Figure 51:
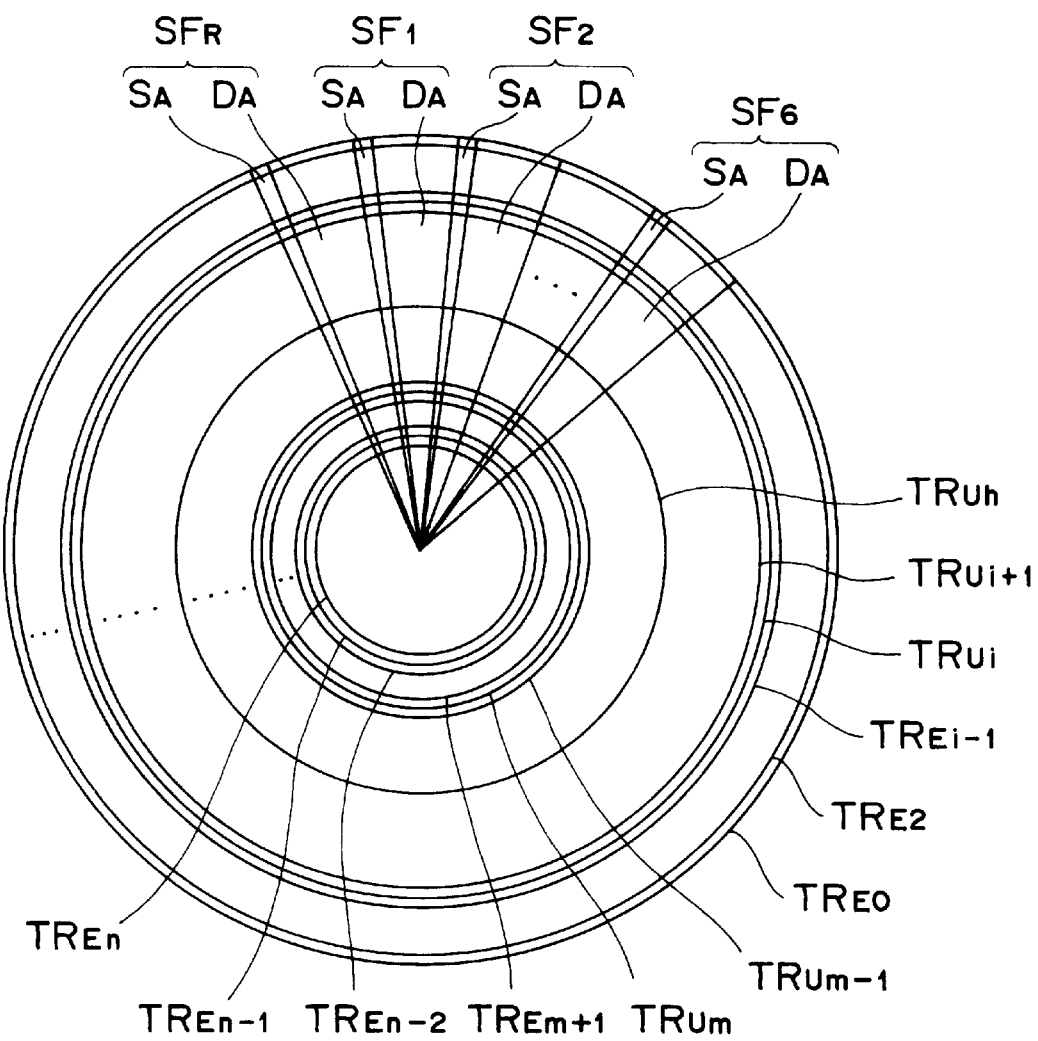
FIG. 51 is an explanatory diagram showing a floppy disk and used for describing the tracking servo.
Figure 52:
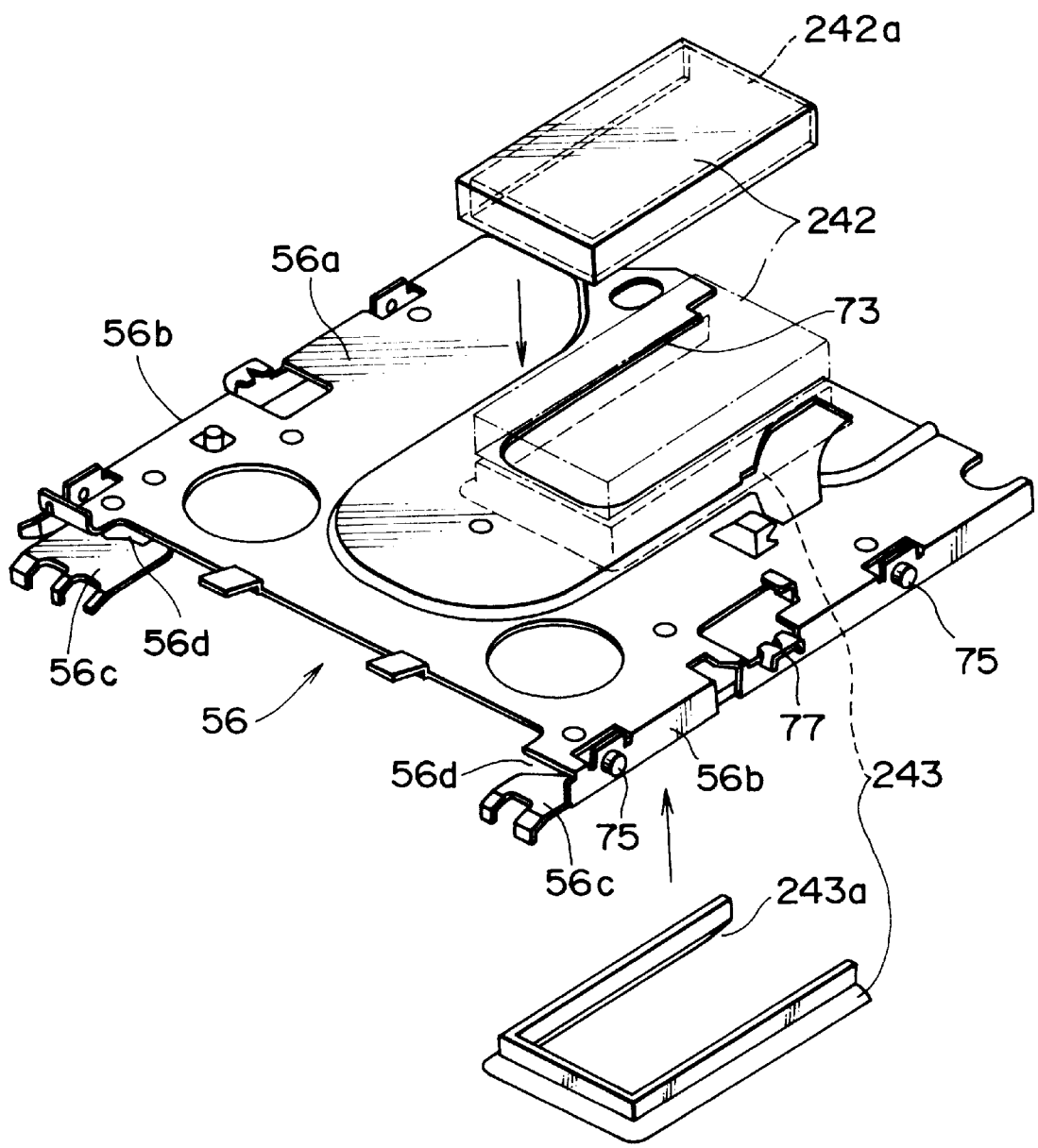
FIG. 52 is an explanatory diagram showing a disassembled cartridge holder in a dust shielding unit.
Figure 53:
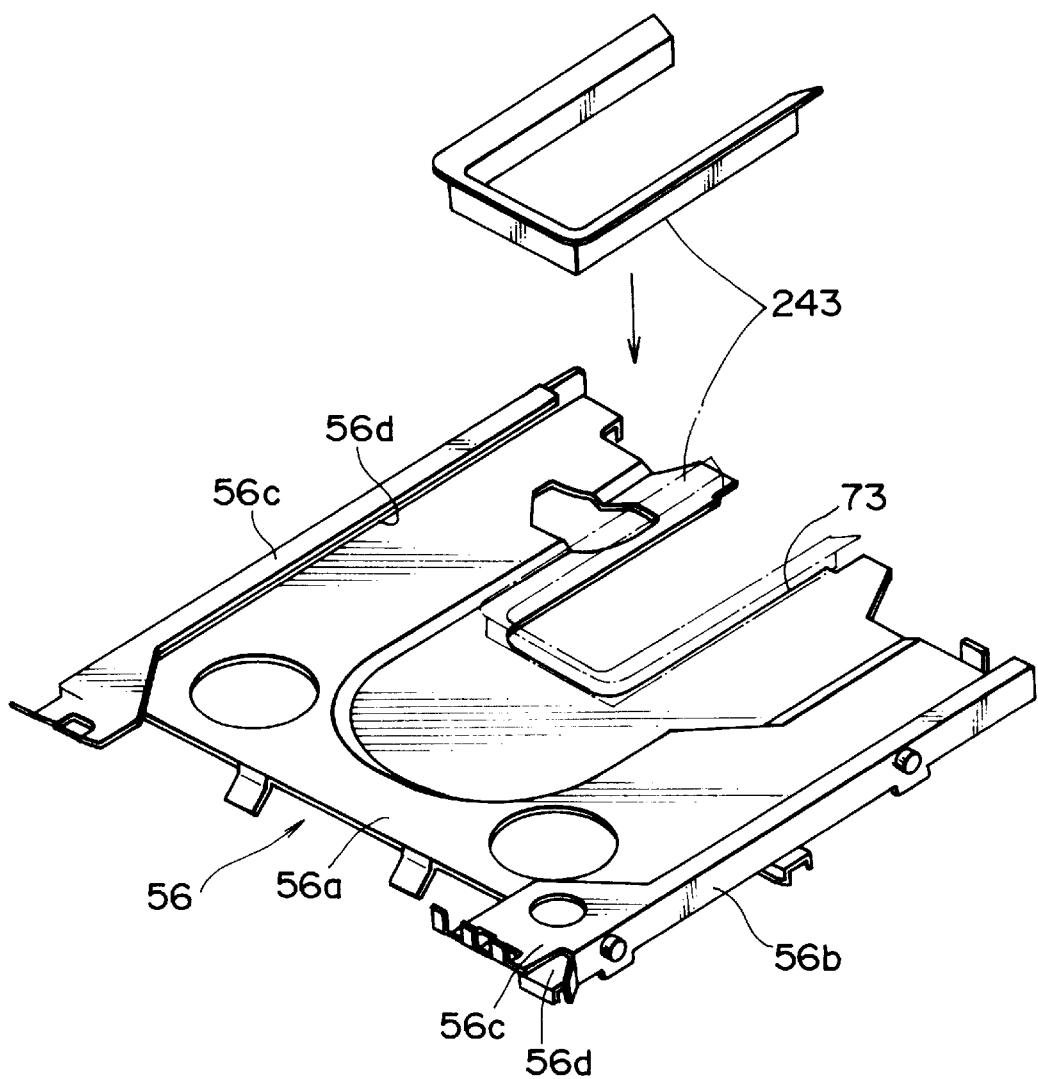
FIG. 53 is an explanatory diagram showing the disassembled cartridge holder in the dust shielding unit.
Figure 54:
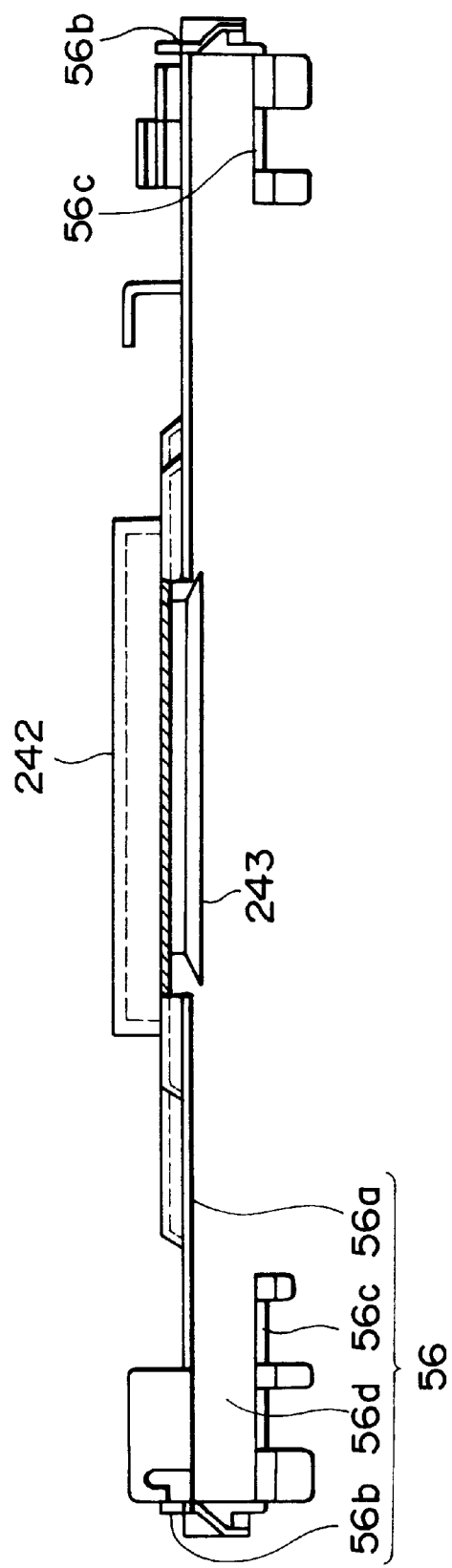
FIG. 54 is a diagram showing a front view of the cartridge holder shown in FIGS. 52 and 53.
Figure 55:
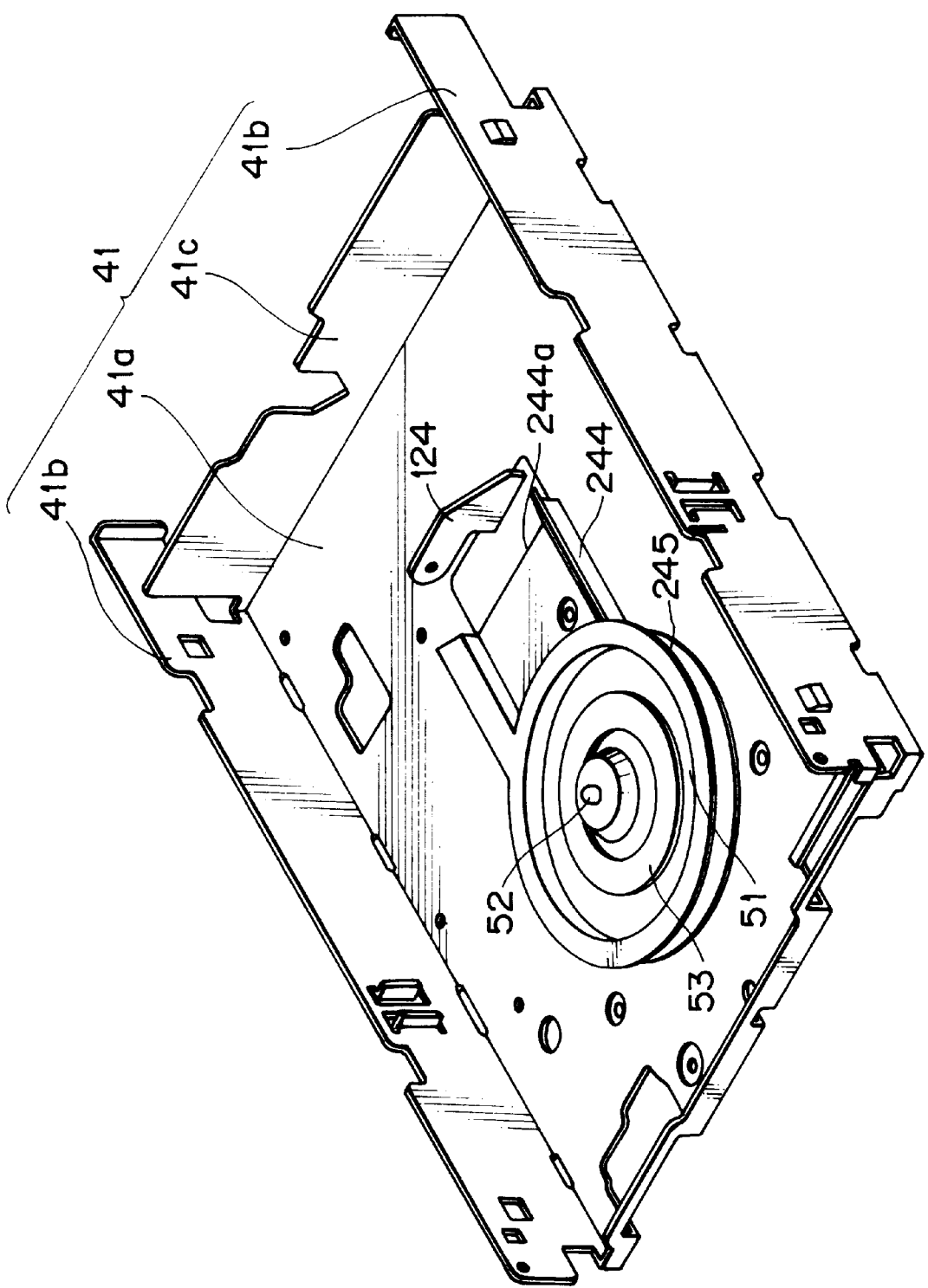
FIG. 55 is a diagram showing a squint view of a spindle motor and used for explaining the dust shielding unit.
Figure 56:
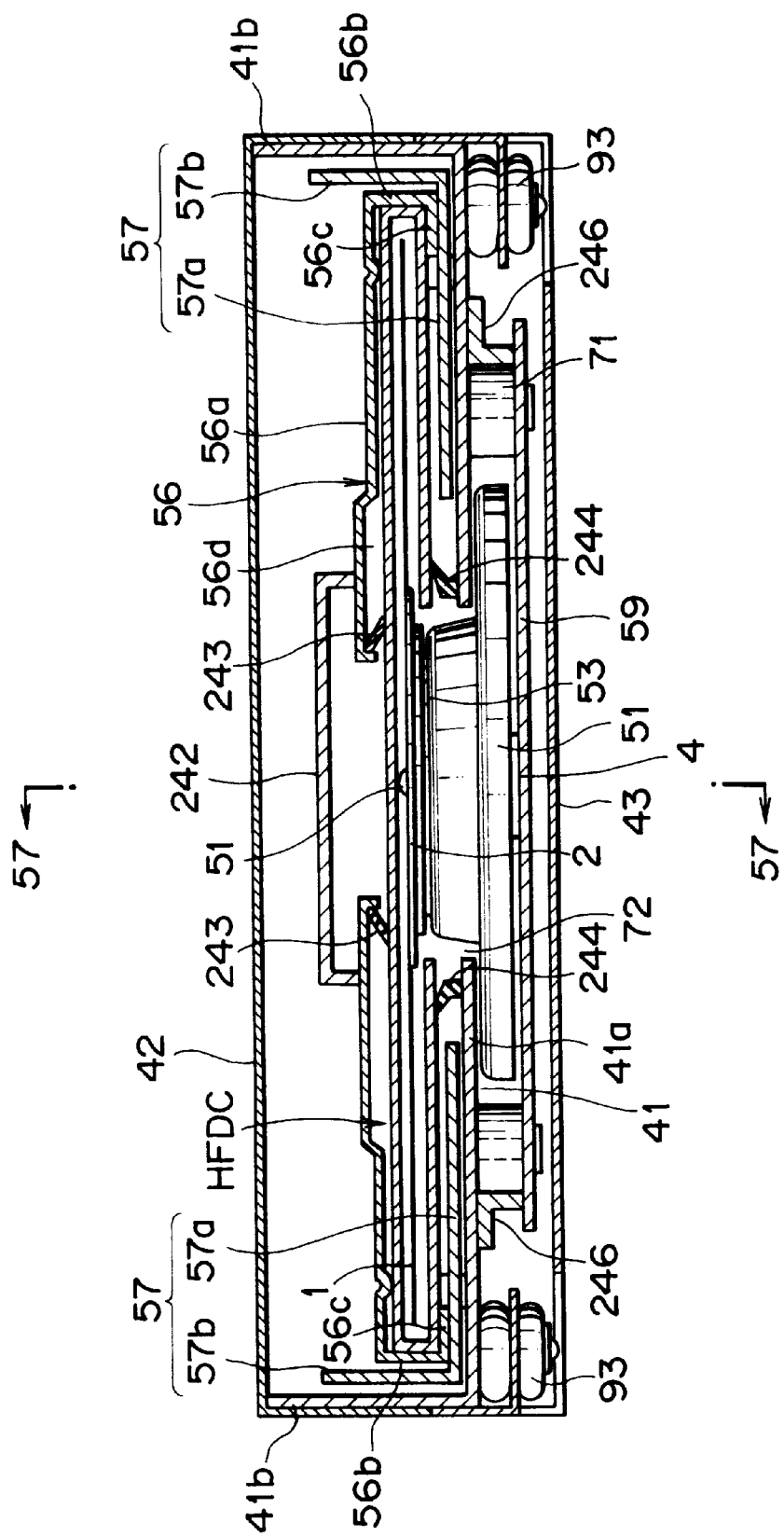
FIG. 56 is an explanatory diagram showing a cross section of the dust shielding unit.
Figure 57:
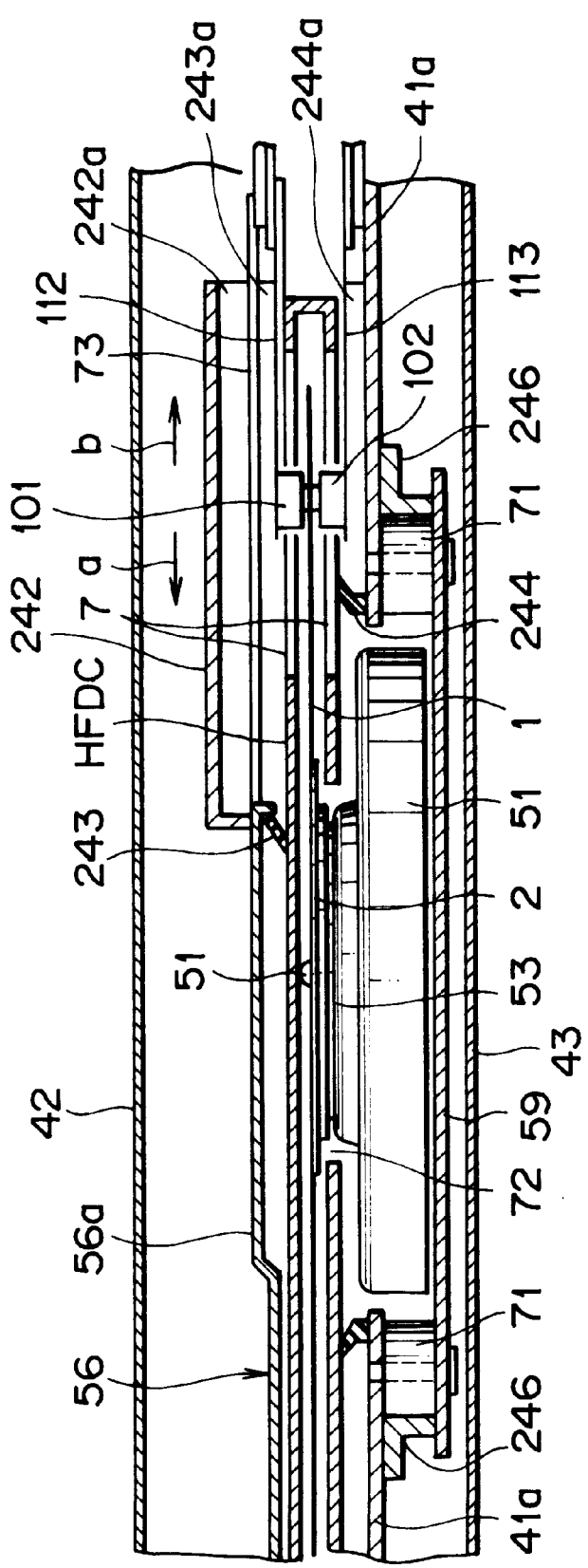
FIG. 57 is a diagram showing a cross section along a line indicated by arrows 57—57 in FIG. 56.

The following is a description of the operation of a tracking servo carried out on the floppy disk 1 of the floppy disk cartridge HFDC having a large storage capacity mounted on the floppy disk drive HFDD for driving a floppy disk cartridge having a large storage capacity with reference to FIGS. 50 and 51.

The tracking servo adopts an embedded servo technique for carrying a servo operation for each servo frame whereby format information is written into a servo area Sa as shown in FIG. 50. Stored in a servo area Sa, the format information is typically used to notify the floppy disk drive HFDD for driving a floppy disk cartridge having a large storage capacity of the format of the large storage capacity hard disk 1 or a version difference.

As shown in FIG. 51, the large storage capacity floppy disk 1 comprises a user data recording/playback area, an area on the inner circumference side outside the user data recording/playback area and an area on the outer circumference side outside the user data recording/playback area. The area on the inner circumference side, the user data recording/playback area and the on the outer circumference side are laid out in the radial direction. The user data recording/playback area comprises tracks TRui, TRui−1, . . . , TRuk, . . . , Trum−1 and TRum. The area on the outer circumference side outside the user data recording/ playback area comprises empty tracks TRe0, TRe2, . . . , TRei−1. The area on the inner circumference side outside the user data recording/playback area comprises empty tracks TRem+1, . . . , TRen−1 and TRen.

The recording area of the large storage capacity floppy disk 1 are divided in the circumferential direction into h sub-frames SF1, SF2, . . . , SF8, . . . , SFh where h has a typical value of 100. Thus, in an operation to record and/or playback data onto and/or from the floppy disk 1, information is read out from the sub-frames SF1, SF2, . . . , SF8, . . . , SFh to carry out tracking with a high degree of precision.

(12) Description of the Disk Drive's Dust Shielding Unit

The following is a description of a dust shielding unit 241 employed in the floppy disk drive HFDD for driving a floppy disk cartridge having a large storage capacity with reference to FIGS. 52 to 58. The dust shielding unit 241 is implemented by a shielding means for limiting the flow of air into and from the inside of the cartridge 5 wherein the large storage capacity floppy disk 1 is driven into rotation at a high rotational speed of at least 3,600 rpm, and the upper and lower magnetic heads 101 and 102 are separated from the upper and lower surfaces of the floppy disk 1 respectively by air films in order to record and/or play back data at a high density onto and/or from the floppy disk 1. The shielding means comprises a cover 242 and spacers 243, 244 and 245. Stuck on the upper surface of the cartridge holder 56 along the outer circumference of the head insertion opening 200, the cover 242 is used for shielding the head insertion opening 200 in the downward direction. Stuck on the lower surface of the cartridge holder 56 along the outer circumference of the head insertion opening 200, the spacer 243 is used for shielding the circumference of the upper head insertion hole 7 of the cartridge 5 at the end of a loading operation of the cartridge 5. Stuck on the bottom plate 41a of the chassis 41, the spacer 244 is used for shielding the circumference of the lower head insertion hole 7 of the cartridge 5 at the end of a loading operation of the cartridge 5. The spacer 245 is used for shielding the outer circumference of the center core hole 6 of the cartridge 5. The cover 242 is made of a substance selected from a broad range of materials including synthesis resin, light metals and a variety of other substances. As for the spacers 243 to 245, an elastic material such as rubber or soft synthesis resin can be used. It should be noted that, openings 241a, 242a and 243a are provided on the magnetic head insertion sides of the cover 242, the spacer 243 and the spacer 244 respectively.

Figure 59:
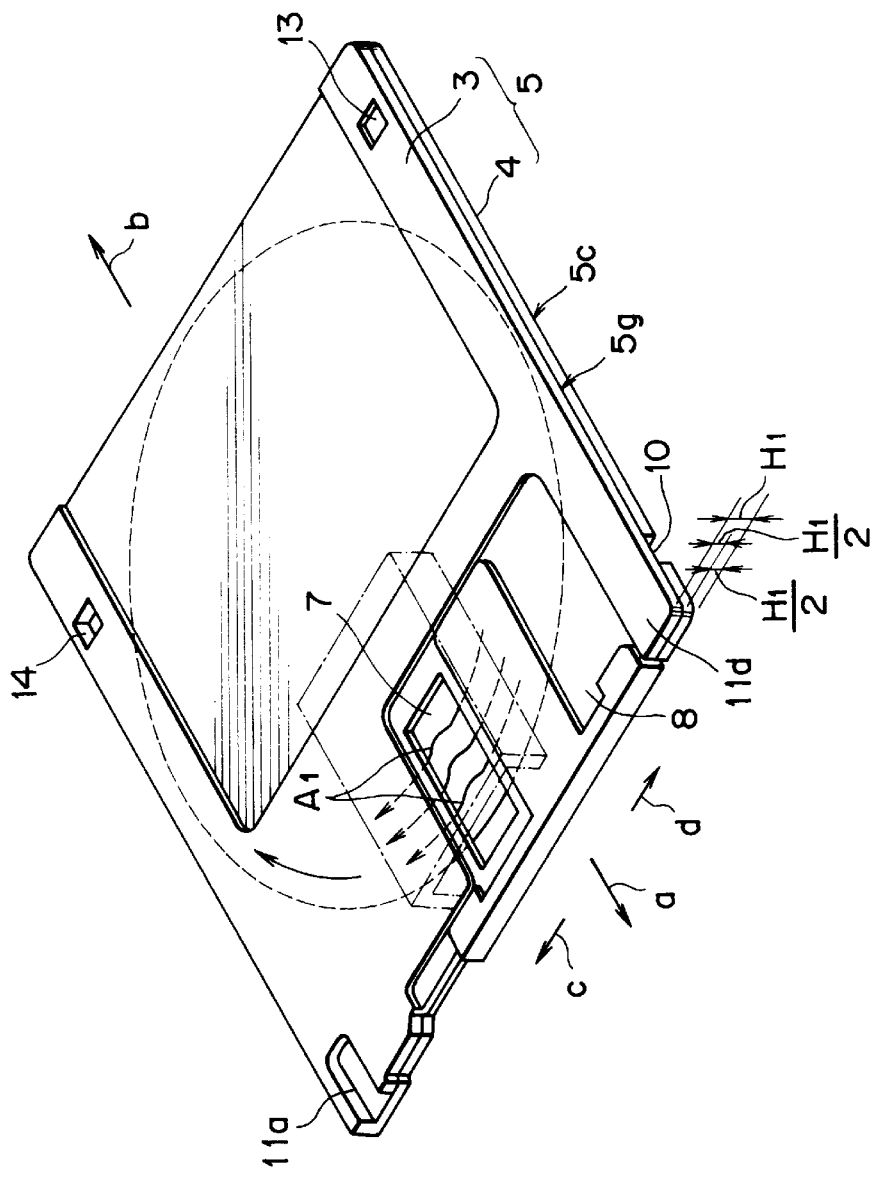
FIG. 59 is a perspective view used for explaining an air flow inside the cartridge caused by the dust shielding unit.

With the dust shielding unit 241 having the configuration described above, in an operation to record and/or play back data onto and/or from the large storage capacity floppy disk 1, the upper and lower head insertion holes 7 as well as the center core hole 6 of the cartridge 5 are shielded. Thus, a flow A1 of the air inside the cartridge 5 becomes stable as shown in FIG. 59 and dust is hardly introduced to the inside of the cartridge 5 along with air. As a result, it is possible to effectively solve a problem of a low output that is caused by dust introduced into the cartridge 5 and caught in spaces between the large storage capacity floppy disk 1 and the upper and lower magnetic heads 101 and 102 or an injury inflicted by the dust on the large storage capacity floppy disk 1 or the upper or lower magnetic head 101 or 102. In the case of the large storage capacity floppy disk 1, a magnetic layer applied to the surface thereof comprises particles each with a diameter of 0.1 microns and a coating thickness of 0.2 microns. Thus, such a magnetic layer is very much prone to an injury inflicted by dust. With the dust shielding unit 241 described above, however, the magnetic layer can be prevented effectively from being injured by dust and, hence, a stable output can be maintained.

Figure 60:
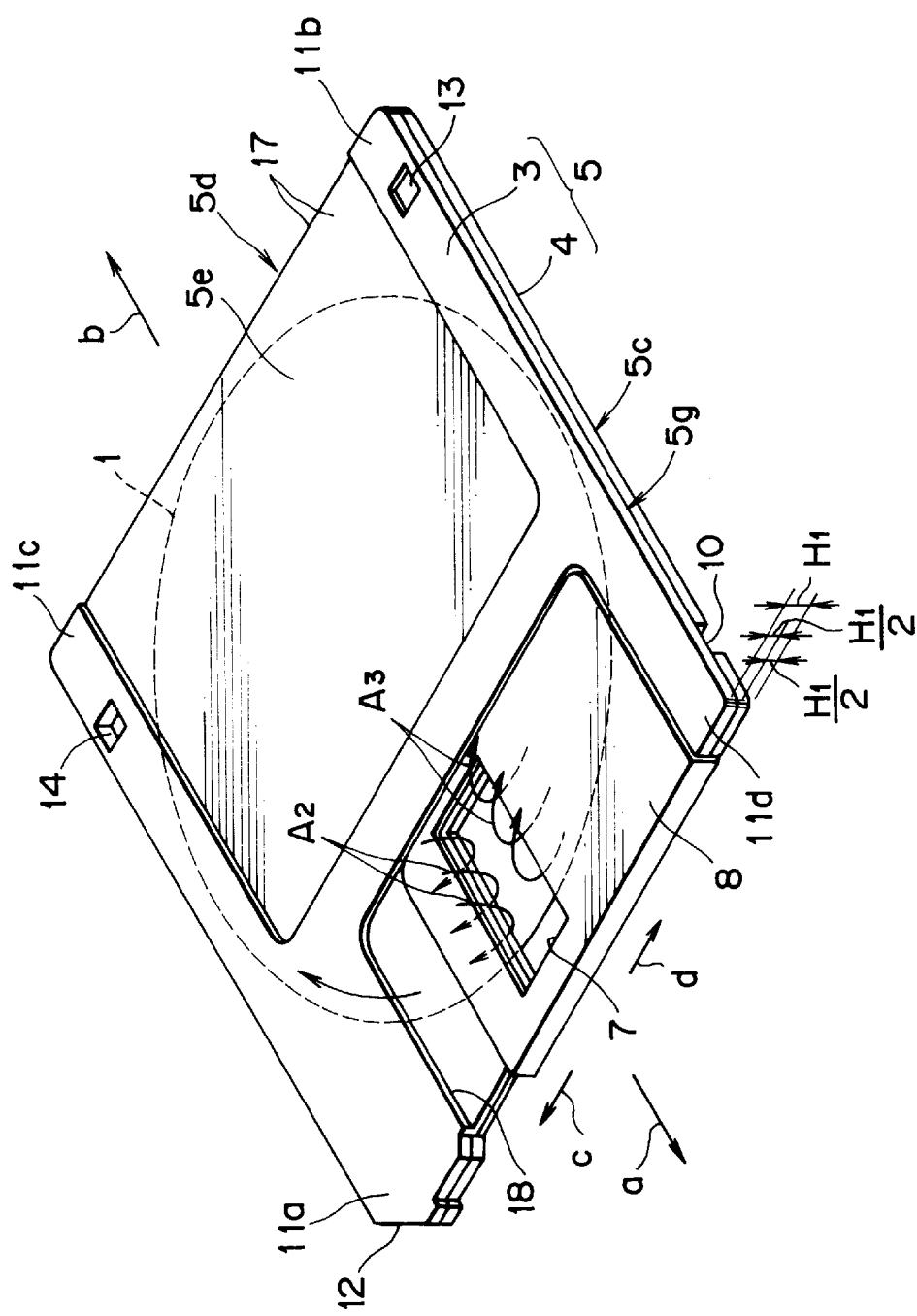
FIG. 60 is a perspective view used for explaining air flows into and from the cartridge with no dust shielding.

It should be noted that FIG. 60 is a diagram showing the flow of air which is observed when the floppy disk 1 is rotated at a high rotational speed with the head insertion holes 7 of the cartridge 5 put in an open state. In this state, the atmosphere air A2 is introduced into the cartridge 5 with ease by way of the head insertion hole 7 and the air A3 inside the cartridge 5 is reversely exhausted to the atmosphere easily also through the head insertion hole 7.

Figure 58:
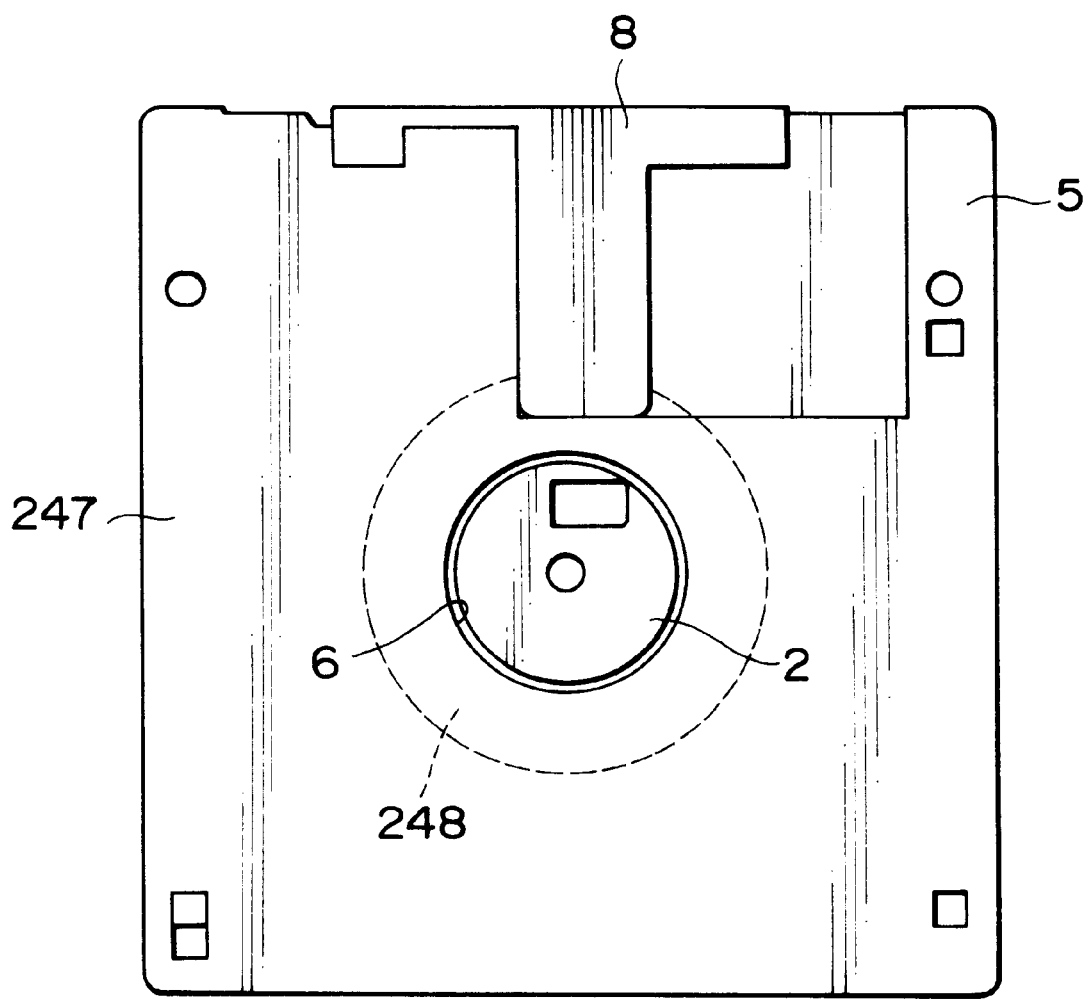
FIG. 58 is a diagram showing a bottom view of a cartridge with an improved dust shielding effect.

By the way, in the implementation of the dust shielding unit 241, it is desirable to employ a cartridge 5 shown in FIG. 58. In the case of the cartridge 5 shown in FIG. 58, the entire surface 247 thereof is subjected to a wrinkle fabrication process in order to prevent an injury from being inflicted on the surface. Since fine wrinkles exist on the wrinkle fabricated surface 247, however, the adhesion of the spacers 243, 244 and 245 becomes poor.

In order to solve the adhesion problem described above, areas for sticking the spacers 243, 244 and 245 are each processed into a smooth surface 248 in order to improve the adhesion of the spacers 243, 244 and 245. Thus, the dust shielding effect can be improved substantially. It should be noted that it is desirable to form a smooth surface 248 at least on the back, that is, the surface 5f, of the cartridge 5.

(13) Description of a Cleaning Unit of the Floppy Disk

Figure 61A:
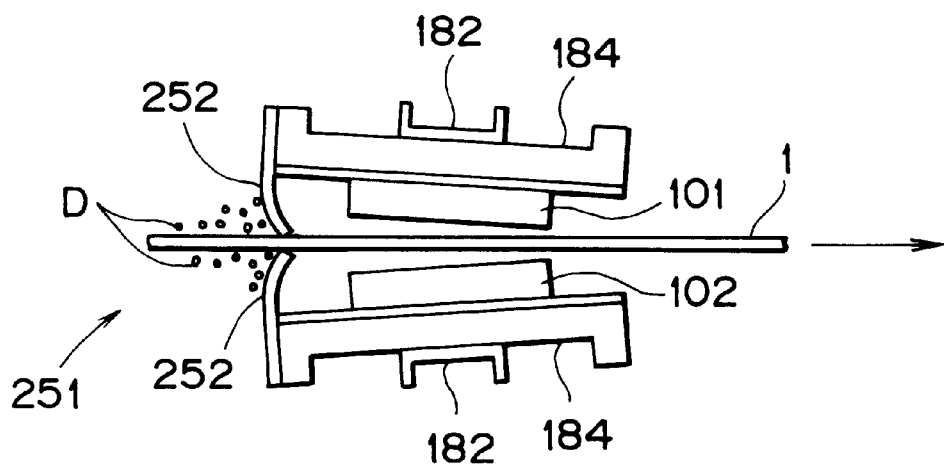
FIGS. 61A and 61B are explanatory diagrams showing a cross section of a cleaning unit of a floppy disk.
Figure 61B:
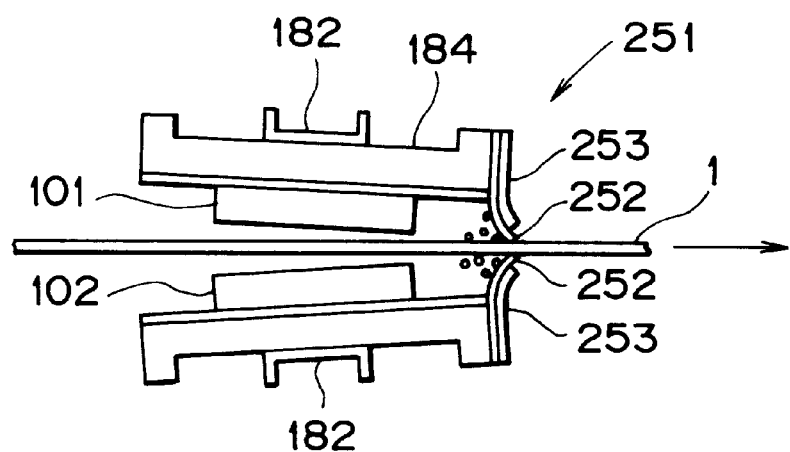
Figure 62:
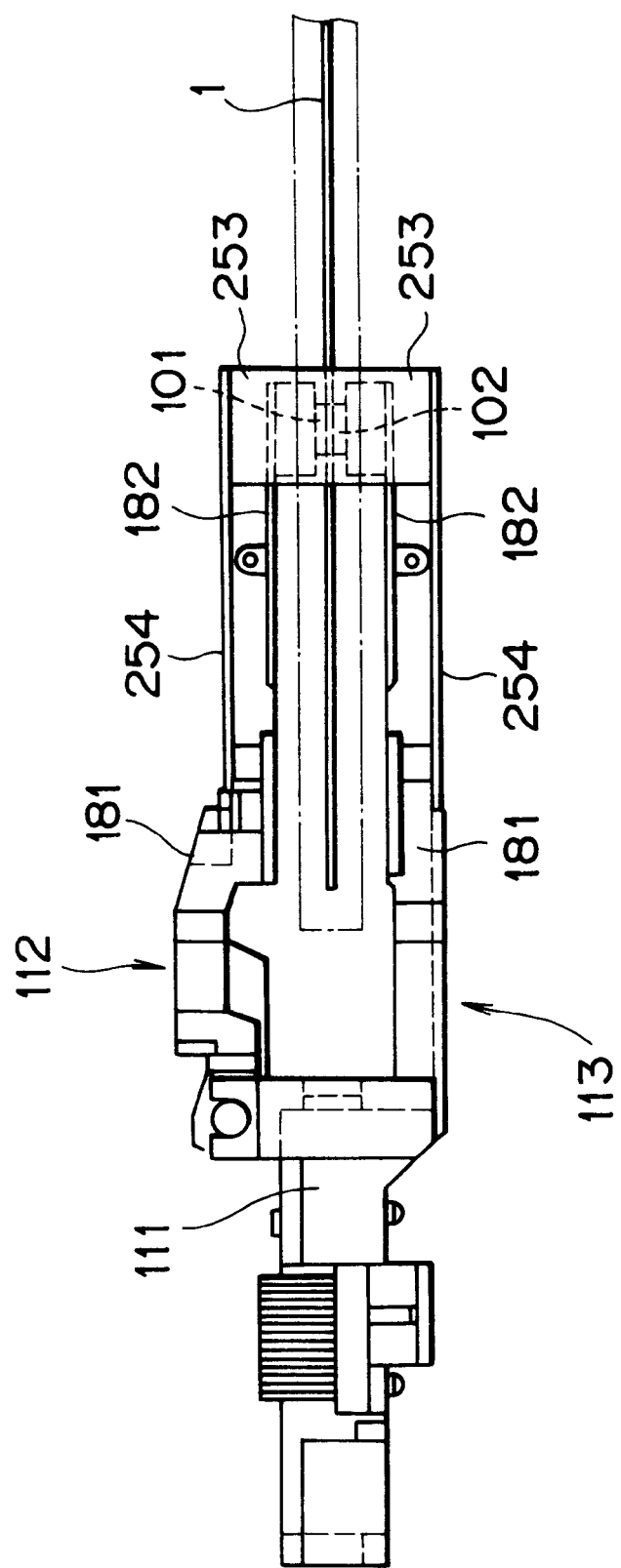
FIG. 62 is an explanatory diagram showing another embodiment of the cleaning unit shown in FIG. 61.
Figure 63:
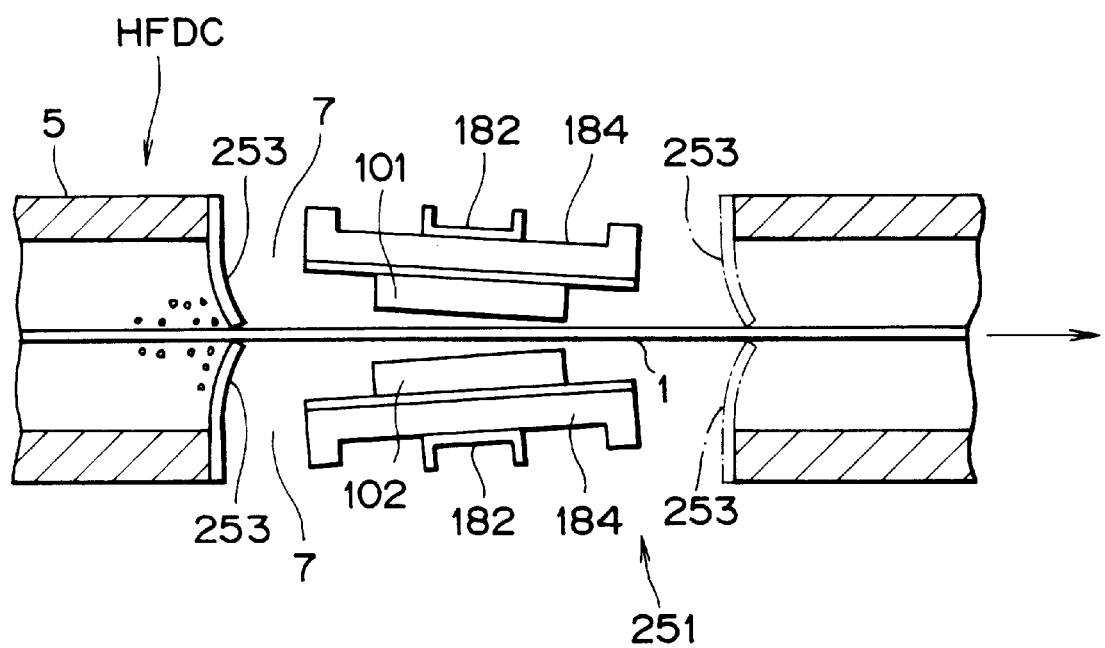
FIG. 63 is an explanatory diagram showing still another embodiment of the cleaning unit shown in FIG. 61.

The following is a description of a cleaning unit 251 provided in the floppy disk drive HFDD for driving a floppy disk cartridge having a large storage capacity to prevent dust from being caught in spaces between the large storage capacity floppy disk 1 and the upper and lower magnetic heads 101 and 102 and, hence, an injury from being inflicted by the dust on the large storage capacity floppy disk 1 or the upper or lower magnetic head 101 or 102 in an operation to record and/or play back data at a high density onto and/or from the floppy disk 1 wherein the upper and lower magnetic heads 101 and 102 are separated from the upper and lower surfaces of the floppy disk 1 respectively by air films with reference to FIGS. 61 to 63. The cleaning unit 251 employs a cleaning member 252 made of cloth charged with static electricity such as polypropylene.

In the cleaning unit 251 shown in FIG. 61A, the cleaning member 252 is attached to typically a side surface of the head base 184 on the upstream side of the rotational direction of the floppy disk 1. The cleaning member 252 is brought into contact with the surfaces of the floppy disk 1 to remove dust D stuck on the surfaces by electrostatic absorption on the upstream side of the rotational direction of the floppy disk 1 with respect to the upper and lower magnetic heads 101 and 102. As a result, the dust D is prevented from being caught in spaces between the large storage capacity floppy disk 1 and the upper and lower magnetic heads 101 and 102.

In the cleaning unit 251 shown in FIG. 61B, on the other hand, the cleaning member 252 is attached to typically a side surface of the head base 184 on the downstream side of the rotational direction of the floppy disk 1. The cleaning member 252 thus removes dust D stuck on the surfaces of the floppy disk 1 by electrostatic absorption on the downstream side of the rotational direction of the floppy disk 1 with respect to the upper and lower magnetic heads 101 and 102. As a result, the dust D is prevented from being circulated and caught in spaces between the large storage capacity floppy disk 1 and the upper and lower magnetic heads 101 and 102. Note that, in this configuration, it is desirable to provide a naturally pushing means 253 for naturally pushing the cleaning member 252 against the surface of the floppy disk 1.

FIG. 62 is a diagram showing a cleaning unit 251 wherein the cleaning member 252 is supported by the end of a support arm 254 extended from the head arms 112 and 113 to give the same effect as the cleaning member 252 shown in FIG. 61. FIG. 63 is a diagram showing a cleaning unit 251 wherein the cleaning members 252 are attached to the walls of the head insertion hole 7 of the cartridge 5 on the upstream and downstream sides of the rotational direction of the floppy disk 1 with respect to the upper and lower magnetic heads 101 and 102 to remove dust D stuck on the surfaces of the floppy disk 1 by electrostatic absorption.

Some preferred embodiments of the present invention have been described so far. It should be noted, however, that the scope of the invention is not limited by the embodiments. That is, it is possible to make a variety of changes based on technological concepts provided by the present invention. For example, the present invention is not limited to the floppy disk cartridge and the floppy disk drive. Instead, the present invention can also be applied to a variety of disk drive apparatuses for recording and/or playing back data onto and/or from a variety of disk-shaped recording media.

What is claimed is:

1. A disk drive apparatus for recording and/or playing back a signal onto and/or from a disk-shaped recording medium, said disk drive apparatus having a configuration comprising:

a carriage transported by a linear actuator;

a head arm attached to said carriage through a supporting-point pin in such a way that said head arm is freely rotatable;

a magnetic head attached to said carriage through said head arm and used for recording and/or playing back said signal onto and/or from said disk-shaped recording medium; and force applying means for naturally applying a load force to said magnetic head toward said disk-shaped recording medium, wherein said supporting-point pin provided on said head arm is to be put in a state of being engaged with a supporting-point pin engagement groove formed on said carriage, the supporting-point pin engagement groove being a V-shaped groove; and by fixing a fixed end of said force applying means for naturally applying said load force on said carriage, a pressing load force is applied by a movable end of said force applying means to said head arm to push said head arm toward said disk-shaped recording medium and said pressing load force puts said head arm in a state of being engaged with said supporting-point pin engagement groove.

2. A disk drive apparatus for recording and/or playing back a signal onto and/or from a disk-shaped recording medium, said disk drive apparatus having a configuration comprising:

a carriage transported by a linear actuator;

a head arm attached to said carriage through a supporting-point pin in such a way that said head arm is freely rotatable;

a magnetic head attached to said carriage through said head arm and used for recording and/or playing back said signal onto and/or from said disk-shaped recording medium; and force applying means for naturally applying a load force to said magnetic head toward said disk-shaped recording medium, wherein said supporting-point pin provided on said head arm is to be put in a state of being engaged with a supporting-point pin engagement groove formed on said carriage;

by fixing a fixed end of said force applying means for naturally applying said load force on said carriage, a pressing load force is a applied by a movable end of said force applying means to said head arm to push said head arm toward said disk-shaped recording medium and said pressing load force puts said head arm in a state of being engaged with said supporting-point pin engagement groove; and an aside setting means is provided for supporting said supporting point pin through a pivot and for pressing said head arm toward said carriage in an axial direction of said supporting-point pin.

3. A disk drive apparatus for recording and/or playing back a signal onto and/or from a disk-shaped recording medium, said disk drive apparatus having a configuration comprising:

a motor for driving said disk-shaped recording medium into rotation;

a carriage transported by a linear actuator;

a head arm provided with an arm base made of a rigid material and a suspension implemented by a plate spring, and attached to said carriage through a supporting-point pin in such a way that said head arm is freely rotatable;

a magnetic head attached to said carriage through said head arm and used for recording and/or playing back said signal onto and/or from said disk-shaped recording medium; and a force applying means for naturally applying a load force to said magnetic head toward said disk-shaped recording medium;

wherein said supporting-point pin provided on said head arm is to be put in a state of being engaged with a supporting-point pin engagement groove formed on said carriage, said supporting-point pin engagement groove being a V-shaped groove; and by fixing a fixed end of said force applying means for naturally applying said load force on said carriage, a pressing load force is applied by a movable end of said force applying means to said head arm to push said head arm toward said disk-shaped recording medium and said pressing load force puts said head arm in a state of being engaged with said supporting-point pin engagement groove.

4. A disk drive apparatus for recording and/or playing back a signal onto and/or from a disk-shaped recording medium, said disk drive apparatus having a configuration comprising:

a motor for driving said disk-shaped recording medium into rotation;

a carriage transported by a linear actuator;

a head arm provided with an arm base made of a rigid material and a suspension implemented by a plate spring, and attached to said carriage through a supporting-point pin in such a way that said head arm is freely rotatable;

a magnetic head attached to said carriage through said head arm and used for recording and/or playing back said signal onto and/or from said disk-shaped recording medium; and a force applying means for naturally applying a load force to said magnetic head toward said disk-shaped recording medium;

wherein said supporting-point pin provided on said head arm is to be put in a state of being engaged with a supporting-point pin engagement groove formed on said carriage;

by fixing a fixed end of said force applying means for naturally applying said load force on said carriage, a pressing load force is applied by a movable end of said force applying means to said head arm to push said head arm toward said disk-shaped recording medium and said pressing load force puts said head arm in a state of being engaged with said supporting-point pin engagement groove; and an aside setting means is provided for supporting said supporting-point pin through a pivot and for pressing said head arm toward said carriage in an axial direction of said supporting-point pin.

* * * * *

UNITED STATES PATENT AND TRADEMARK OFFICE
CERTIFICATE OF CORRECTION

PATENT NO.    : 6,256,174 B1
DATED         : July 3, 2001
INVENTOR(S)   : Hirohiko Shimizu It is certified that error appears in the above-identified patent and that said Letters Patent is hereby corrected as shown below:

Column 6,
Line 20, change "in correct" to -- incorrect --.
Line 64, change "an" to -- and --.

Column 7,
Line 40, change "ba" to -- by a --.

Column 22,
Line 54, change "Ahead" to -- A head --.

Column 25,
Line 58, change "orb" to -- or b --.

Column 33,
Line 52, delete "a" (first occurrence).

Signed and Sealed this

Twenty-sixth Day of March, 2002

*Attest:*

*Attesting Officer*

JAMES E. ROGAN
*Director of the United States Patent and Trademark Office*